United States Patent [19]

Check, Jr. et al.

[11] 4,271,481

[45] Jun. 2, 1981

[54] MICRO COMPUTERIZED ELECTRONIC POSTAGE METER SYSTEM

[75] Inventors: Frank T. Check, Jr., Orange; Alton B. Eckert, Jr., Norwalk; Joseph R. Warren, Stamford, all of Conn.

[73] Assignee: Pitney Bowes Inc., Stamford, Conn.

[21] Appl. No.: 900,089

[22] Filed: Apr. 26, 1978

Related U.S. Application Data

[60] Division of Ser. No. 694,813, Jun. 10, 1976, which is a continuation of Ser. No. 536,248, Dec. 23, 1974, Pat. No. 3,978,457.

[51] Int. Cl.³ .............................................. G06F 15/24

[52] U.S. Cl. .................................................... 364/900

[58] Field of Search ............... 364/466, 567, 200, 900; 177/25

[56] References Cited

U.S. PATENT DOCUMENTS

| | | | |
|---|---|---|---|
| 3,635,297 | 1/1972 | Salava | 364/466 |
| 3,938,095 | 2/1976 | Check, Jr. et al. | 364/900 |
| 3,951,221 | 4/1976 | Rock | 177/1 |

OTHER PUBLICATIONS

Intel MCS-4 Micro Computer Set, Jan. 1972, pp. 1-12.

*Primary Examiner*—Raulfe B. Zache
*Attorney, Agent, or Firm*—David E. Pitchenik; William D. Soltow, Jr.; Albert W. Scribner

[57] ABSTRACT

An advanced electronic postage meter system is described, which is built around a micro computer set. The micro computer set is of LSI design, and comprises a single chip central processor unit (CPU) which performs all control and data processing functions. Auxiliary to the CPU are ROM's which store the program of the postage meter system; RAM's which provide the system with a working memory; and Shift Registers which expand the I/O capacity of the system and provide multiplexing capability. The postage meter system comprises componentry such as a non-volatile memory for postage accounting purposes; a display for visually monitoring the functions of the system; a keyboard for instructing the system; and a modified postage meter with motorized setting means for printing postage upon pieces of mail. These peripheral devices communicate with the micro computer set through ports, and means are provided to expand port capabilities for these peripheral devices.

15 Claims, 60 Drawing Figures

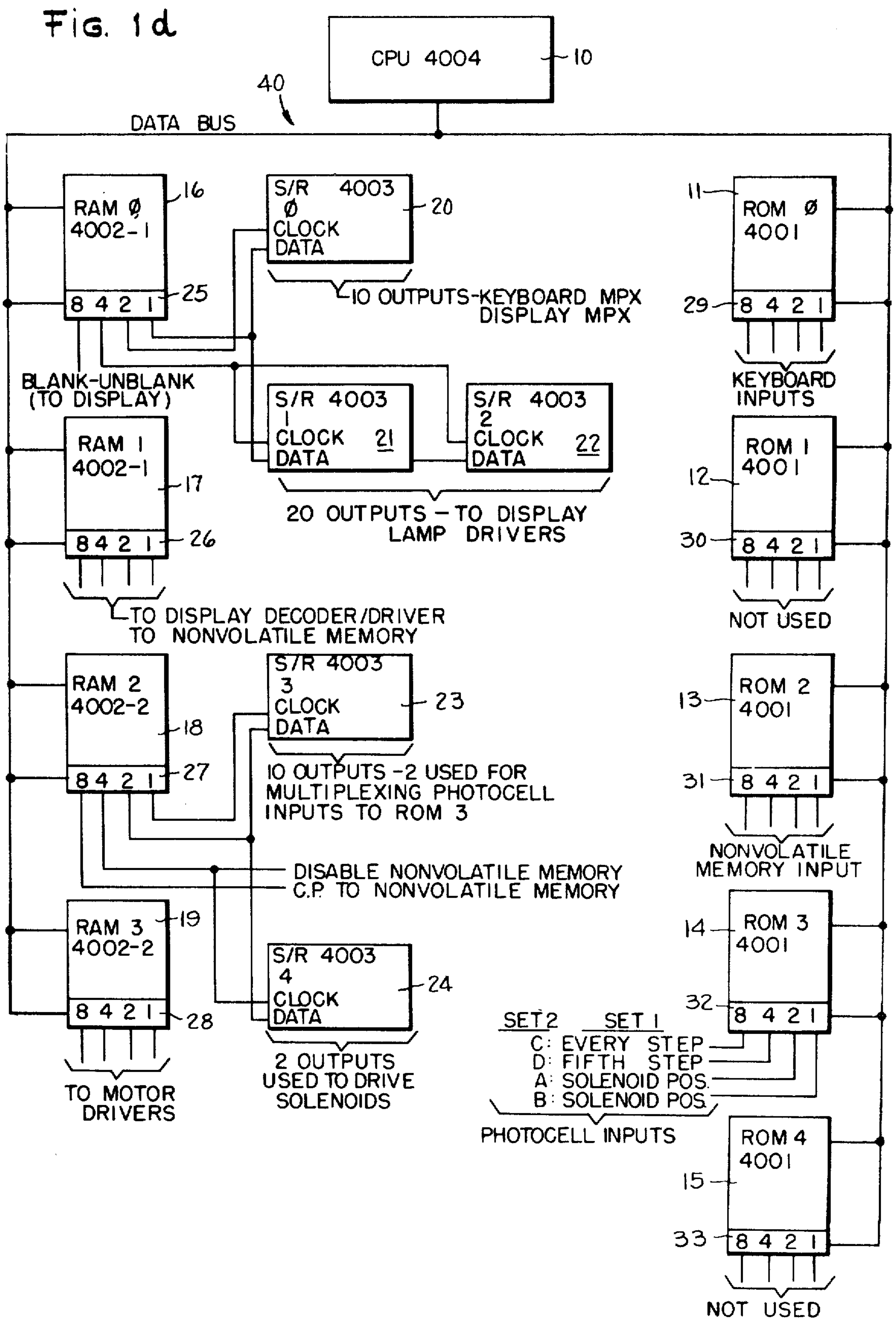
Fig. 1d
CPU 4004
10
40
DATA BUS
RAM Ø 4002-1
16
25
8 4 2 1
S/R 4003 Ø CLOCK DATA
20
10 OUTPUTS-KEYBOARD MPX DISPLAY MPX
ROM Ø 4001
11
29
KEYBOARD INPUTS
BLANK-UNBLANK (TO DISPLAY)
S/R 4003 1 CLOCK DATA 21
S/R 4003 2 CLOCK DATA 22
20 OUTPUTS – TO DISPLAY LAMP DRIVERS
RAM 1 4002-1
17
26
ROM 1 4001
12
30
NOT USED
TO DISPLAY DECODER/DRIVER TO NONVOLATILE MEMORY
RAM 2 4002-2
18
27
S/R 4003 3 CLOCK DATA
23
10 OUTPUTS -2 USED FOR MULTIPLEXING PHOTOCELL INPUTS TO ROM 3
ROM 2 4001
13
31
NONVOLATILE MEMORY INPUT
DISABLE NONVOLATILE MEMORY
C.P. TO NONVOLATILE MEMORY
RAM 3 4002-2
19
28
TO MOTOR DRIVERS
S/R 4003 4 CLOCK DATA
24
2 OUTPUTS USED TO DRIVE SOLENOIDS
ROM 3 4001
14
32
SET 2 SET 1
C: EVERY STEP
D: FIFTH STEP
A: SOLENOID POS.
B: SOLENOID POS.
PHOTOCELL INPUTS
ROM 4 4001
15
33
NOT USED FIG. 5
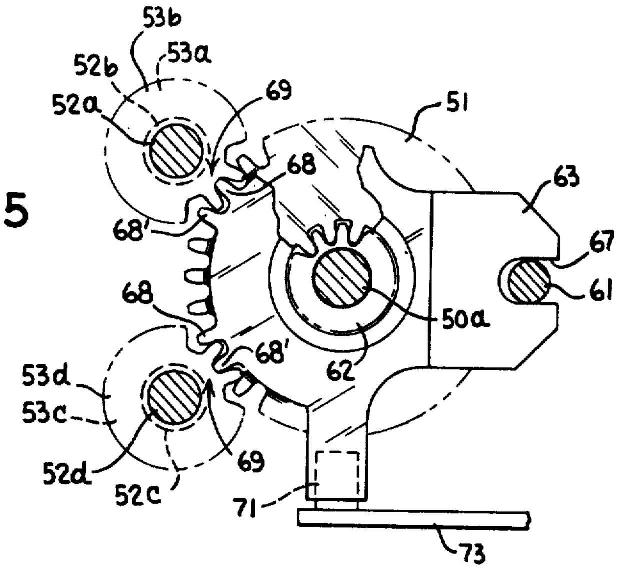
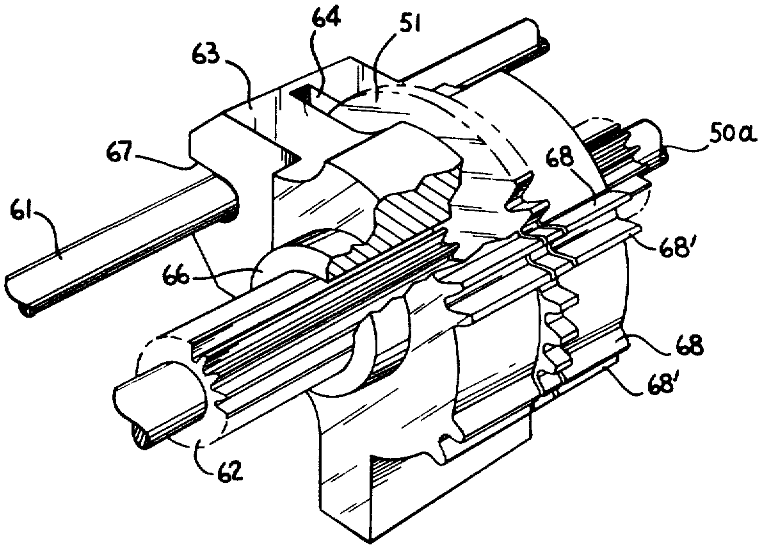
FIG. 4b

LAMP OUTPUT AREA – MEMORY LOCATION

RAM (Ø)16 MEMORY ALLOCATION

CHART FOR POSTAGE METER PROGRAM

INITIALIZATION

FIG. 25. SCAN
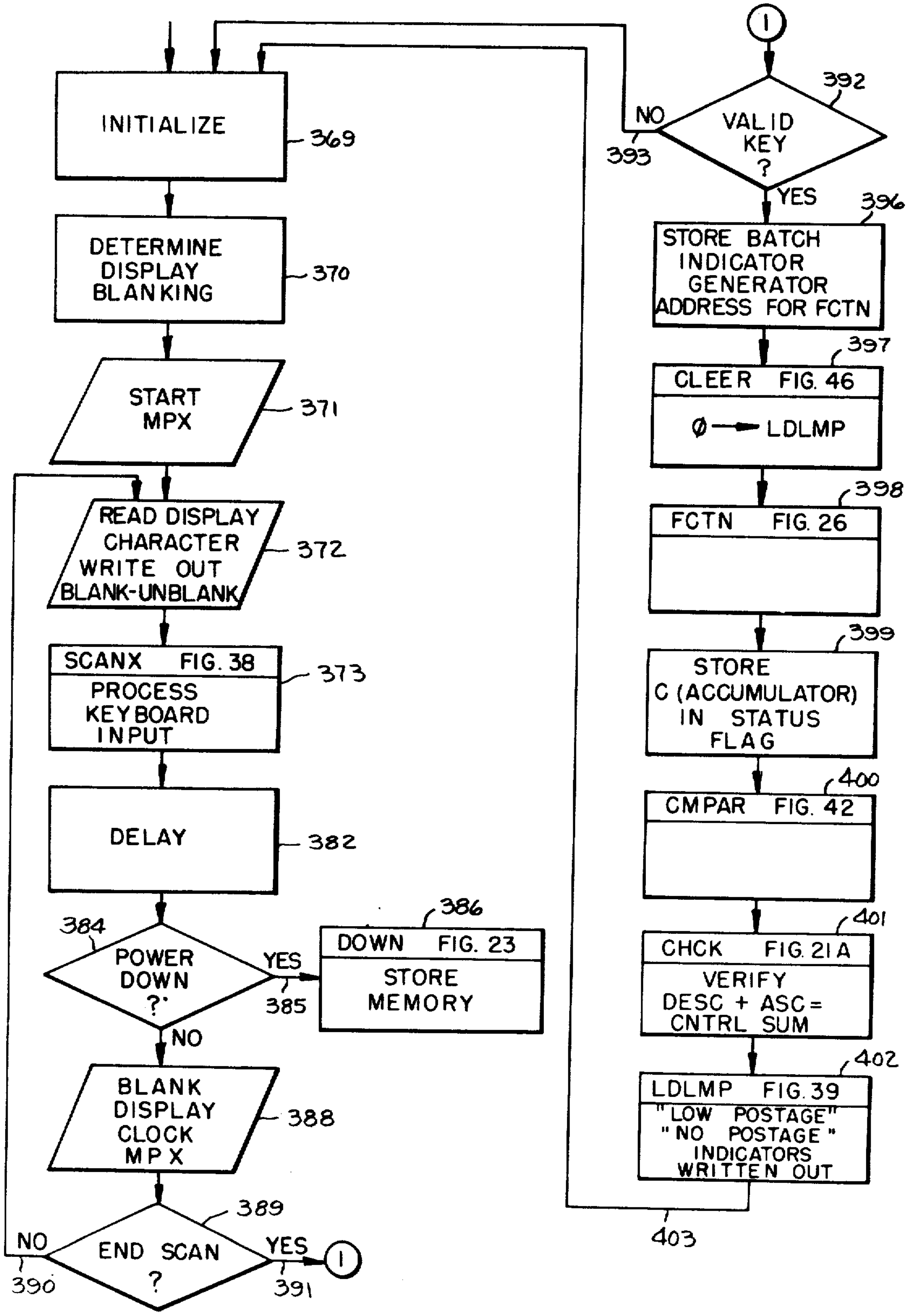

FIG. 27.

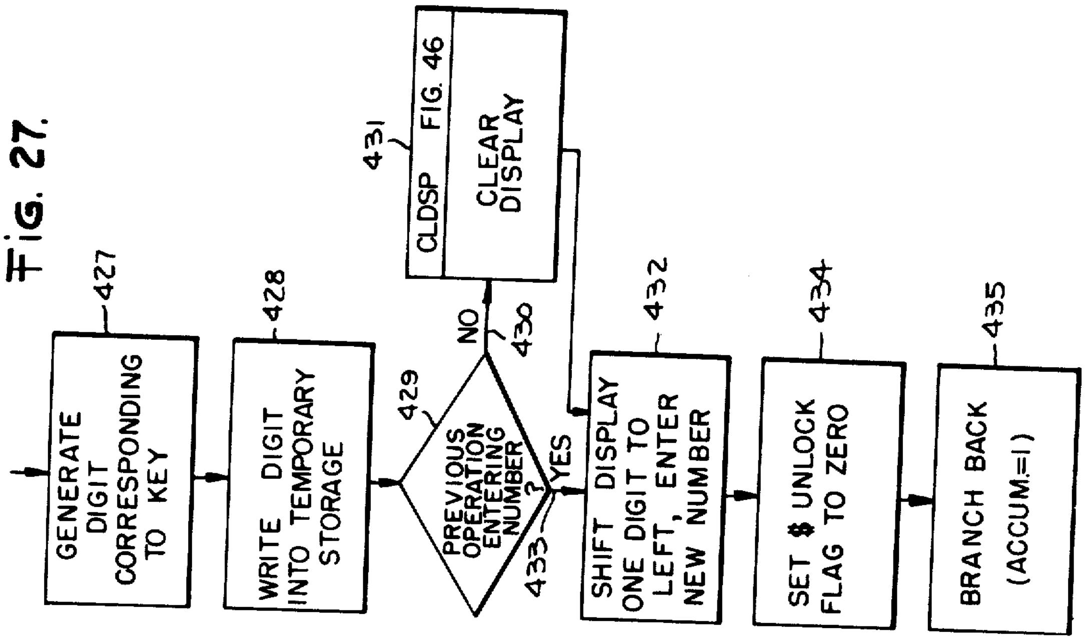

FIG. 26.

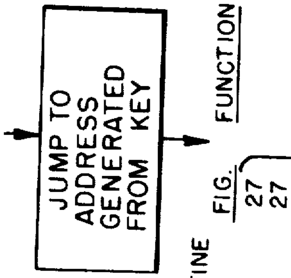

FCTN

| KEY | SUBROUTINE LABEL | FIG. | FUNCTION |
|---|---|---|---|
| 0 | ZERO | 27 | NUMERICAL KEYBOARD ENTRY |
| 1 | ONE | 27 | |
| 2 | TWO | 27 | |
| 3 | THREE | 27 | |
| 4 | FOUR | 27 | |
| 5 | FIVE | 27 | |
| 6 | SIX | 27 | |
| 7 | SEVEN | 27 | |
| 8 | EIGHT | 27 | |
| 9 | NINE | 27 | |
| SET | SET | 28 | SET METER OR RECALL PREVIOUS SETTING |
| $ UNLOCK | UNLCK | 29 | $ UNLOCK FLAG |
| PRINT PHOTOCELL INPUT | POST | 30 | UPDATE REGISTERS AFTER PRINTING POSTAGE |
| + | ADD | 31 | ADD FUNDS INTO METER |
| − | SUBD | 32 | SUBTRACT FUNDS FROM METER |
| CLEAR | CLEAR | 34 | CLEAR FUNCTION |
| ± | PLUS | 33 | ADDITION FUNCTION |
| DESC. REG. | DESC | 35 | PUT CONTENTS OF SELECTED REGISTER INTO DISPLAY |
| ASC. REG. | ASC | 35 | |
| PIECE COUNT | PIECE | 35 | |
| CONT. SUM | CNTRL | 35 | |
| BATCH AMOUNT | BSUM | 35 | |
| BATCH COUNT | BCNT | 35 | |

SET

FIG. 38. SCANX
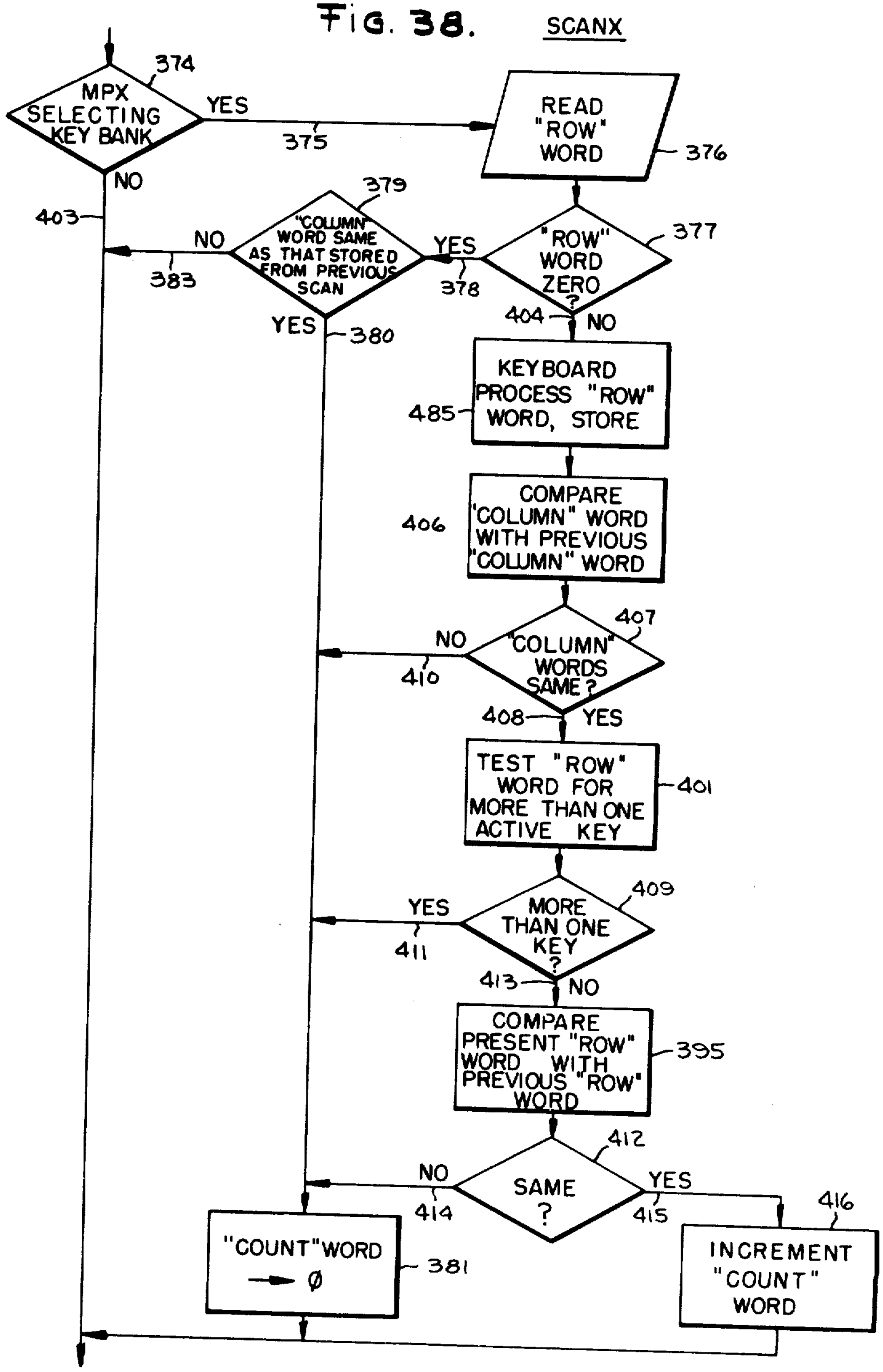

CHECK

CMPAR

FETCH

STEP

MICRO COMPUTERIZED ELECTRONIC POSTAGE METER SYSTEM

This is a division of application Ser. No. 694,813, filed June 10, 1976 which in turn was a continuation of application Ser. No. 536,248, filed Dec. 23, 1974, and now U.S. Pat. No. 3,978,457.

The invention relates to an electronic postage meter system, and more particularly pertains to an electronic postage meter system built upon a micro computer system.

BACKGROUND OF THE INVENTION AND RELATED APPLICATIONS

The present electronic postage meter system is a second generation, stand-alone postage system superseding the predecessor system generally shown in copending application, Ser. No. 406,898 filed Oct. 16, 1973; application Ser. No. 195,729 filed Nov. 4, 1971, now U.S. Pat. No. 3,832,946; and copending application, Ser. No. 337,234 filed July 9, 1973.

The prior postage meter system was one of the first of its kind using electronic accounting and control techniques to record and keep track of postage operations. The present inventive postage meter system follows in the steps of the previous system, but adds versatility, compactness, and flexibility to the electronic metering concept. The TTL logic of the prior system has now been replaced by a totally self-contained postage system built around an LSI micro computer set. The micro computer set provides flexibility by affording easy system changes by the addition of peripheral equipment and associated programming. The entire personality of the postage system is determined by the instructions in ROM. The inventive micro computer postage system can have the programmed capability of a more intricate system built into it, and when there is a need to expand the system, it can be accomplished without having to make intricate wiring changes as was required with the prior TTL logic system. Each micro computer postage system may thus be specifically fashioned to the needs of the individual user without difficulty.

SUMMARY OF THE INVENTION

The invention relates to a computerized postage meter system employing a central processing unit, a plurality of memory units, a multiplex input and output, and postage setting means responsive to the controlled interactions between the CPU, memories, input and outputs, for setting predetermined postage and printing the postage as desired. The system is built up about a plurality of LSI components and employs LSI technology to provide a functional relationship enabling the electronic postage meter system to accomplish its predetermined functions.

In general configuration, a central processing unit for providing the data flow control and for providing calculation of postage in accordance with input supply thereto, is the essential element of this system. Coupled to the CPU is a permanent memory for storing a postal data program and is a non-alterable storage medium. A temporary memory is also provided for storing and forwarding working data in accordance with the operation of CPU. A non-volatile memory is intercoupled with the CPU and provides a permanent or nondestructive storage location for postal funding data in accordance with the transfer routine previously established and activated in accordance with a shutdown or start-up sequence of the system. The use of a nonvolatile memory is important in that data which is significant in the system, such as the contents of descending registers which keep track of the remaining balance in the postal meter or ascending registers which keep track of the continuous accumulation of charges thereto, is permanently stored in the nonvolatile memory when the system is de-energized. As a corollary, when the system starts up, the data from the nonvolatile memory is transferred back into the temporary memory.

Further interaction with the CPU is provided by means of an appropriate input device such as a keyboard which provides the appropriate postal data to the CPU for the calculations to be performed. An output or display which is multiplexed with the input also interfaces with the CPU for recalling data from the temporary storage in accordance with the commands. The ultimate output of the CPU is coupled to a postage setting mechanism which sets the amount of postage to be printed into a postal printing unit for printing the postage as desired.

More specifically, the micro computerized postage meter system is built upon the MCS-4[R] micro computer set; a product of Intel Corporation, Santa Clara, Calif. It will be understood that other manufacturers and equivalent components may be employed and that Intel components are used for purposes of example. The micro computer set is of LSI design, and comprises a central processor unit (CPU-4004) which performs all control and data processing functions, and contains the control unit and arithmetic unit of a general purpose micro programmable computer. The computer system commprises a plurality of ROM's (Read Only Memory Chips-4001) and a plurality of RAM's (Read Access Memory Chips-4002) which are interconnected to the CPU. The ROM's contain the postage system program. One four-bit input-output port is provided on each ROM package. The RAM's provide the system with a working memory and each RAM package provides one four-bit output port. A permanent (nonvolatile) memory is provided for accounting purposes, and comprises a 4×128 bit COS/MOS shift register with hold-up battery. The computer system also contains shift registers (Intel number 4003) for port expansion and multiplexing capability, and associated circuitry including clocks, power supplies, and interfacing circuits to connect with the outside world.

The postage setting mechanism, although an indispensable part of this system, is itself one of several components including a keyboard for instructing the system, a display for visually monitoring the system's functions, and the aforementioned non-volatile shift register memory.

The postage printer of the inventive system is a modified Model 5300 postage meter manufactured by Pitney-Bowes, Inc., Stamford, Connecticut. The mechanical accounting means (ascending and descending registers) have been removed from the meter along with the actuator assemblies and setting levers. The remaining printer is set by a pair of solenoids and a stepping motor. The mechanical operation of the printer is monitored by a plurality of photocells strategically placed within the printer housing. When a particular function of the printer fails to be performed, a photocell monitoring that appropriate function will provide an error input to the system via an input port.

The micro computer system also receives inputs from the keyboard and non-volatile memory through an input port.

Outputs from the system are generally handled via the shift registers and output ports. These outputs include: (1) data to the display; (2) data to the non-volatile memory; and (3) control signals to the stepper motor and solenoids setting the postage printer.

Peripheral devices may easily be added to the system such as a large external display, a receipt printer, or a listing printer, etc.

The non-volatile memory of the present system is similarly protected as in the prior system, because the meter registers must always be maintained. A shut-down circuit is again provided to protect the memory during a shut-down sequence. An enable solenoid is also provided which inhibits the printer operation when the meter is not ready or when sufficient postage is not available for the printing of postage.

Upon application of power to the system, voltage sensing circuits generate a reset pulse which initializes the micro computer system and starts executing the program from address$\phi$. The non-volatile memory is loaded into working storage in RAM, the postage meter printer is set to zero ($\phi$), the descending register is loaded into the display to inform the operator how much funds are available, and a "check date" reminder is turned on. As with conventional meters the user is responsible for mechanically setting the correct data. The system then goes into a scan routine searching for inputs.

The inventive micro computer postage system has the following advantages:

(a) This postage meter provides the capability of monitoring its own registers for errors. This feature is unique to postage metering, and results in greater accounting accuracies as well as improved security.

(b) The present system offers two new registers, a batch amount register, and a batch count register. These registers provide a record of the total number of meter printings, and the total amount of postage printed. These registers are resettable to zero by the operator. These extra registers are useful to the user as a means to gage his mailing expenses.

(c) The postage system of this invention allows for easier recharging of the registers with additional funds. Funds can be added without having to do any mathematical computations, or any of the mechanical operations required to recharge the mechanical postage meter. Funds are entered into the appropriate registers of the system by (1) entering the amount via keyboard and operating a switch accessable only to Postal Authorities, or (2) by means of a remote resetting method similar to that shown in U.S. Pat. No. 3,792,446, issued Feb. 12, 1974.

(d) Setting the postage meter is faster in this inventive system, since the printer is set by electrical signals instead of mechanical levers. Stepping motor and solenoids set the individual banks. Photocells monitor and sense proper printer operation. The solenoids position a driving gear from the stepping motor into engagement with a particular bank of the meter, one bank at a time. Each step of the motor is monitored by a slotted disc and photocells. Every fifth step is checked by a second photocell detecting a slot on the disc which is extra deep. This provides an additional check on the system. Absolute position of each bank is not sensed except at the zero position. Thus, upon initialization of the system, each bank of the printer has to be set to zero in order to establish a reference. Once the reference position has been established, the position of the printer is controlled by the micro computer.

(e) The inventive postage system has means for adding in special charges to the basic postage rate, such as special delivery, certification, and insurance charges.

(f) The funding registers of the invention may be run (but not necessarily so) to a zero balance. All registers (funding or otherwise) are variable in size by means of programming.

(g) As previously mentioned, peripheral equipment can be easily added to this inventive system to expand and amplify its usefulness. The system can be redesigned to the individual needs of the user without having to make costly and intricate changes in the basic equipment, wiring, or circuitry.

It is an object of this invention to provide an improved electronic postage meter system;

It is another object of the invention to provide a postage meter system built around a micro computer set; and It is a further object of the invention to provide an electronic postage meter system which is compact, and which can be easily modified to the individual needs of the user.

These and other objects of the invention will become more apparent and will be better understood with reference to the following detailed description taken in conjunction with the attached drawings, in which:

FIG. 1*a* is a functional block diagram of a micro computerized postage meter system of the present invention;

FIG. 1*b* is a perspective view of the housing for the computerized postage meter of FIG. 1*a;*

FIG. 1*c* is an enlarged plan view of the keyboard display shown in FIG. 1*b;*

FIG. 1*d* is a block diagram of the micro computerized LSI components making up the postage meter system of the invention;

Figure 3:
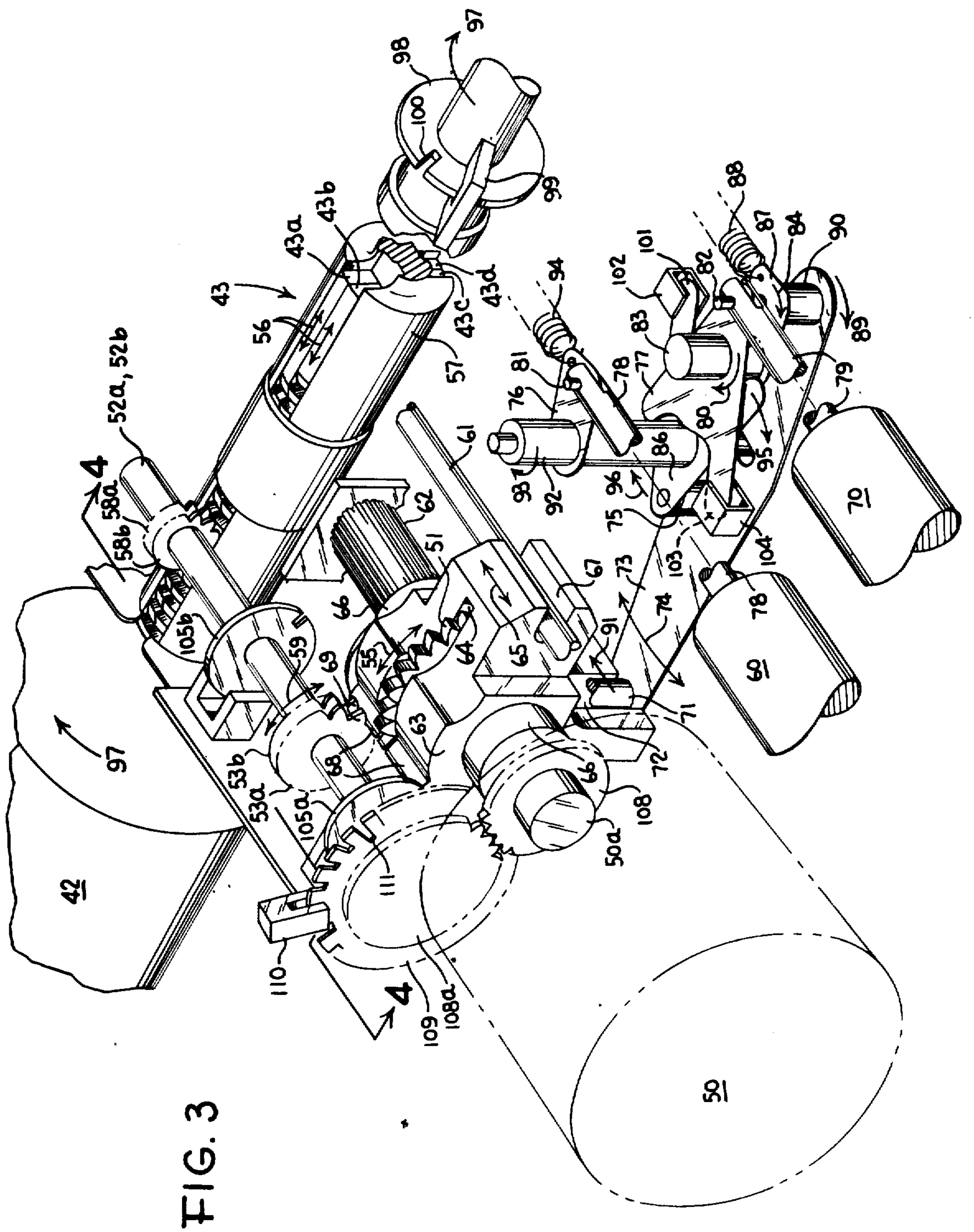
FIG. 3 is a perspective view of the postage setting and printing apparatus for the computerized postage meter system of FIG. 1*d;*
Figure 4A:
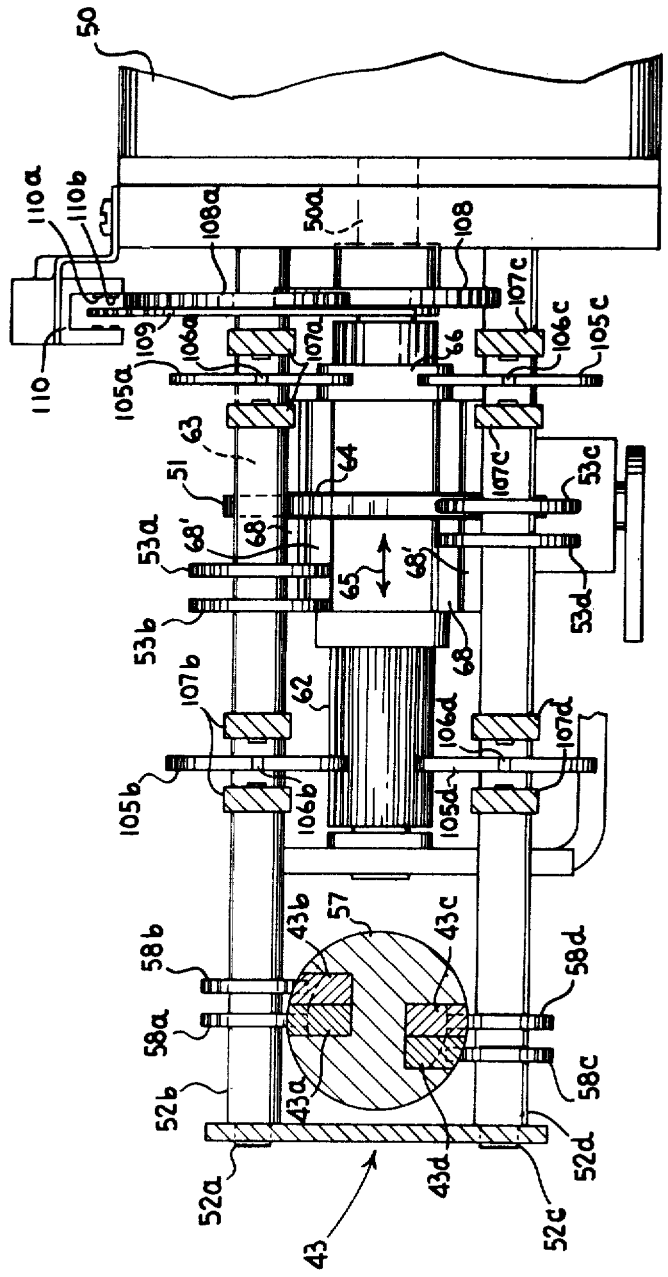
Figure 8A:
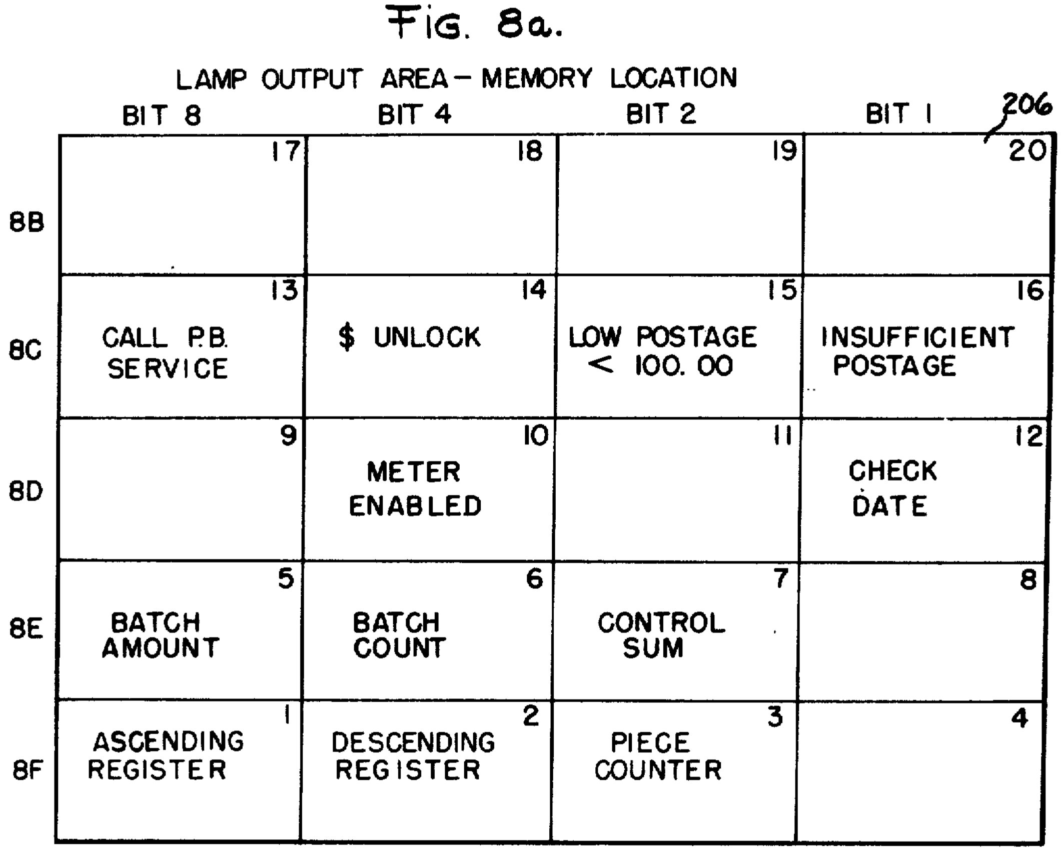
Figure 6:
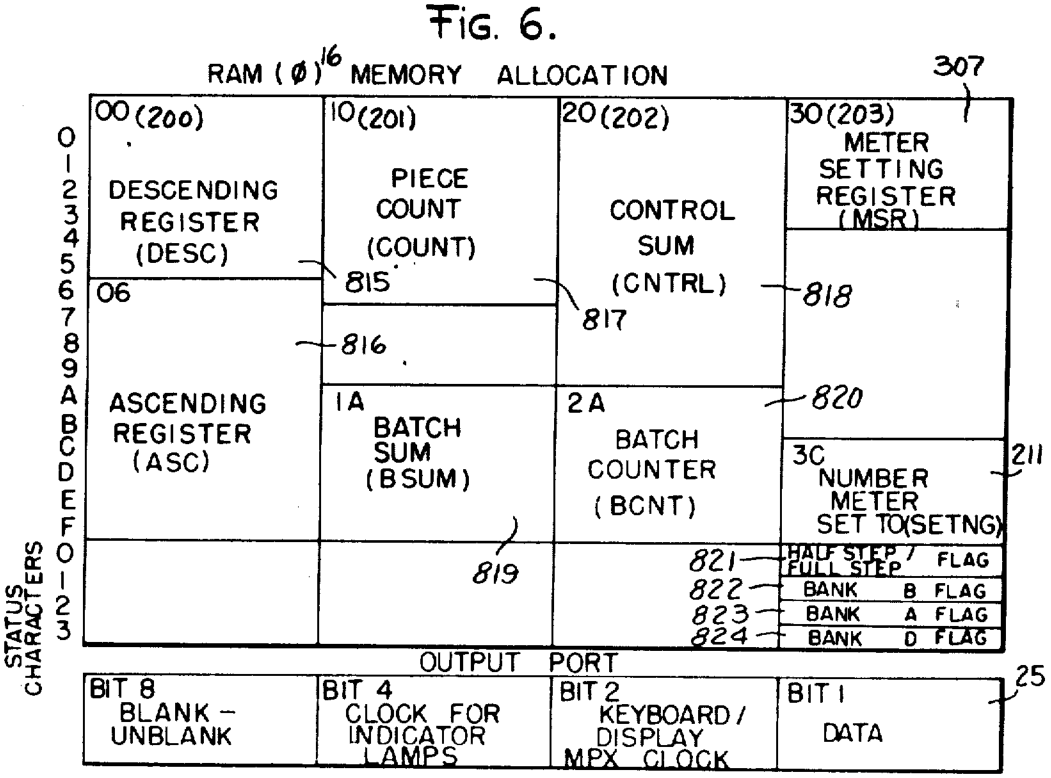
Figure 7:
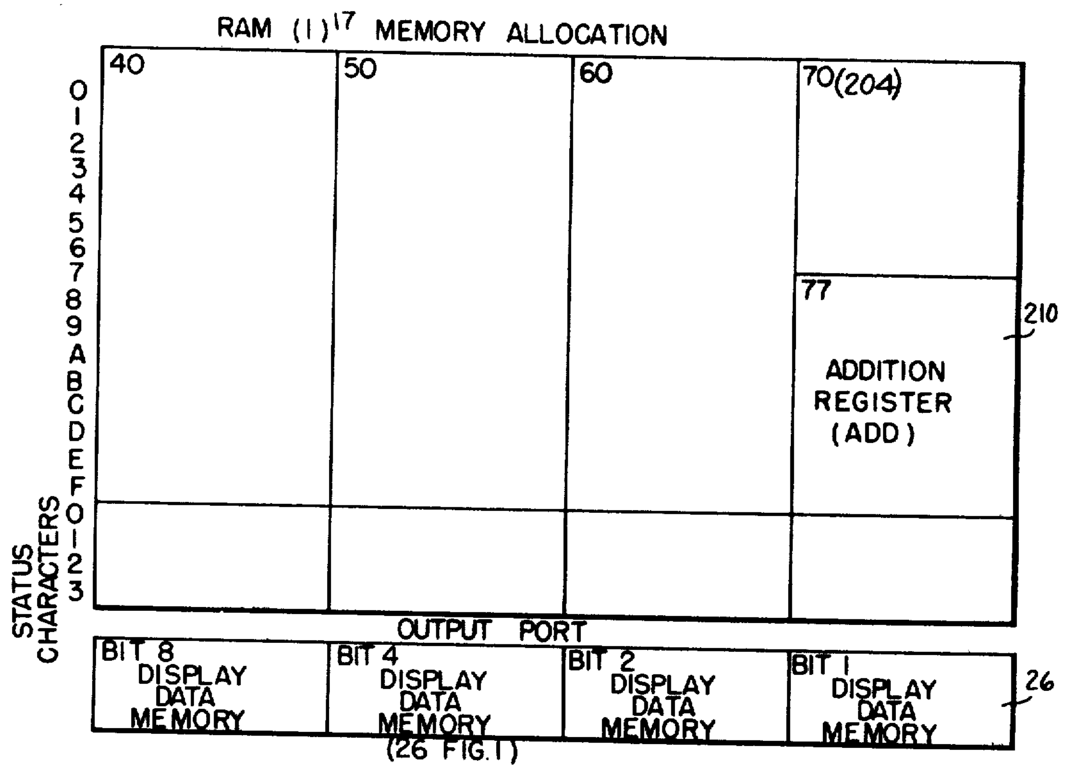
Figure 8:
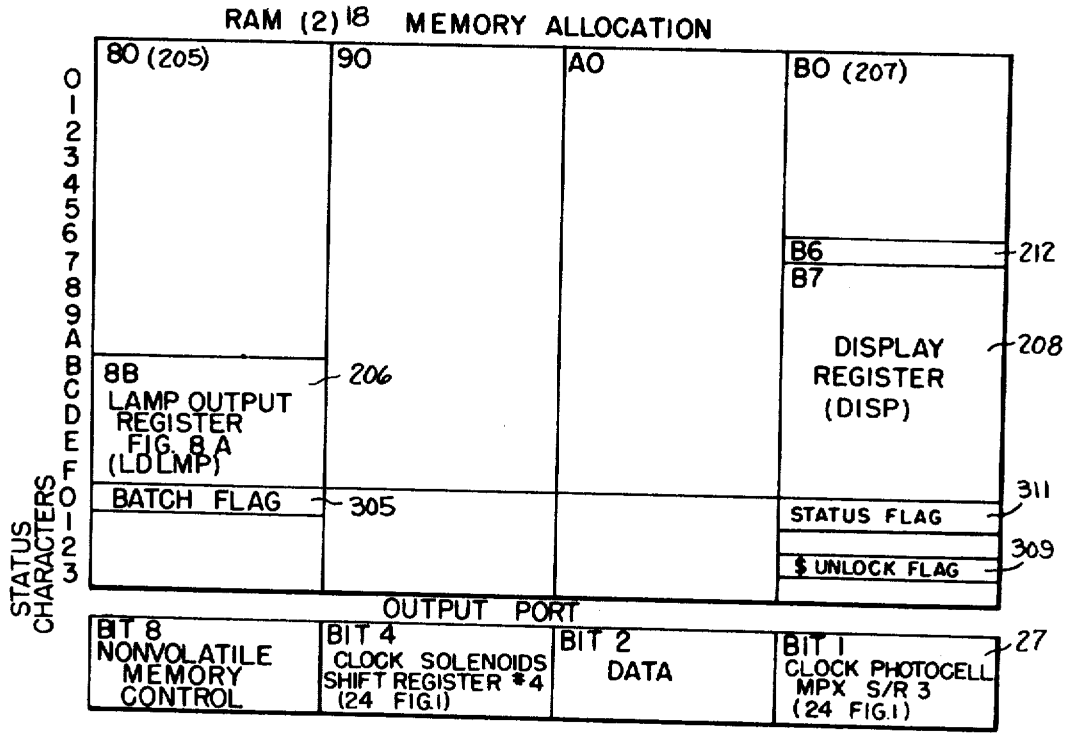
Figure 9:
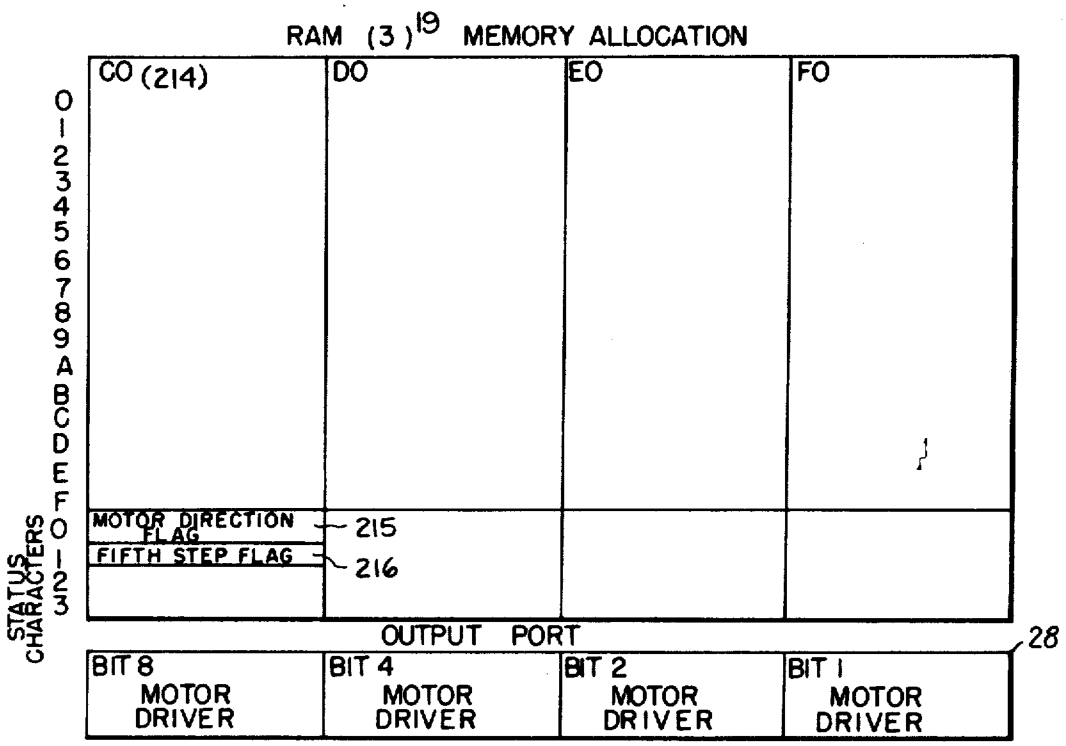
Figure 10:
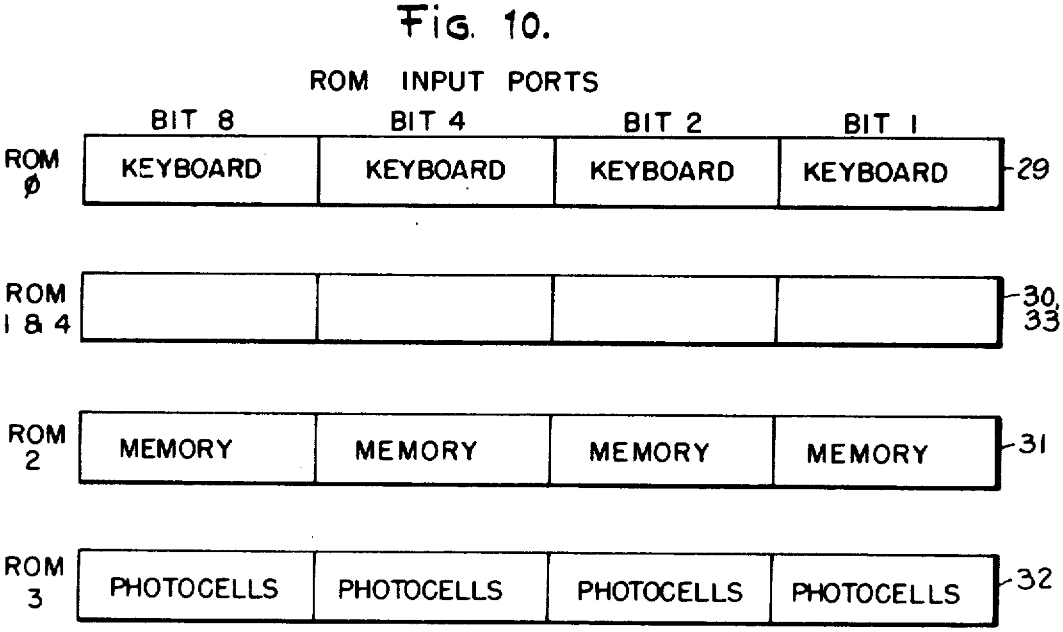

FIG. 4*a* is a side view of the setting and printing apparatus of FIG. 3 as taken along lines 4—4;

FIG. 4*b* is an enlarged partially cutaway perspective view of the yoke, main gear, and splined shaft of the setting mechanism of FIG. 3;

FIG. 5 is a front view of FIG. 4*a* with a section cutaway to show the intermeshing relationships between various geared parts;

FIG. 6 is a schematic view of the memory allocation shown for RAM($\phi$)16 of FIG. 1*d* and its associated output port;

FIG. 7 is a schematic view of the memory allocation depicted for RAM(1)17 of FIG. 1*d* and its associated output port;

FIG. 8 is a schematic view of the memory allocation illustrated for RAM(2)18 of FIG. 1*d* and its associated output port;

FIG. 8*a* is a more detailed schematic view of a portion of the memory allocation shown in FIG. 8;

FIG. 9 is a schematic view of the memory allocation shown for RAM(3)19 of FIG. 1*d* and its associated output port;

FIG. 10 is a schematic view of the ROM input ports of FIG. 1*d;*

Figure 2:
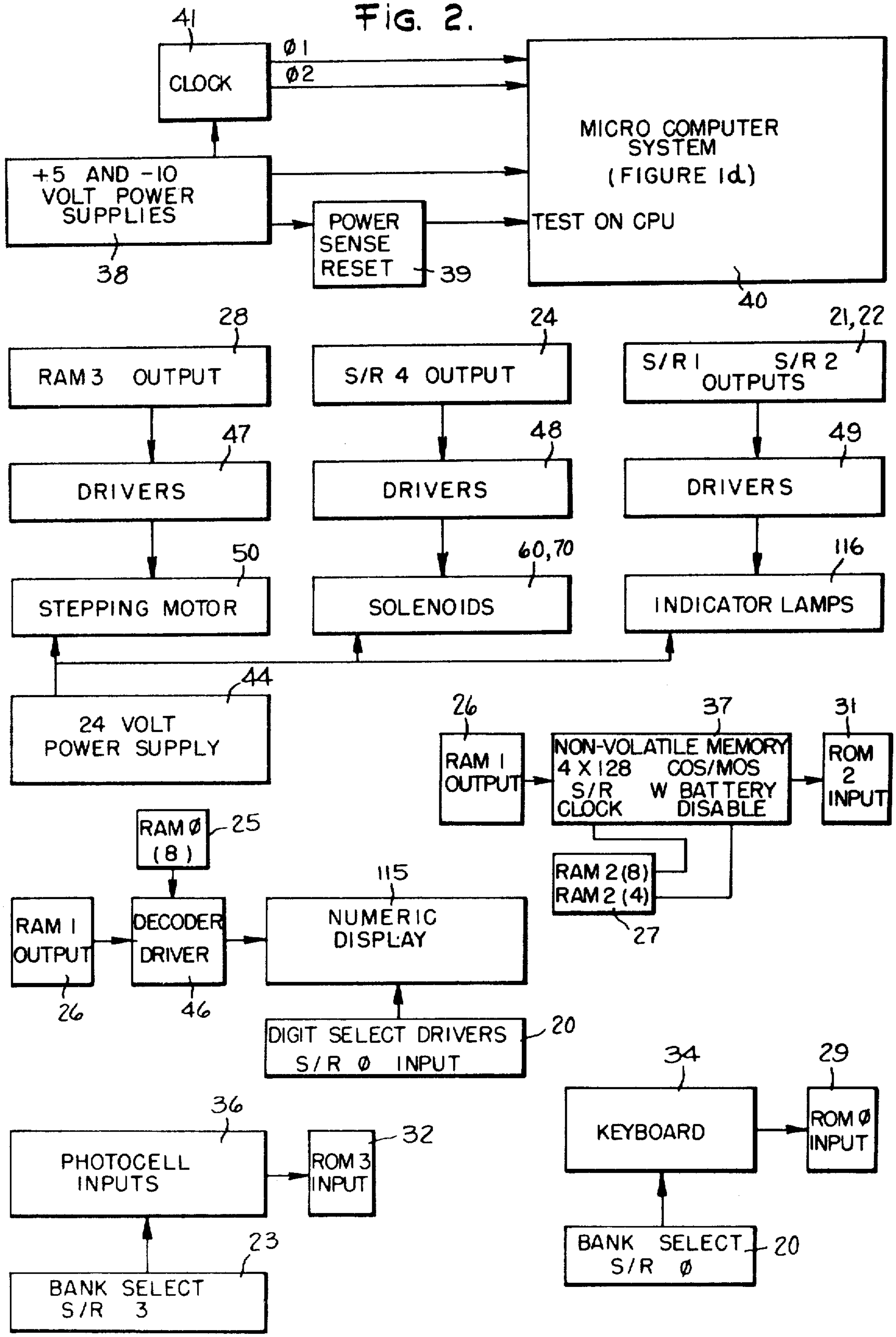
FIG. 2 is a block diagram of the peripheral components for the computer system of FIG. 1*d;*
Figure 11:
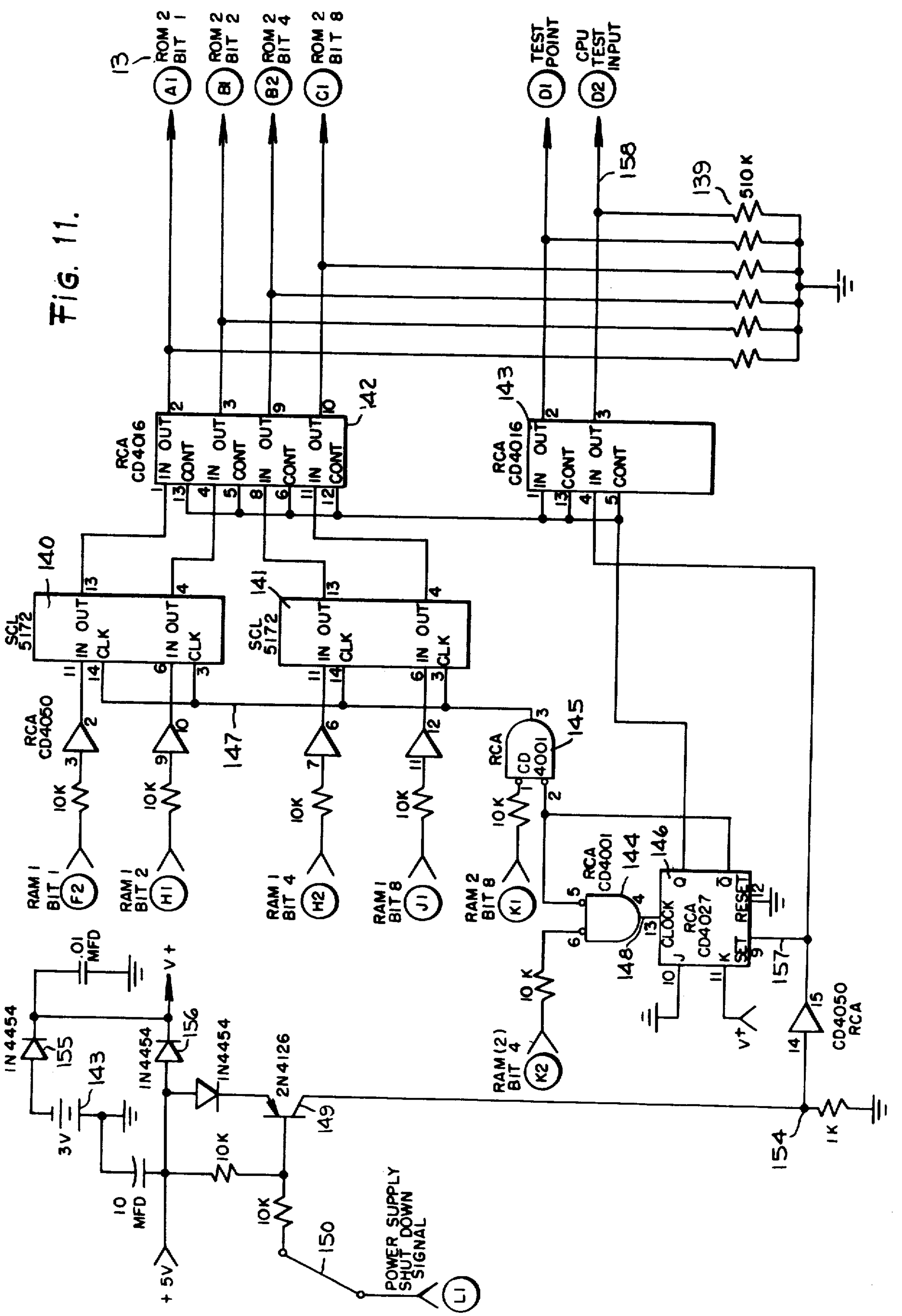
Figure 12A:
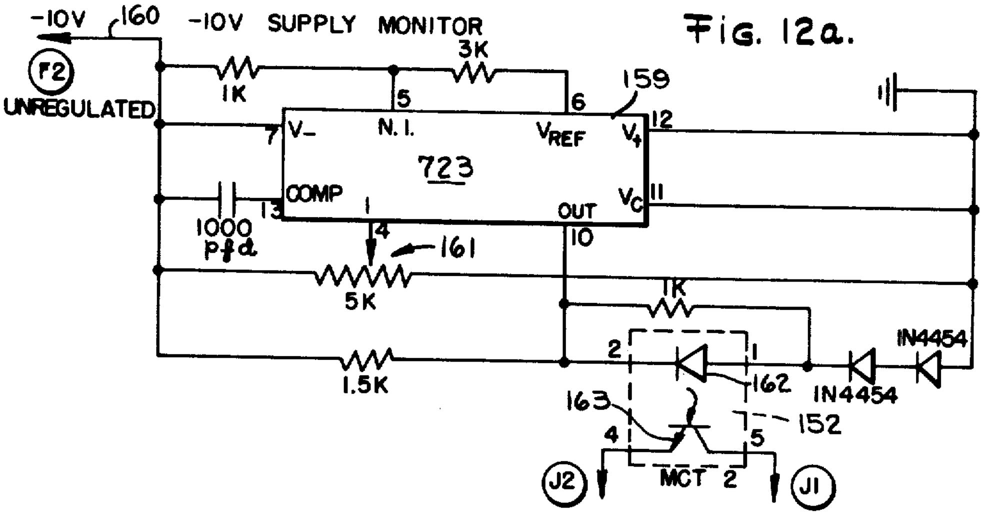

FIG. 11 is an electrical schematic for the non-volatile memory circuitry of FIG. 2;

FIG. 12*a* is an electrical schematic of the monitoring circuit for the −10 volt power supply for the system of FIG. 1*d;*

Figure 12B:
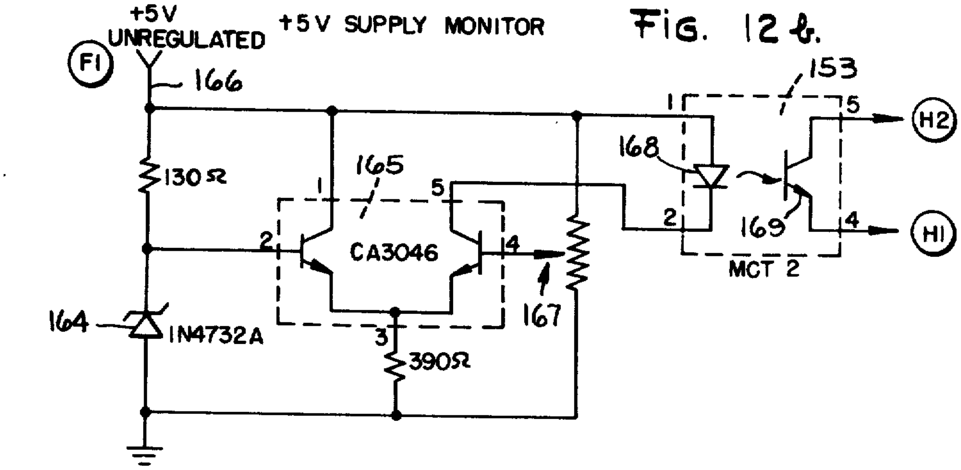

FIG. 12*b* is an electrical schematic of the monitoring circuit for the +5 volt power supply for the system of FIG. 1*d;*

Figure 13:
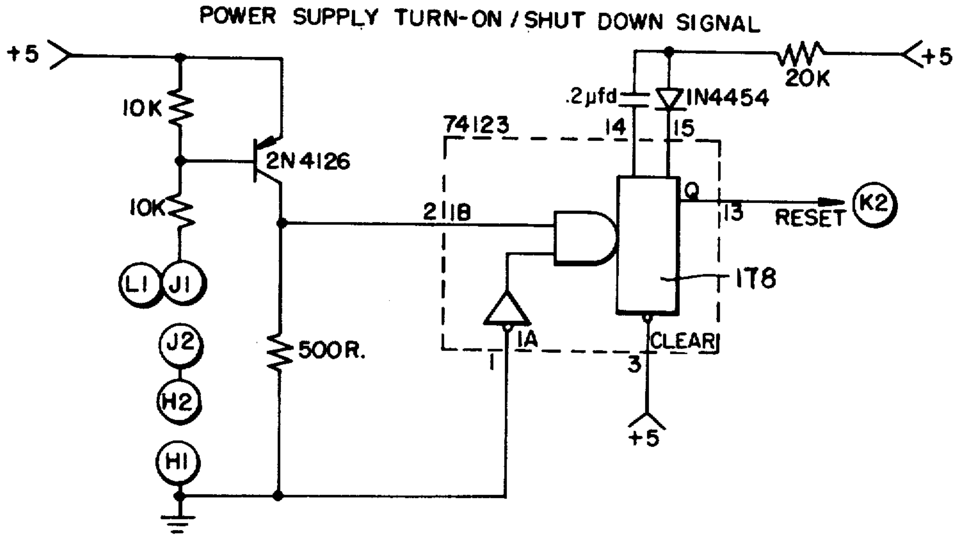

FIG. 13 is an electrical schematic of the reset circuitry for the system of FIG. 1*d;*

Figure 14B:
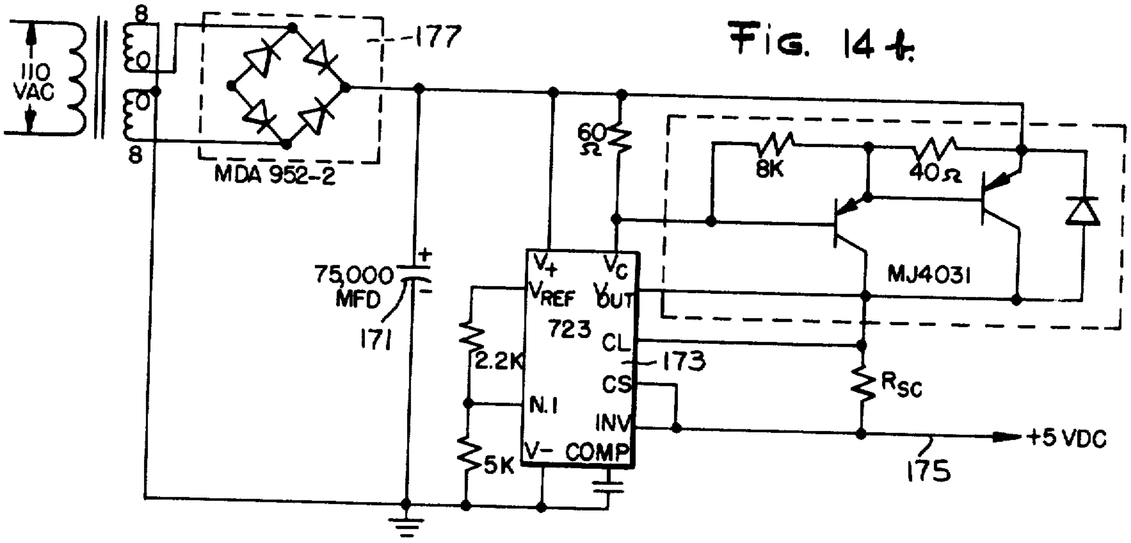
Figure 14A:
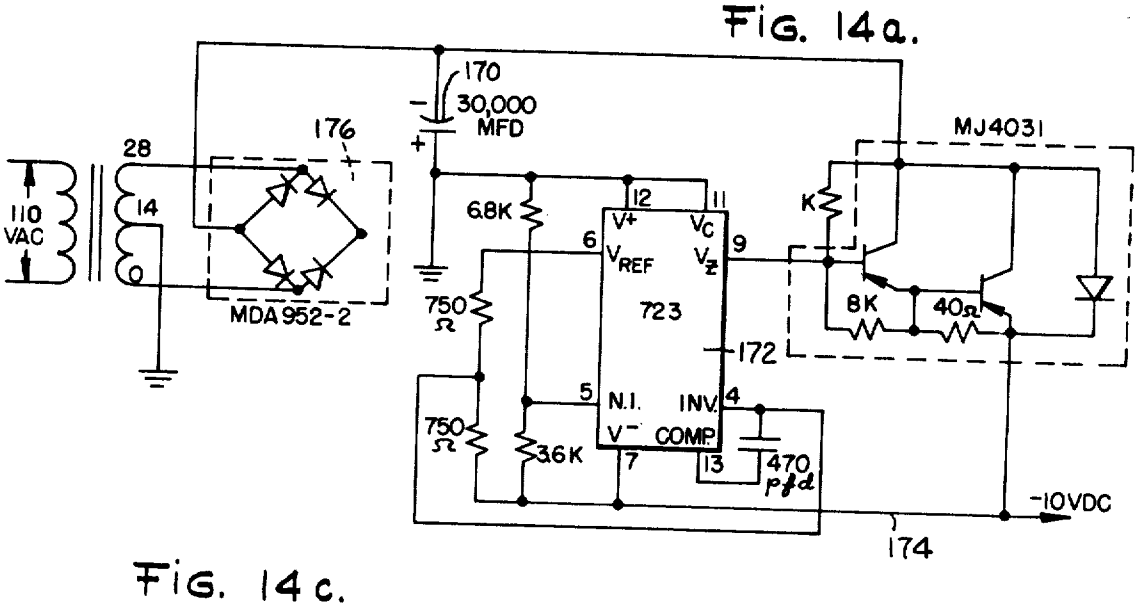

FIG. 14*a* is an electrical schematic for the −10 volt power supply for the system of FIG. 1*d;*

FIG. 14*b* is an electrical schematic for the +5 volt power supply for the system of FIG. 1*d;*

Figure 1A:
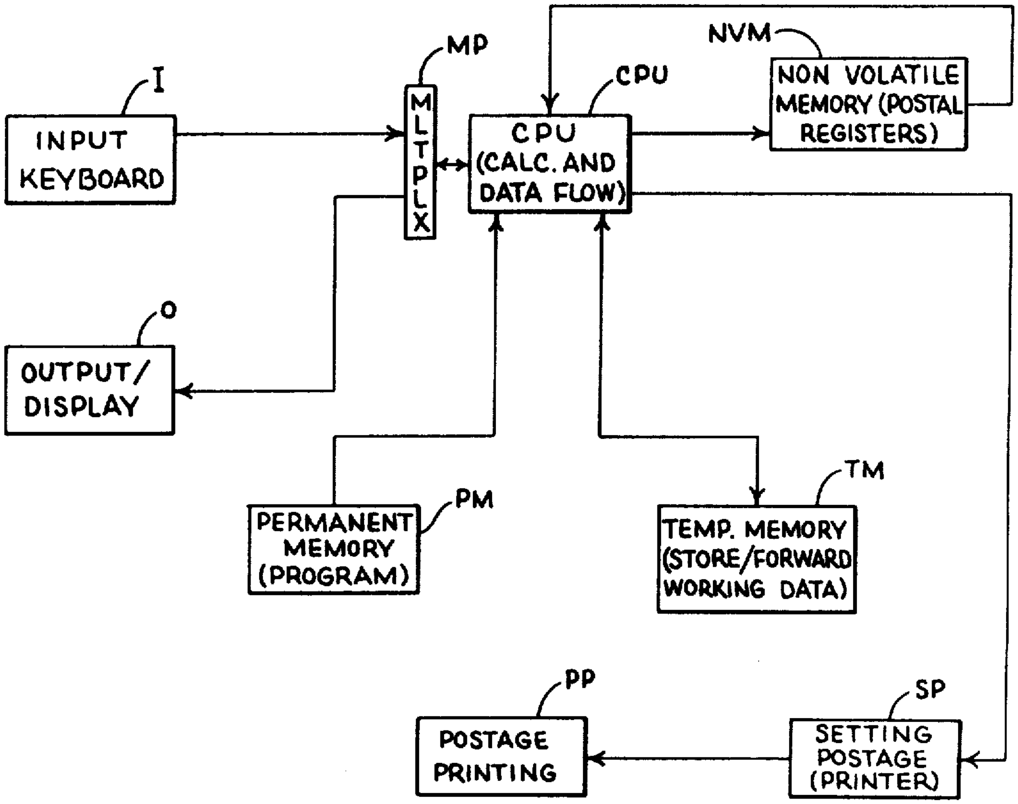
Figure 1B:
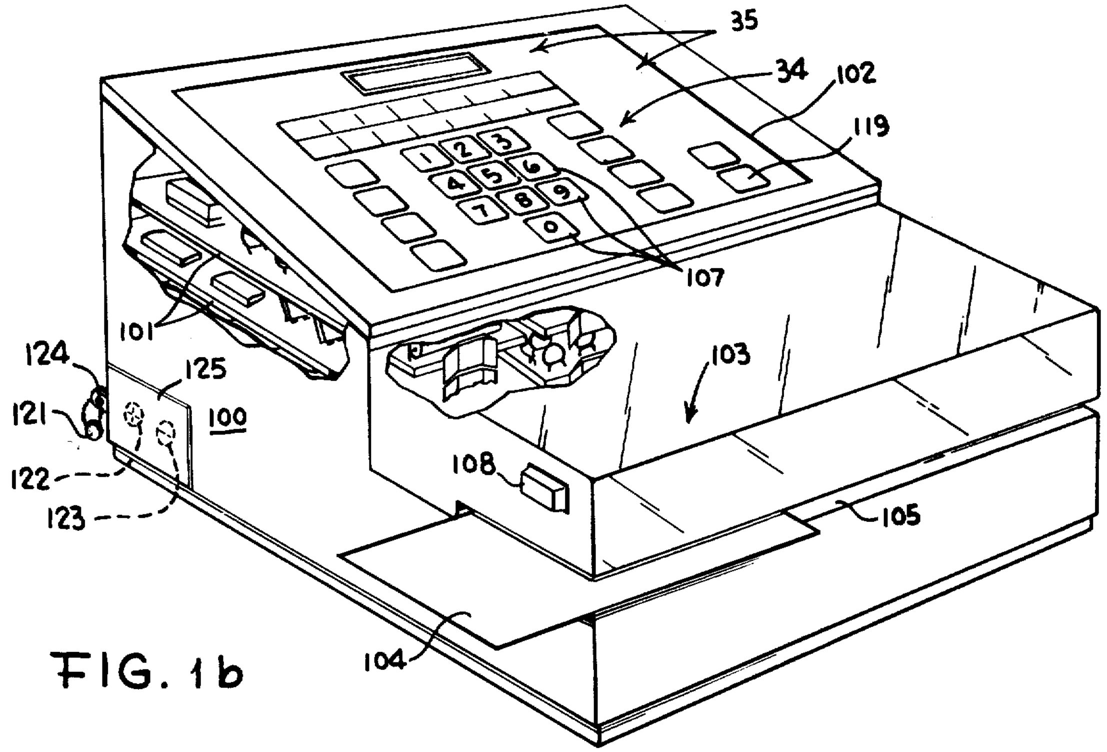
Figure 1C:
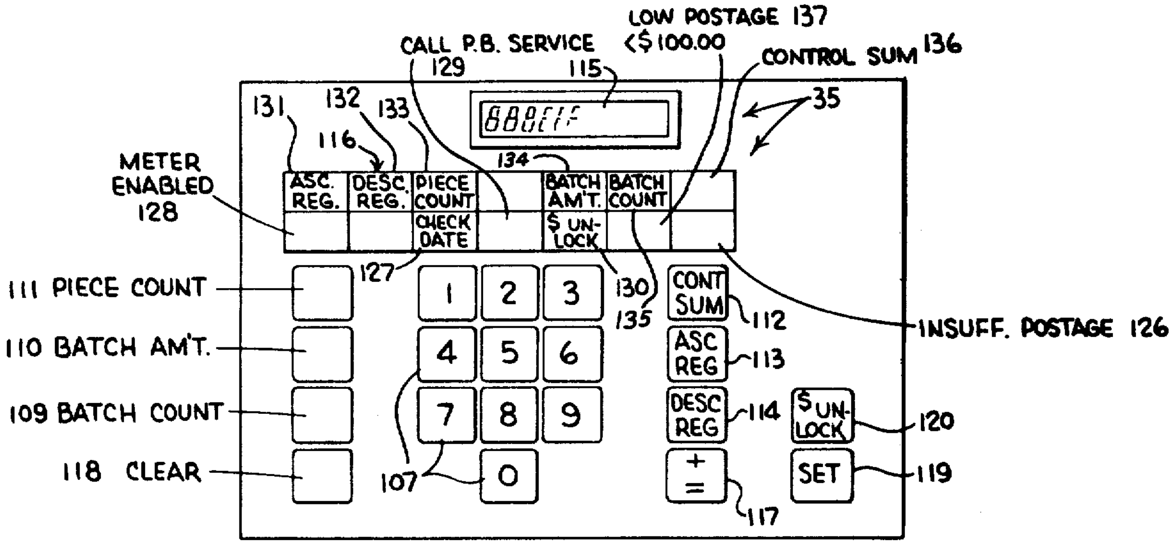
Figure 14C:
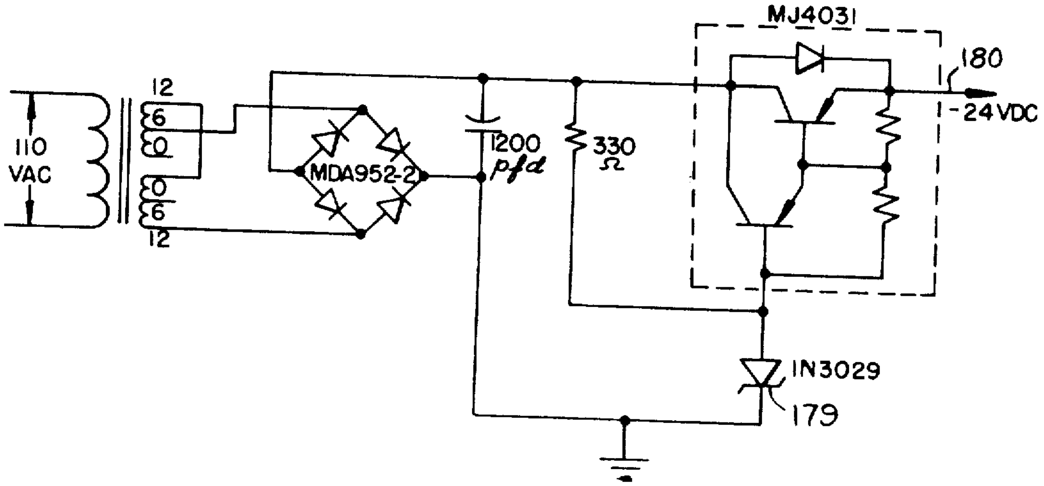
Figure 15:
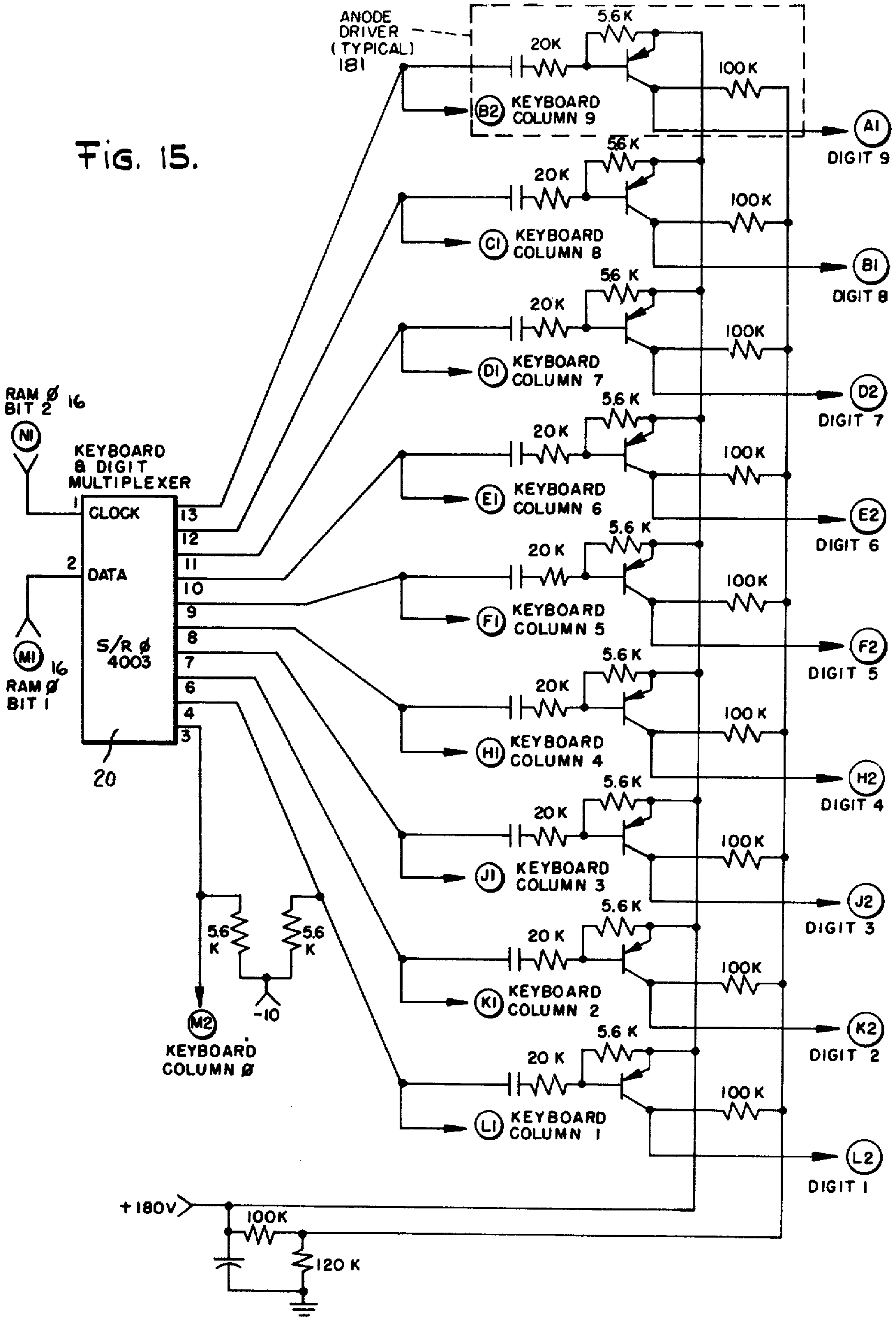
Figure 16:
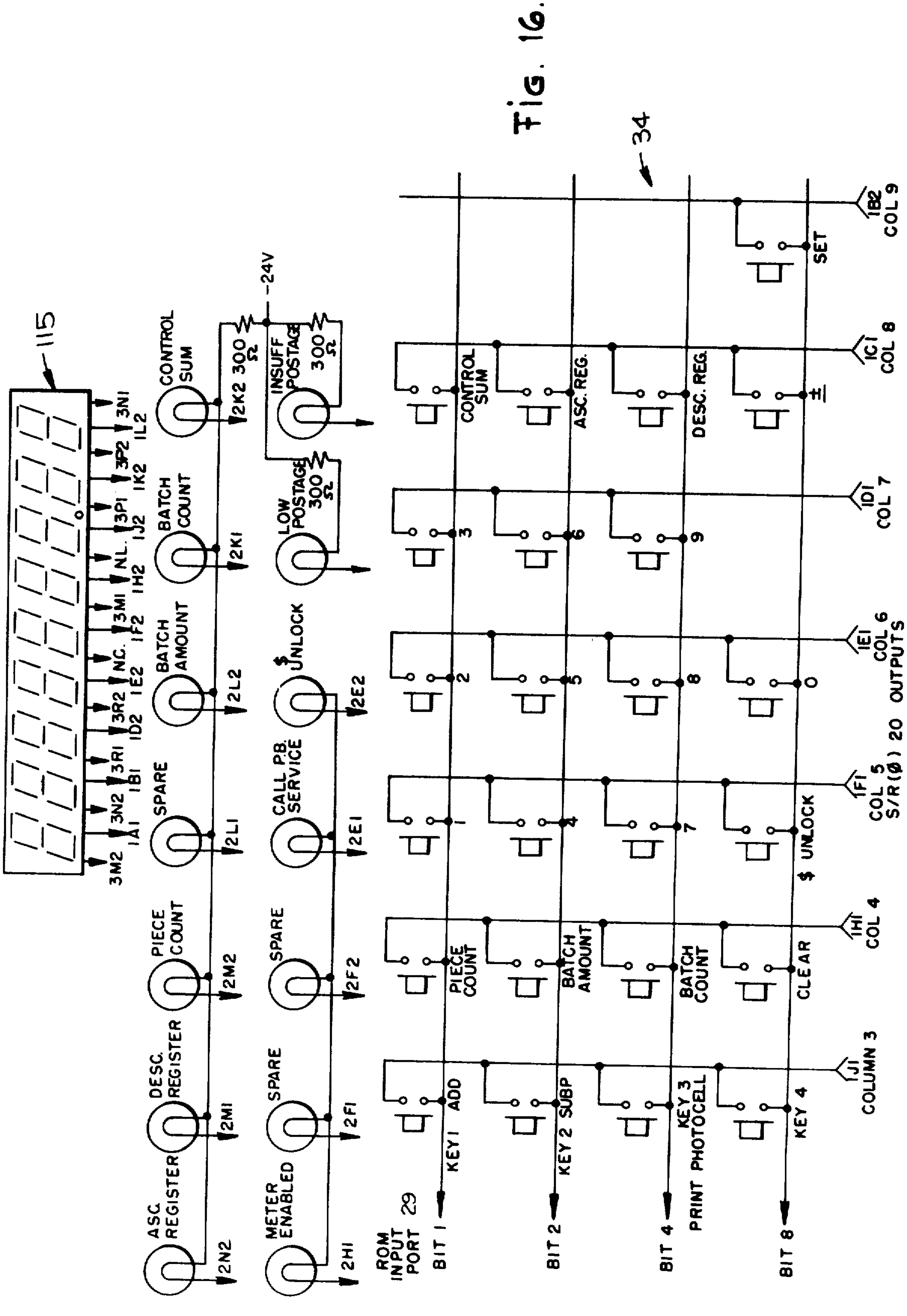
Figure 17:
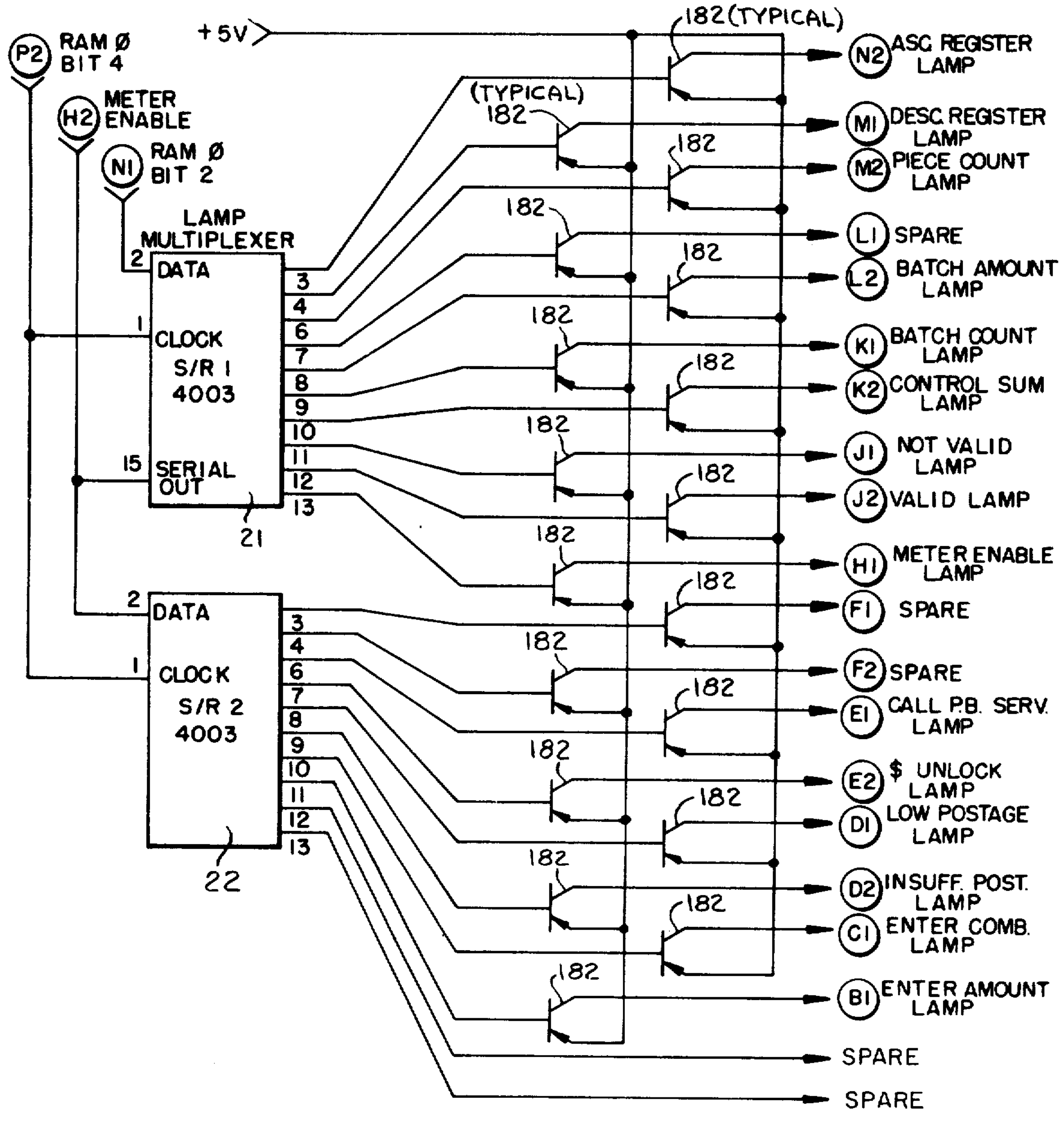
Figure 18:
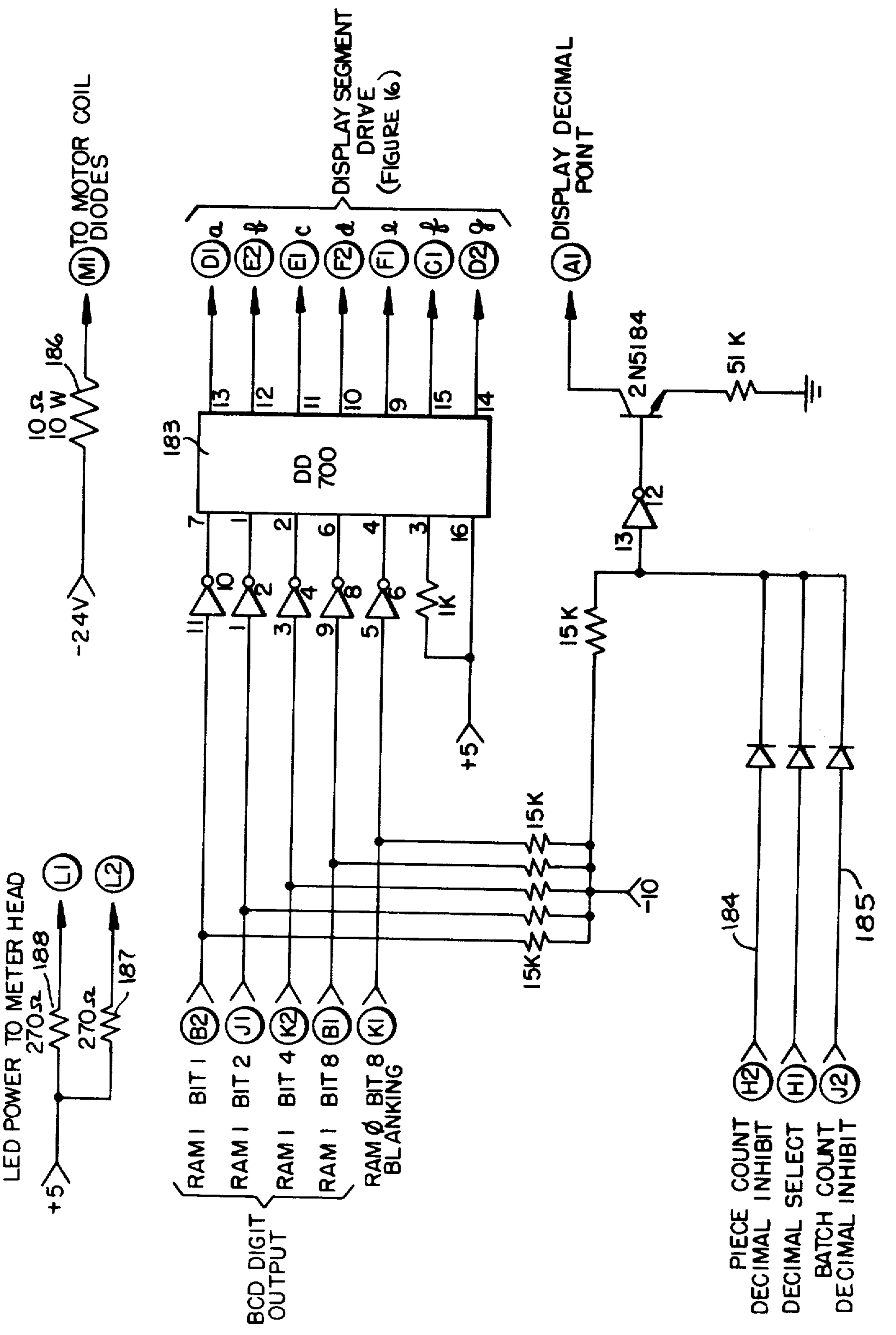
Figure 19:
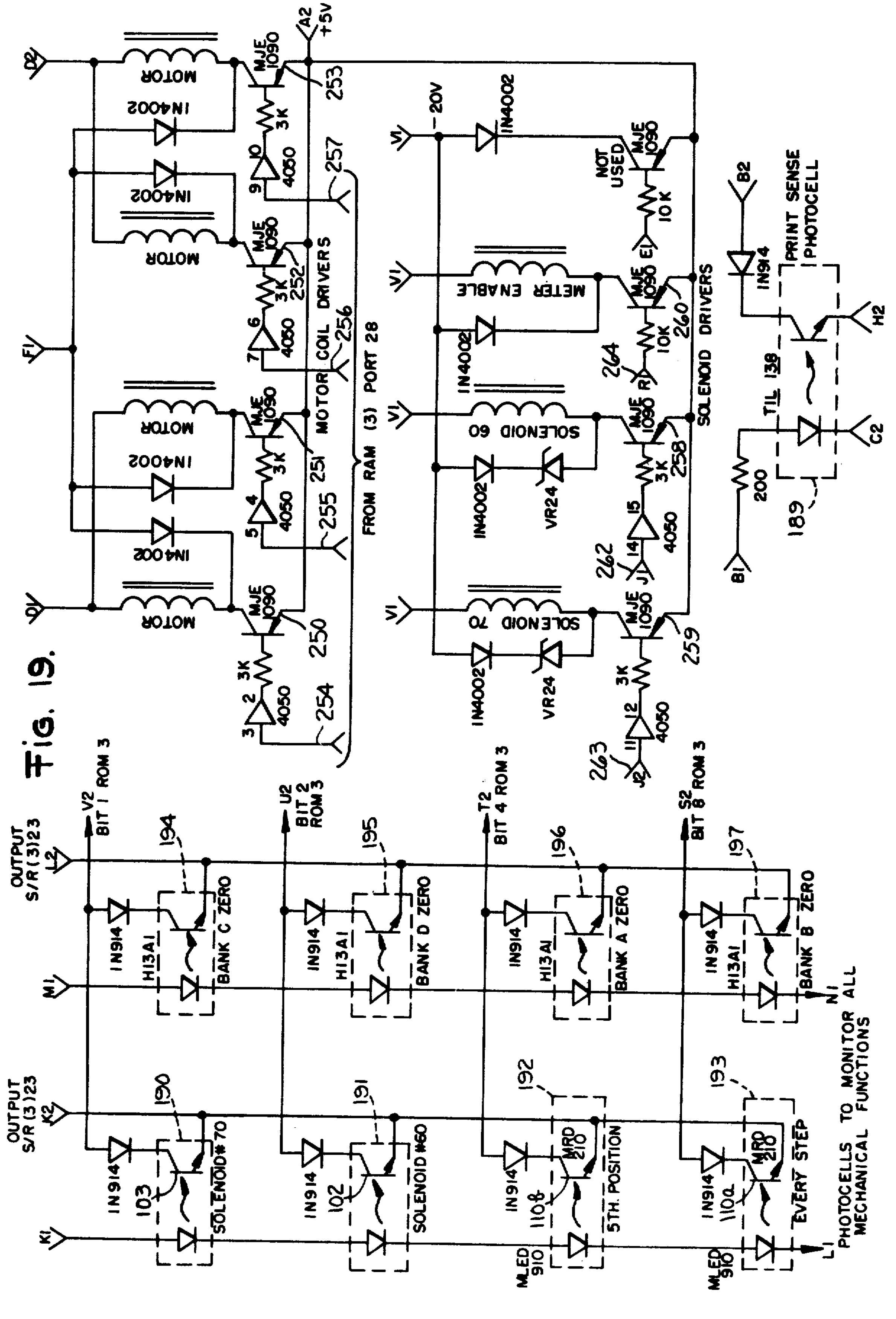
Figure 20:
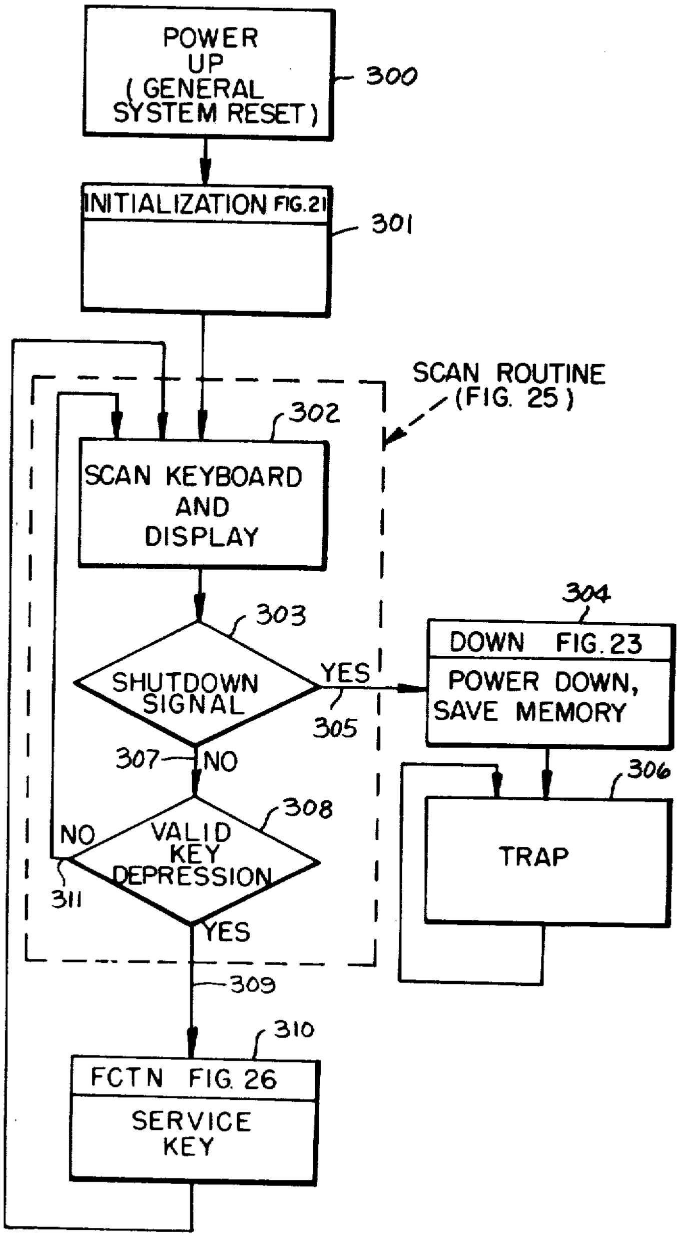
Figure 21:
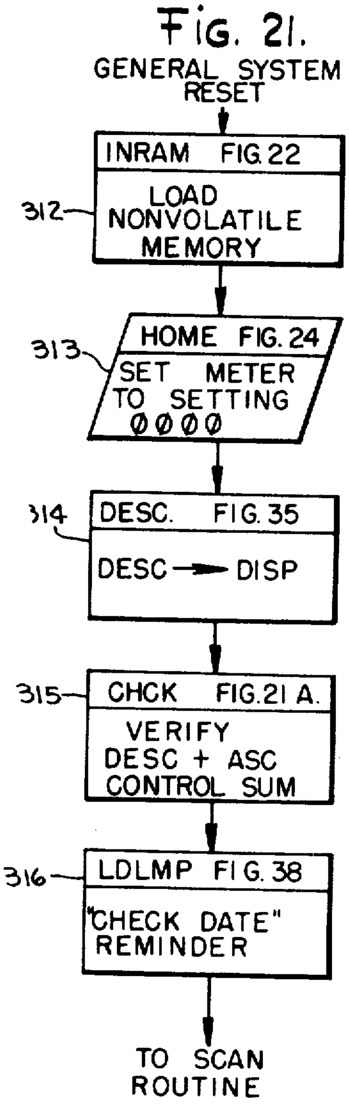
Figure 21A:
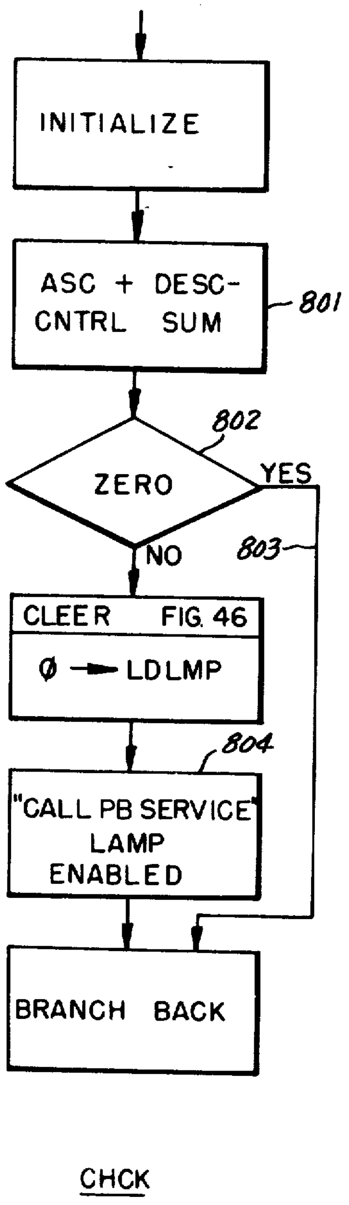
Figure 22:
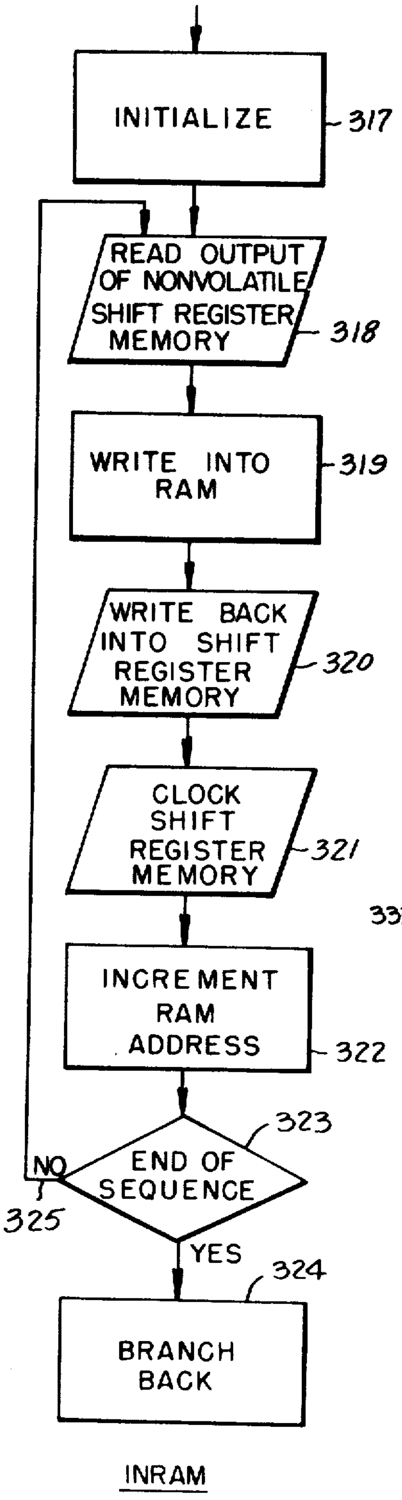
Figure 23:
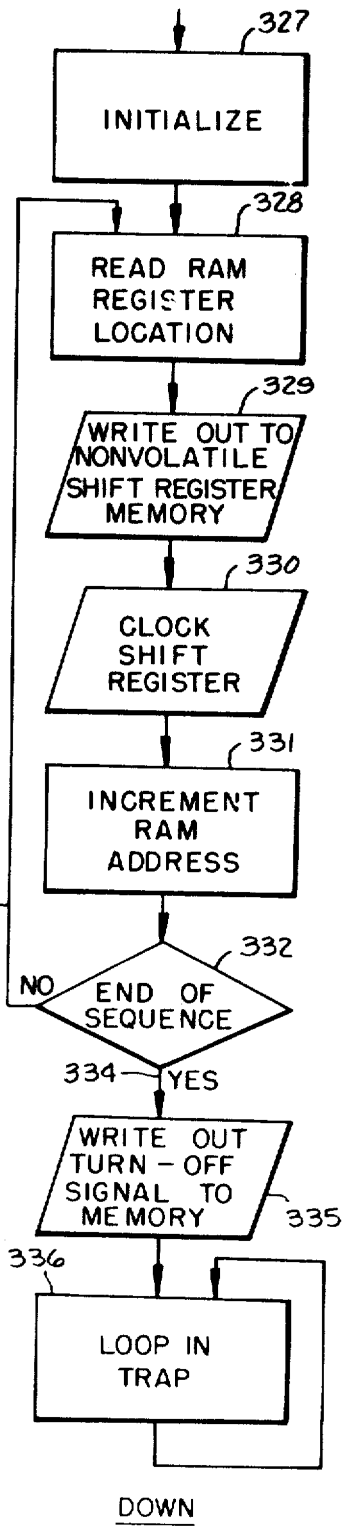
Figure 24:
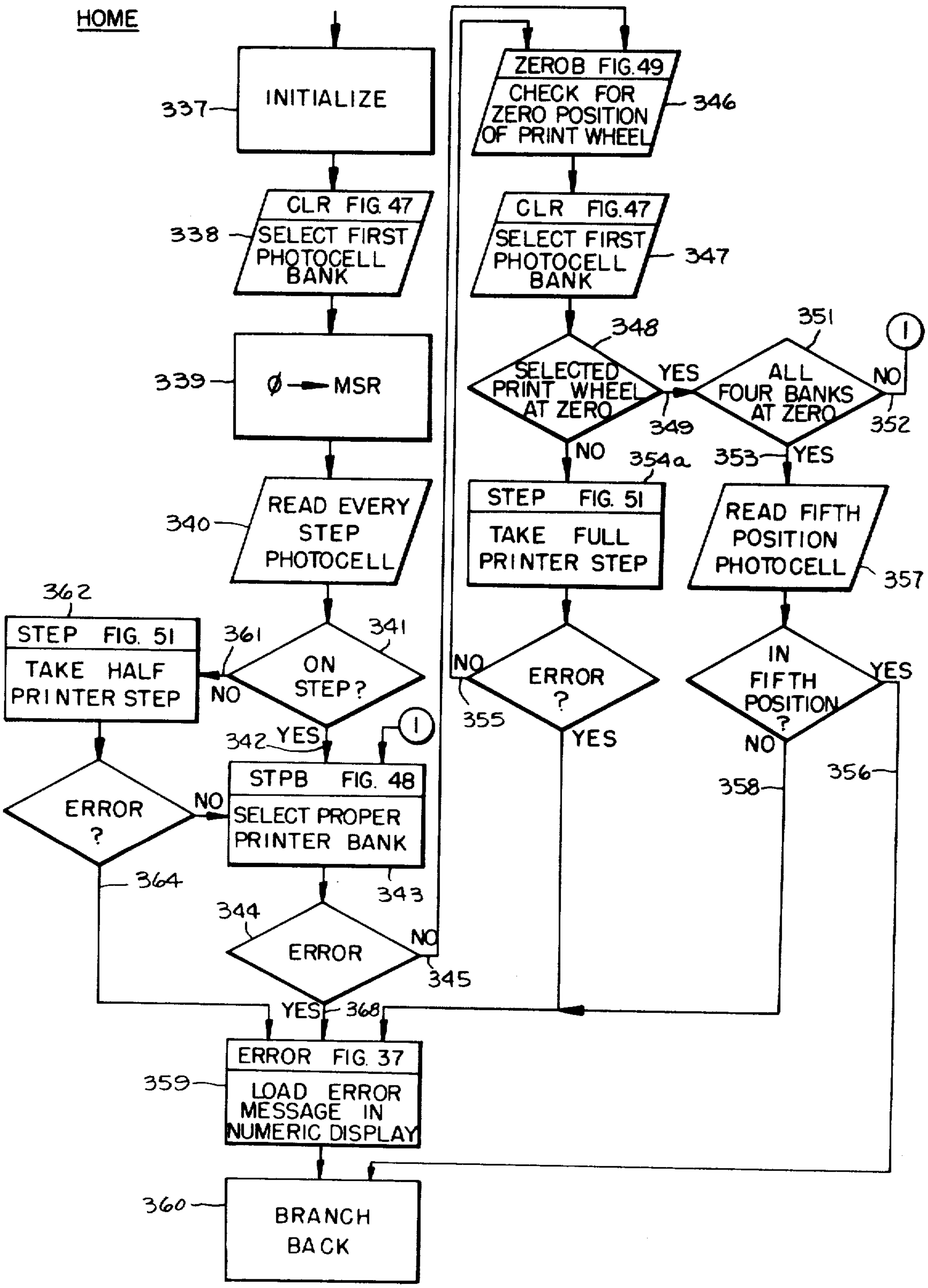
Figure 28:
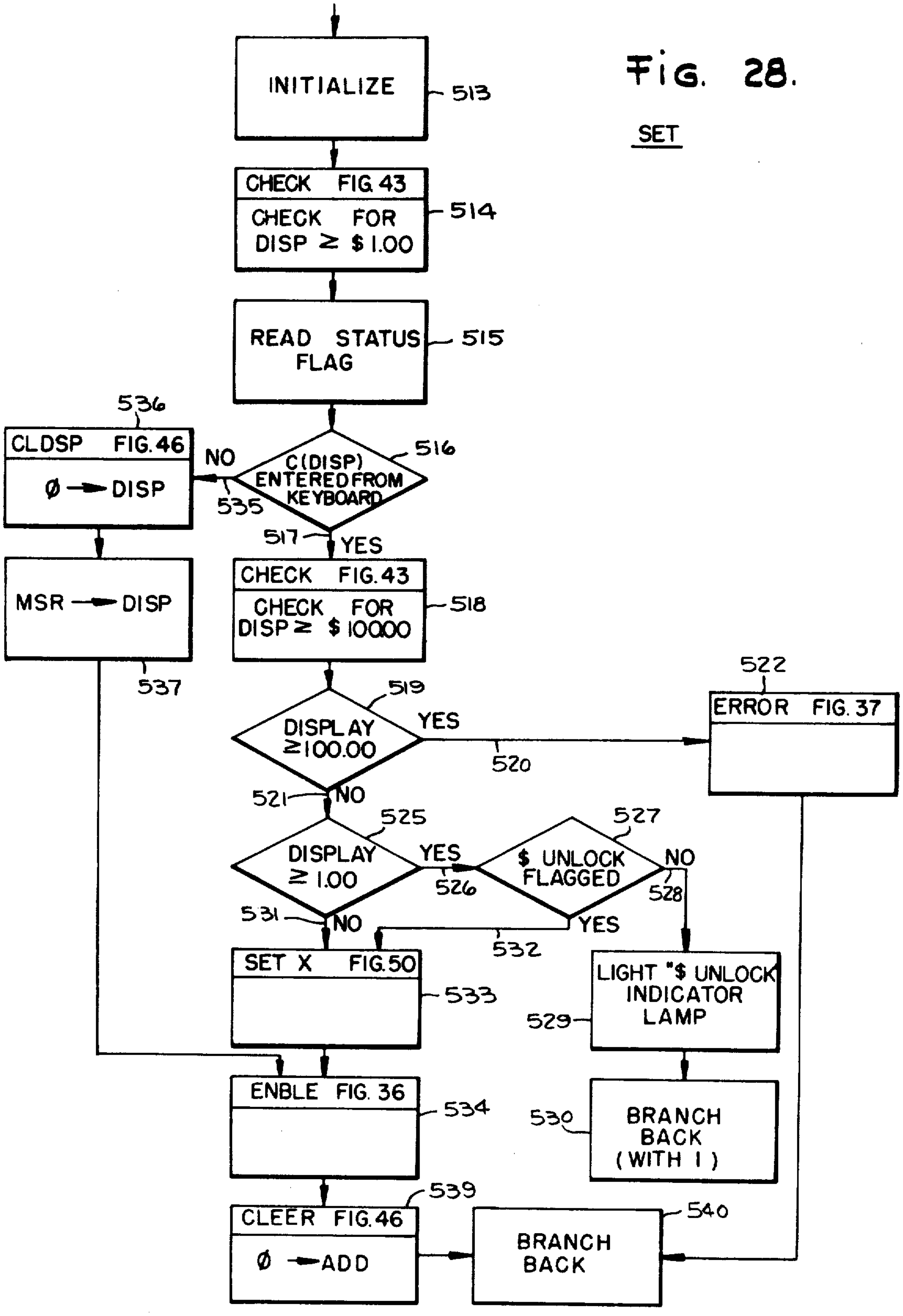
Figure 31:
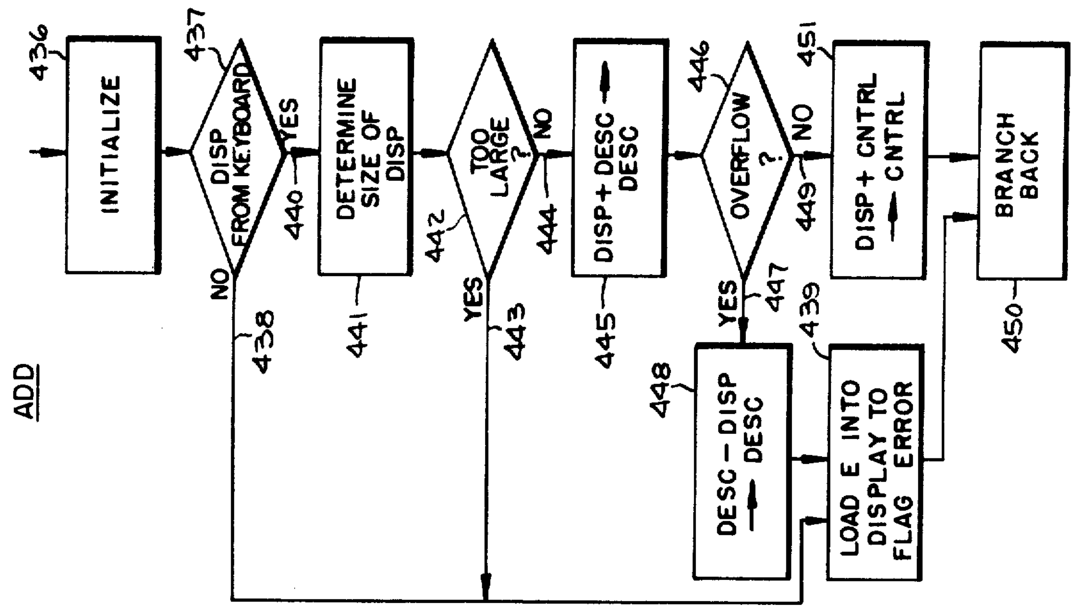
Figure 30:
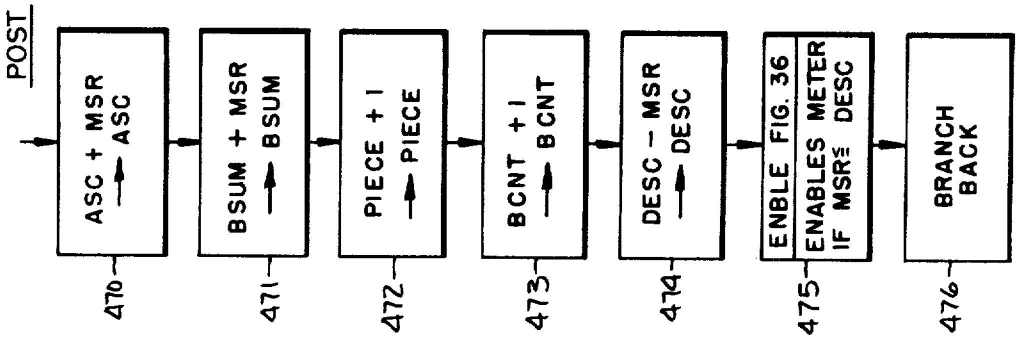
Figure 29:
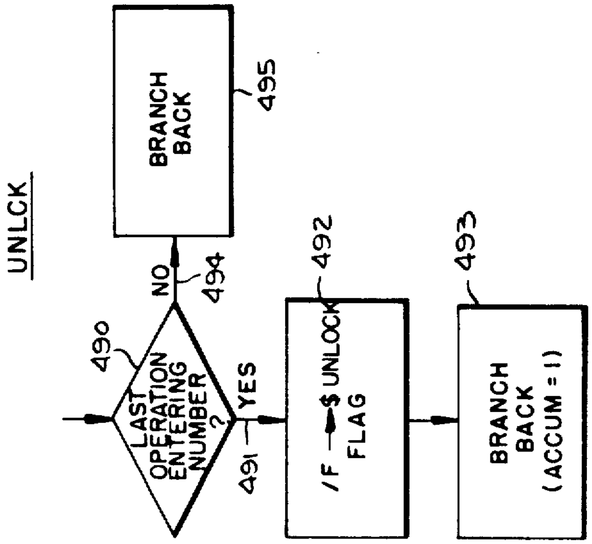
Figure 32:
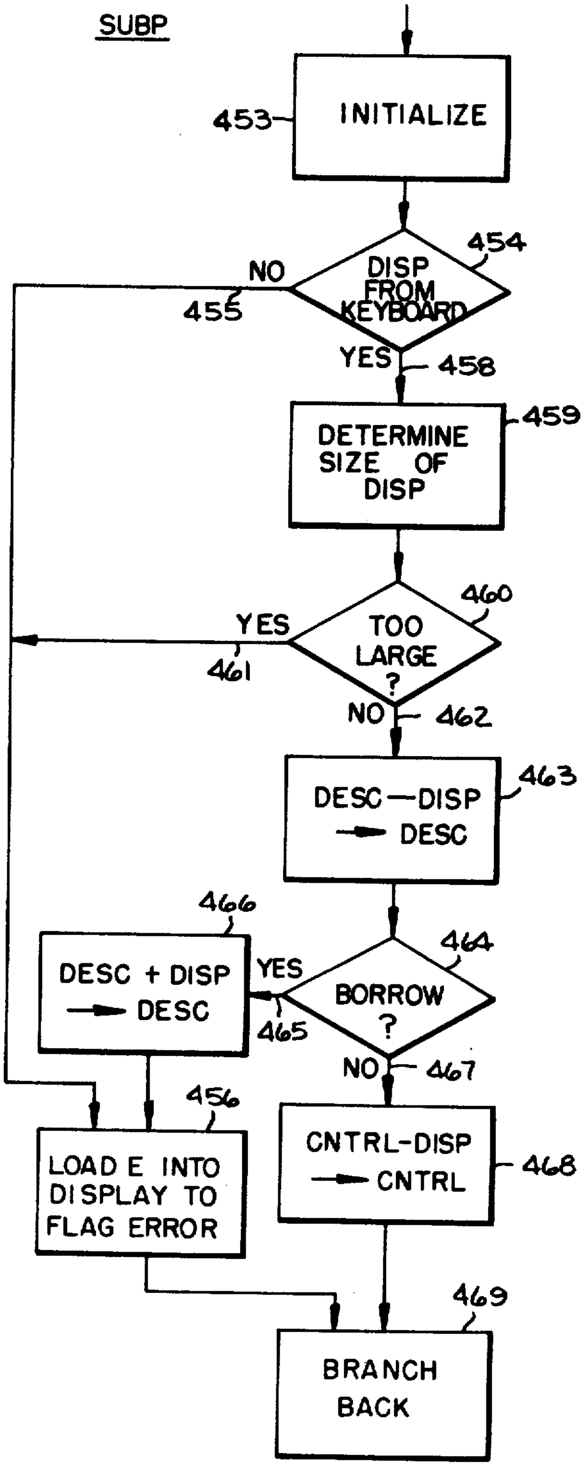
Figure 33:
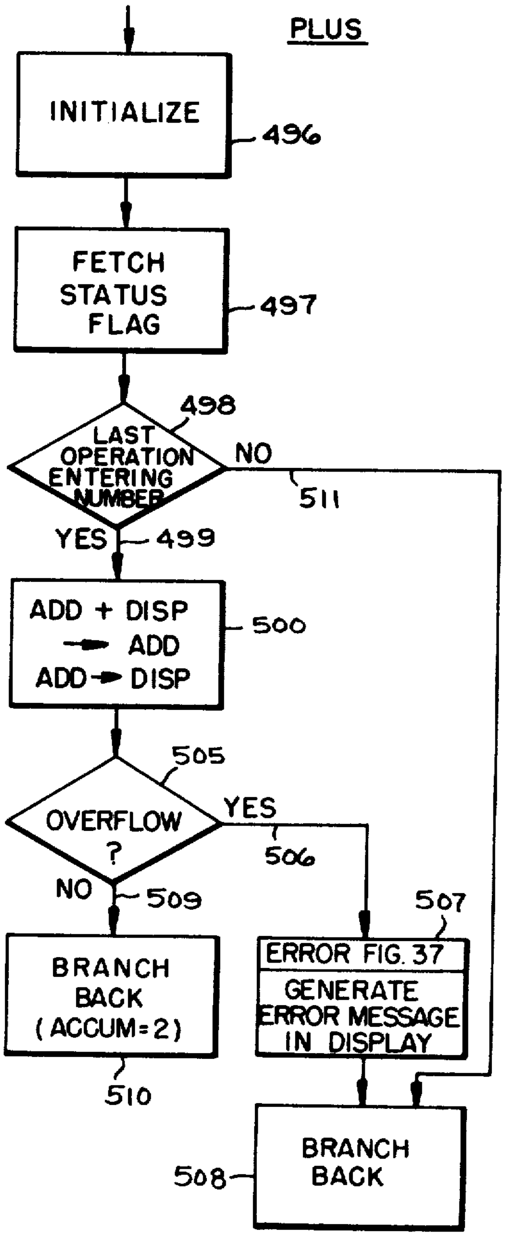
Figure 36:
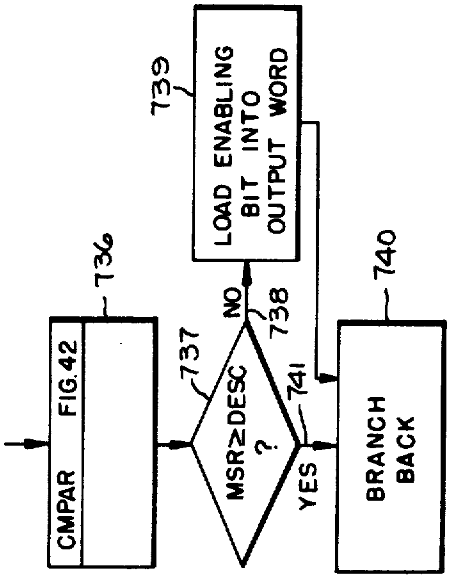
Figure 35:
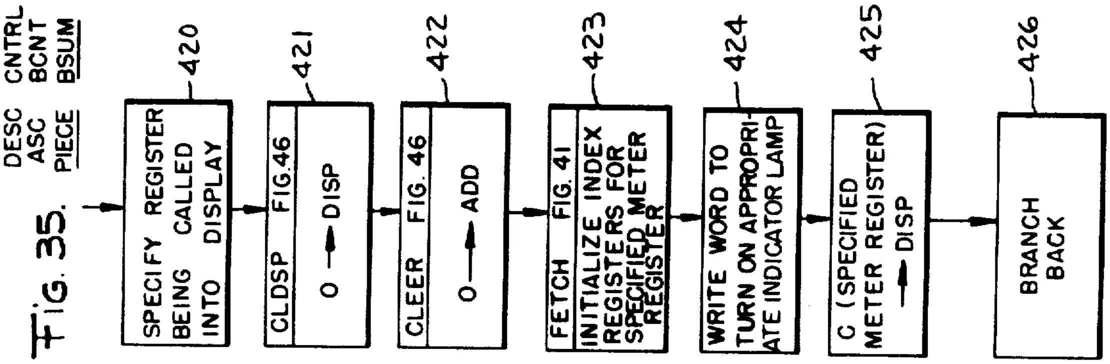
Figure 34:
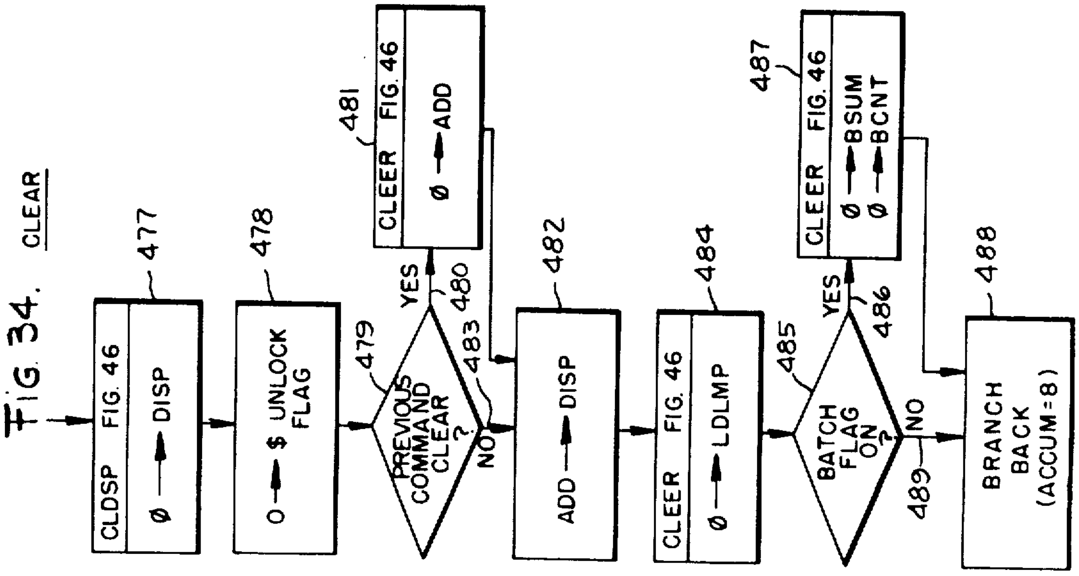
Figure 37:
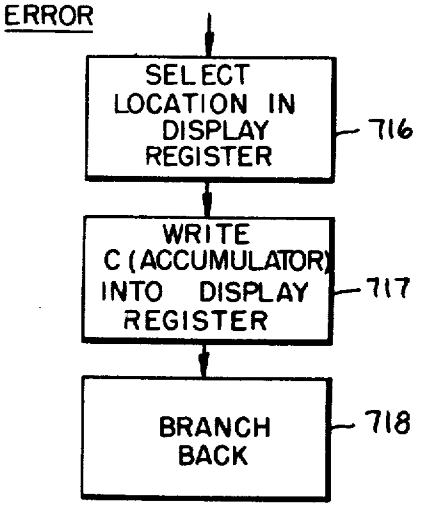
Figure 39:
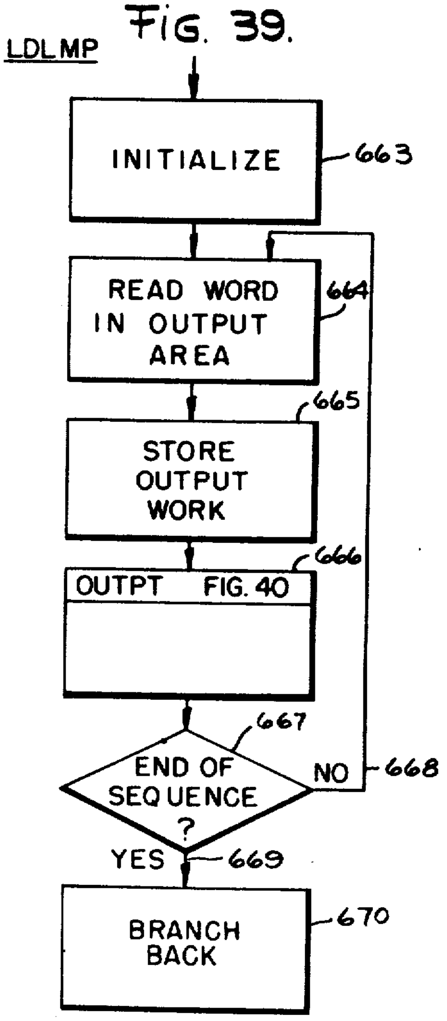
Figure 40:
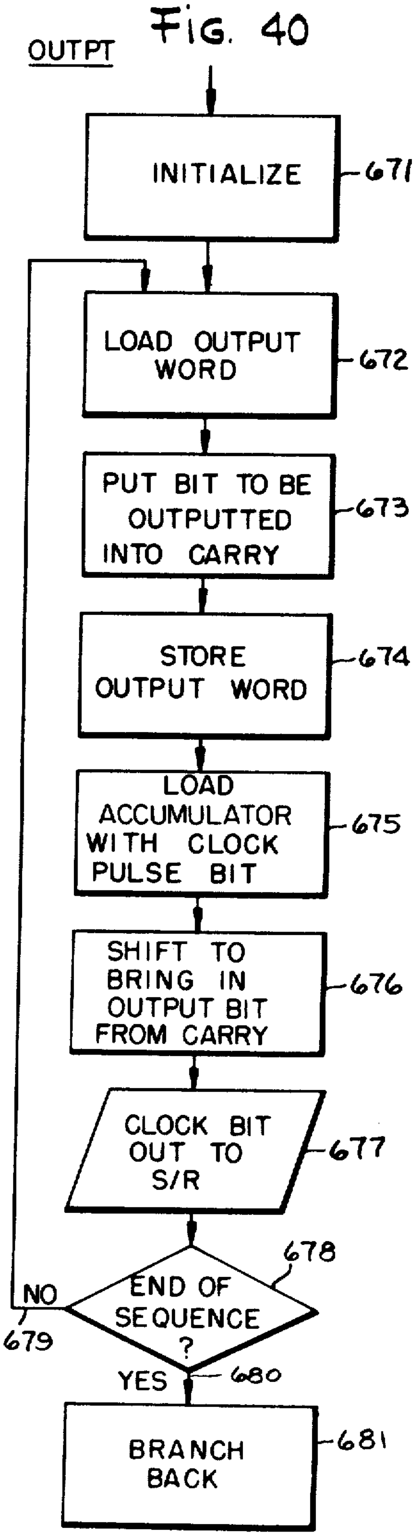
Figure 43:
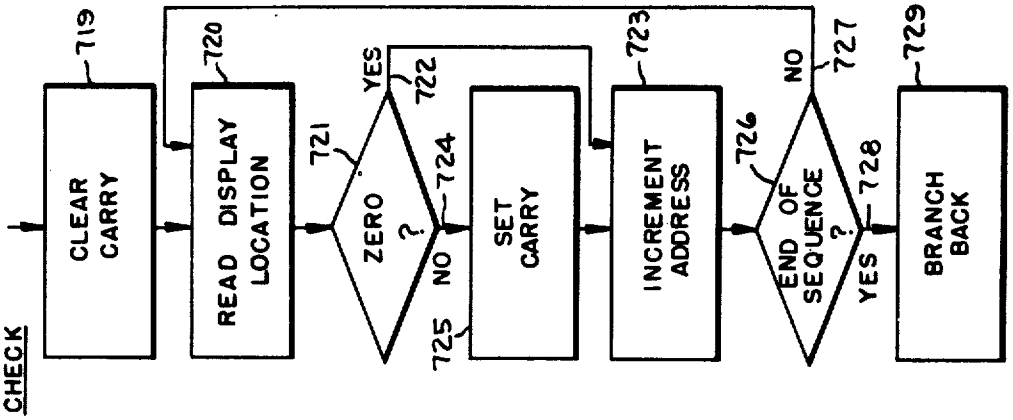
Figure 42:
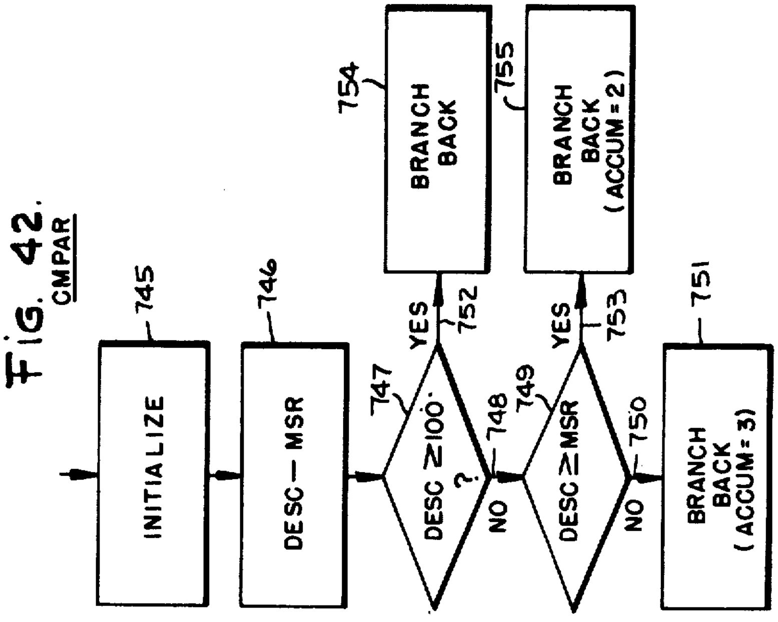
Figure 41:
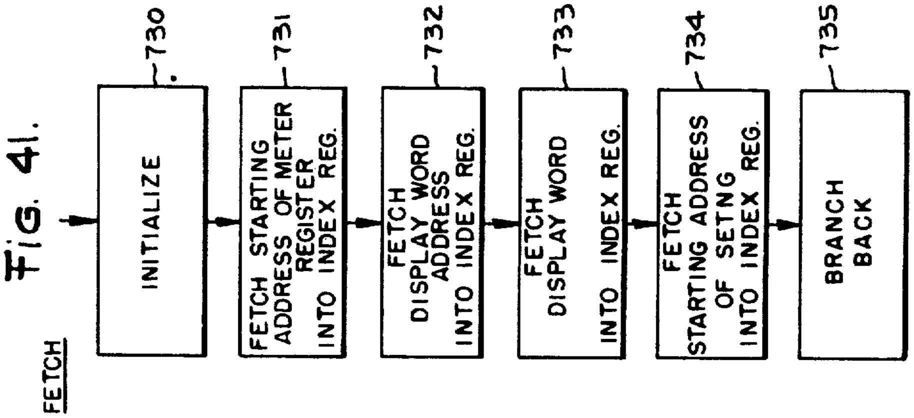
Figure 46:
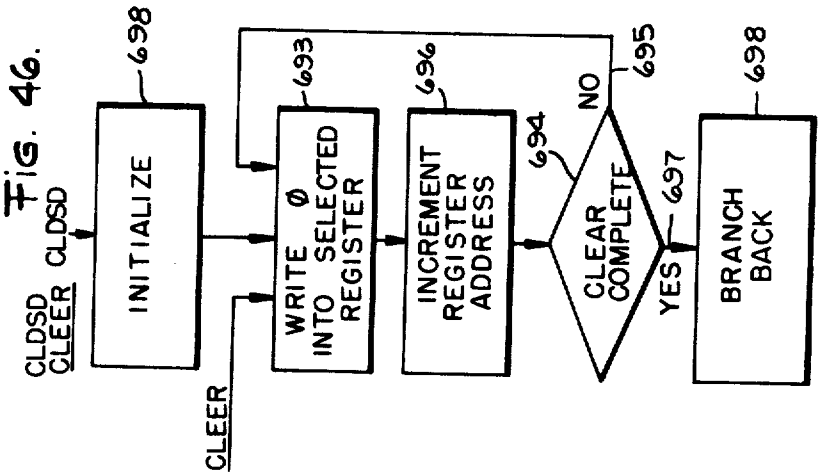
Figure 45:
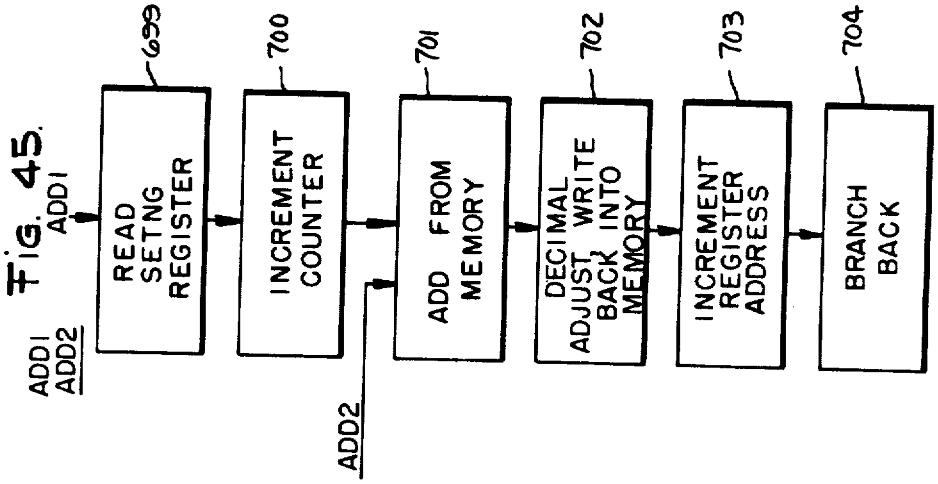
Figure 44:
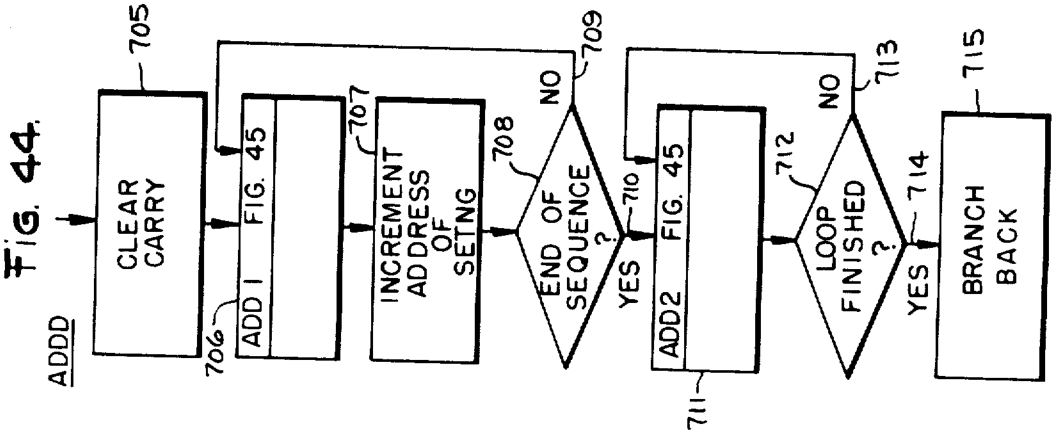
Figure 47:
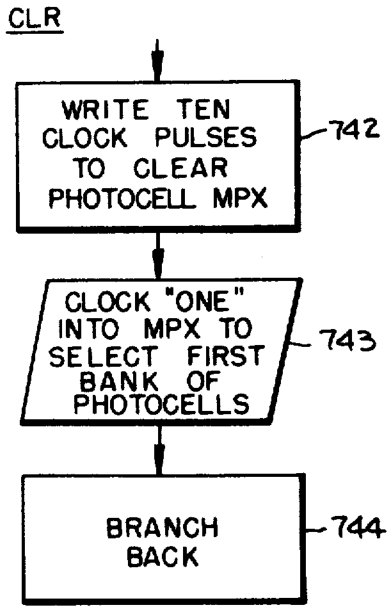
Figure 48:
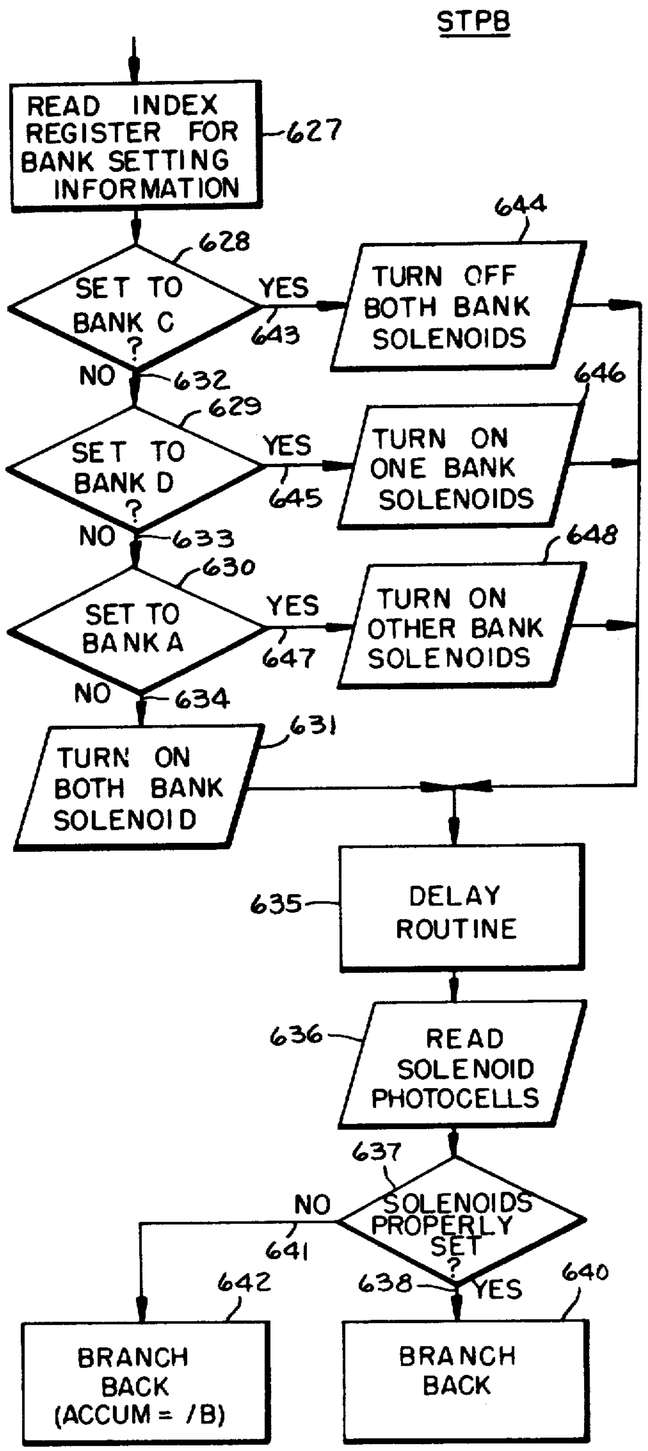
Figure 49:
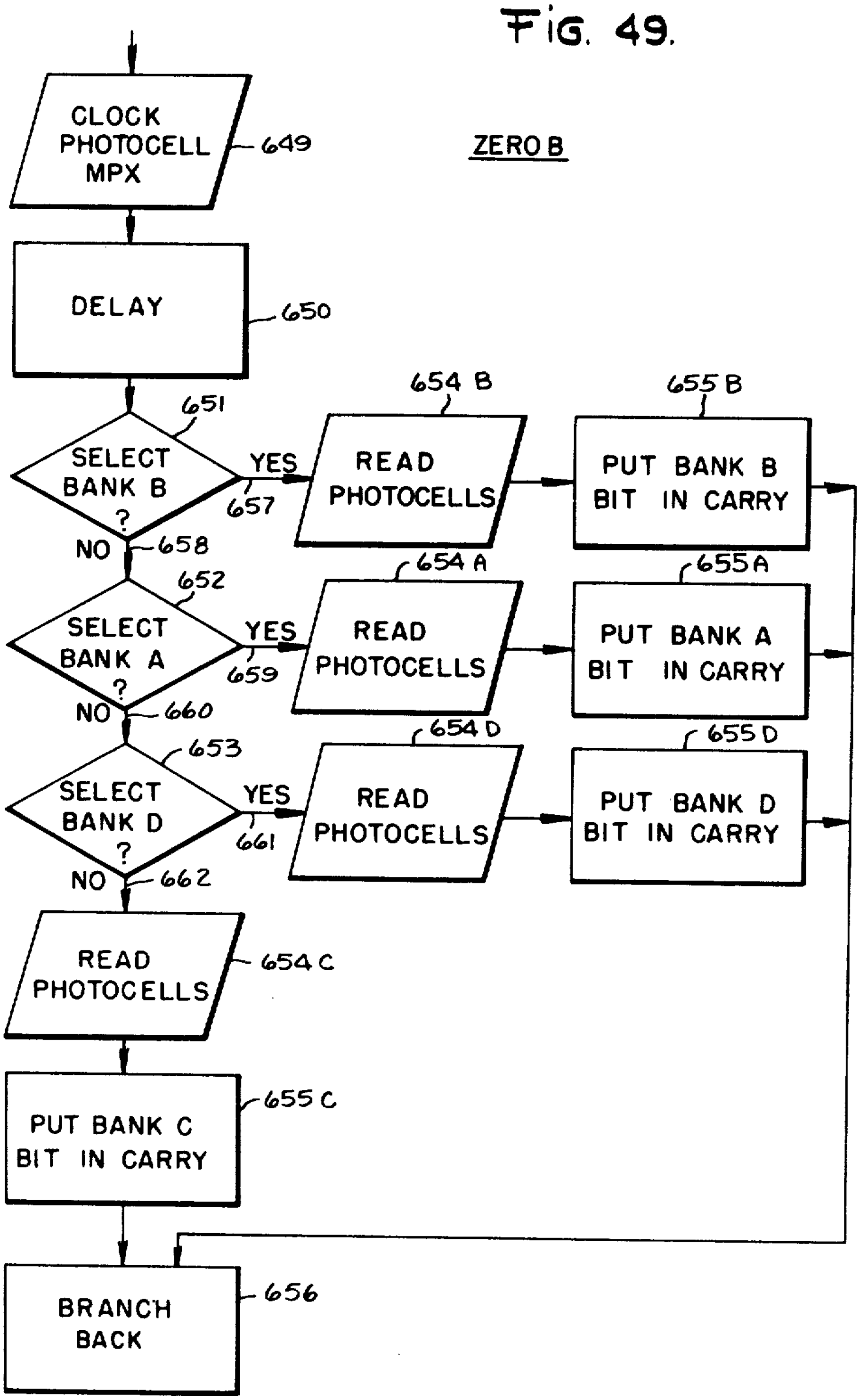
Figure 50:
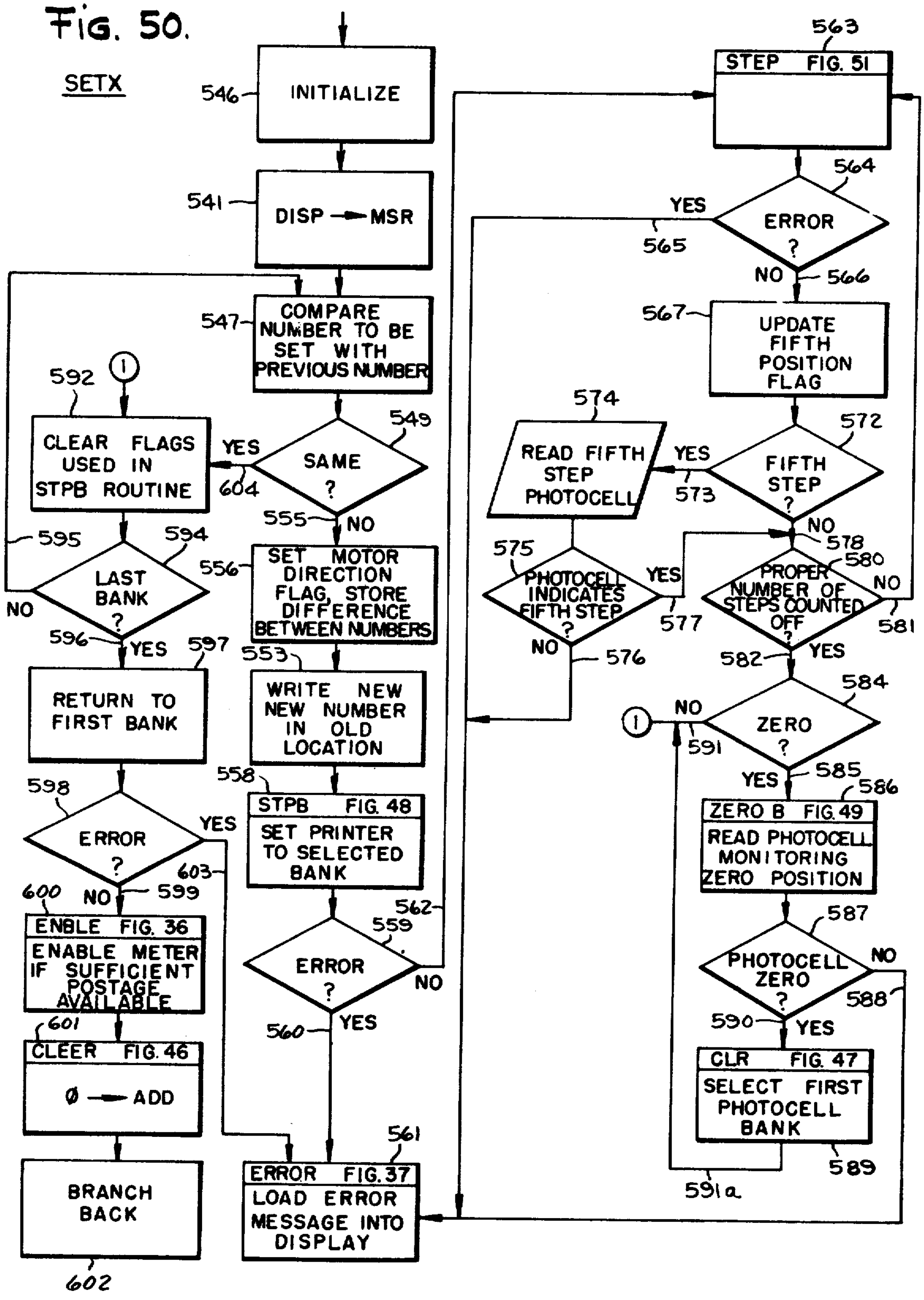
Figure 51:
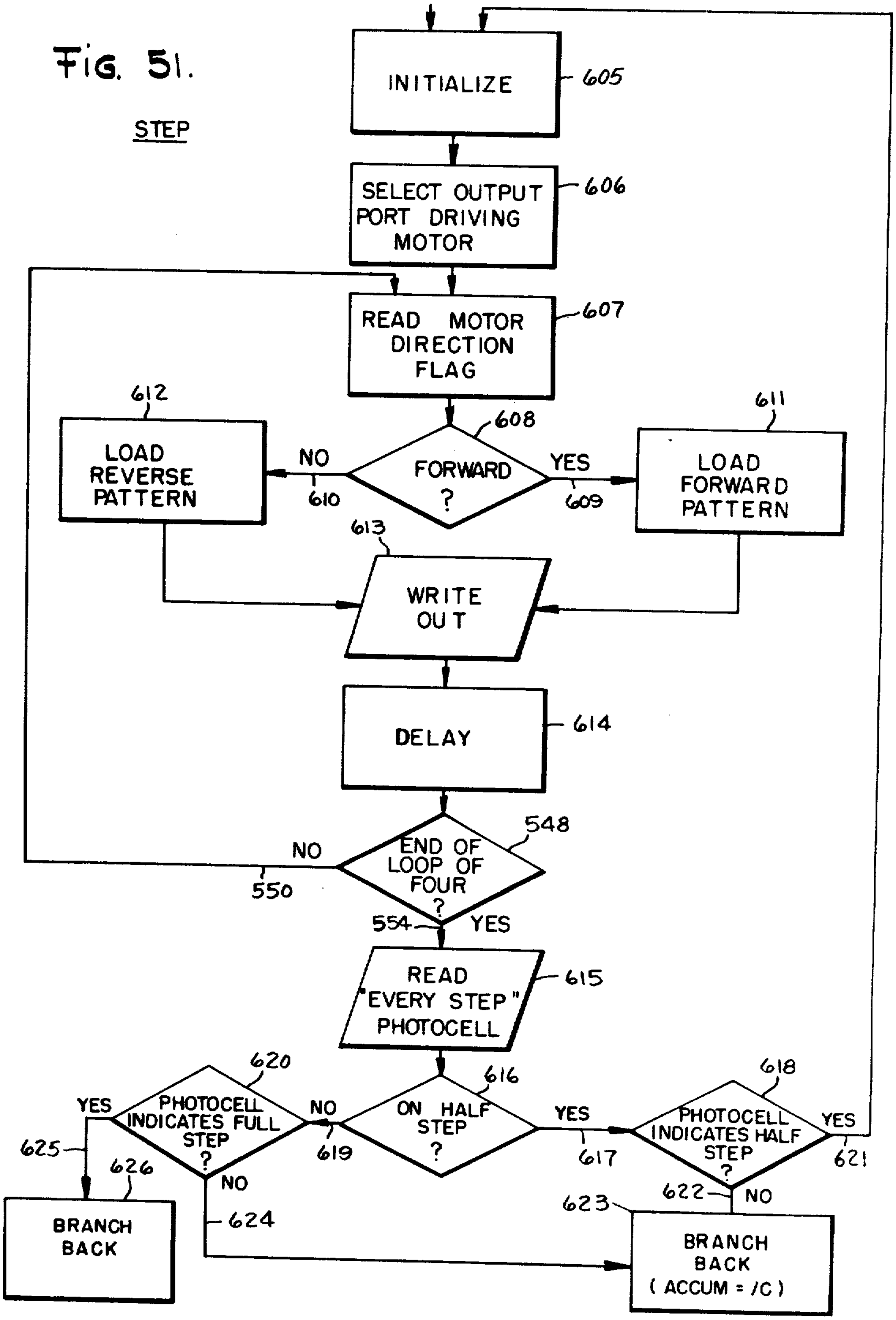

FIG. 14*c* is an electrical schematic for the −24 volt power supply for powering some of the peripheral components shown in FIG. 2;

FIG. 15 is an electrical schematic of the circuitry associated with the shift register (ϕ)20 of FIG. 1*d* for multiplexing the keyboard and the display of FIGS. 1*b* and 1*c*;

FIG. 16 is an electrical schematic of the keyboard and the display shown in FIGS. 1*b*and 1*c*;

FIG. 17 is an electrical schematic of the circuitry associated with shift registers (1)21 and (2)22 of FIG. 1*d*, for controlling the indicator lamps of FIG. 16;

FIG. 18 is an electrical schematic of the decimal point circuitry and the decoder driver circuitry for the display of FIGS. 1*b*, 1*c* and 16;

FIG. 19 is an electrical schematic for the meter monitoring photocells, the stepper motor coil drivers, and the print sensing photocell of the setting and printing mechanism of FIG. 3;

FIGS. 20 and 21 show a generalized overall operation for the system of FIGS. 1*d* and 2, in a flow chart form;

FIG. 21*a* shows a flow chart for the subroutine CHCK for the system of FIGS. 1*d* and 2;

FIG. 22 depicts a flow chart for the subroutine INRAM for the system of FIGS. 1*d* and 2;

FIG. 23 illustrates a flow chart for the subroutine DOWN for the system of FIGS. 1*d* and 2;

FIG. 24 shows a flow chart for the HOME subroutine for the system of FIGS. 1*d* and 2;

FIG. 25 shows a flow chart for the SCAN subroutine for the system of FIGS. 1*d* and 2;

FIG. 26 depicts the chart for the subroutine FCTN for the system of FIGS. 1*d* and 2;

FIG. 27 illustrates the flow chart for the digits subroutine for entering numbers into the display for the system of FIGS. 1*d* and 2;

FIG. 28 shows the flow chart for the subroutine SET for the system of FIGS. 1*d* and 2;

FIG. 29 depicts the flow chart for the subroutine UNLCK for the system of FIGS. 1*d* and 2;

FIG. 30 illustrates the flow chart for the subroutine POST for the system of FIGS. 1*d* and 2;

FIG. 31 shows the flow chart for the subroutine ADP for the system of FIGS. 1*d* and 2;

FIG. 32 depicts the flow chart for the subroutine SUBP for the system of FIGS. 1*d* and 2;

FIG. 33 illustrates the flow chart for the subroutine PLUS for the system of FIGS. 1*d* and 2;

FIG. 34 shows the flow chart for the subroutine CLEAR for the system of FIGS. 1*d* and 2;

FIG. 35 depicts a flow chart for a subroutine for calling register contents into the display for the system of FIGS. 1*d* and 2;

FIG. 36 illustrates a flow chart for the subroutine ENBLE for the system of FIGS. 1*d* and 2;

FIG. 37 illustrates a flow chart for the subroutine ERROR for the system of FIGS. 1*d* and 2;

FIG. 38 shows a flow chart for the portion of the subroutine SCAN of FIG. 25 referred to as SCANX for the system of FIGS. 1*d* and 2;

FIG. 39 depicts a flow chart for the subroutine LDLMP for the system of FIGS. 1*d* and 2;

FIG. 40 illustrates a flow chart for the subroutine OUTPT for the system of FIGS. 1*d* and 2;

FIG. 41 shows a flow chart for the subroutine FETCH for the system of FIGS. 1*d* and 2;

FIG. 42 depicts a flow chart for the subroutine CMPAR for the system of FIGS. 1*d* and 2;

FIG. 43 illustrates a flow chart for the subroutine CHECK for the system of FIGS. 1*d* and 2;

FIG. 44 shows a flow chart for the subroutine ADDD for the system of FIGS. 1*d* and 2;

FIG. 45 depicts a flow chart for the subroutine ADD1; ADD2 for the system of FIGS. 1*d* and 2;

FIG. 46 illustrates a flow chart for the subroutine CLDSP;CLEER for the system of FIGS. 1*d* and 2;

FIG. 47 shows a flow chart for the subroutine CLR for the system of FIGS. 1*d* and 2;

FIG. 48 depicts a flow chart for the subroutine STPB for the system of FIGS. 1*d* and 2;

FIG. 49 illustrates a flow chart for the subroutine ZERO B for the system of FIGS. 1*d* and 2;

FIG. 50 shows a flow chart for the subroutine SETX for the system of FIGS. 1*d* and 2; and FIG. 51 depicts a flow chart for the subroutine STEP for the system of FIGS. 1*d* and 2.

Referring now to FIG. 1*a*, the general functional arrangement of the computerized postal meter system of the present invention is shown. The heart of the system is the CPU and it performs two basic functions: performance of calculations based on input data and controlling the flow of data between various memory units. Two basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated either upon shut-down or start-up. This routine may be located in the permanent memory and is accessed by appropriate sensing device sensing either of the two stated conditions, shut-down or start-up, for operating the CPU in accordance with that routine. The function of this routine is to take information stored in the temporary member TM which represents crucial accounting functions such as descending balances or ascending credits and the like and store them in the NVM (nonvolatile memory) wherein they may be held while the machine is de-energized and recalled upon a subsequent start-up. In this manner, the computer system may continually act upon these balances in the temporary memory without fear of loss of this information upon shut-down. Further, the information may be recalled on reactivation by start-up by retrieving it from the nonvolatile memory NVM and feeding it back into the TM via the CPU. The nonvolatile memory is shown as coupled to the CPU and deriving an output therefrom in accordance with the transfer of information from the temporary storage TM under the control of the permanent memory PM through the CPU in accordance with the shut-down routine. The NVM unit is also shown as providing an output line coupled back into the CPU for transferring the data back into and through the CPU and into the temporary memory TM in accordance with the start-up routine under the control of the permanent memory PM.

The system operates in accordance with data applied from an appropriate input means I. This data is fed into the CPU under control of the program in the permanent memory. At any time during the operation of the system, should the contents of the temporary memory storing the appropriate credit debit balances or other accumulations in accordance with the various features of the system be desired to be displayed, an appropriate instruction provided by the input means I causes the CPU to arcess the desired location TM storing the information requested. The information is is provided through the PCU into the output display unit O. The input and output units may be multiplexed by a multiplex unit MP to and from the CPU.

Under control of the CPU when appropriate postal data information is provided from the input I, and all of the conditions such as limits and the like which may be preset in accordance with the entered data in storage in the temporary memory TM, are satisfied, a postage setting device SP will respond to an appropriate output signal from the CPU enabling a postal printing unit PP. At this point, the system has now accomplished its immediate function of setting the postage printer and enabling the printer to print postage.

The foregoing functional description of the present invention in its embodiment in an LSI micro integrated form will be described in greater detail with reference to FIGS. 1*d* and 2. Before going to this explanation, however, a generalized view of the specific features and operations of the postal system operating in accordance with the present invention will be described.

Referring to FIGS. 1*b* and 1*c*, there is shown a general housing arrangement for the micro computer postage system.

FIG. 1*b* shows a general housing arrangement for the micro computer postage system. A housing 100 contains modular plug-in circuit panels 101 containing the circuitry and the CPU, ROM's, RAM's and shift registers of the system. The keyboard 34 and display 35 are mounted on the common top panel 102 of the housing 100. The setting and printing mechanism (FIG. 3) is contained in a forward section generally shown by arrow 103. An envelope 104 which is to be imprinted with postage is introduced in the slotted portion 105 of meter section 103 after the system is initialized. The amount of postage to be imprinted is then keyed into the keyboard 34 via push buttons 107, the set buttom 119 is pushed to set the postage into the drum, and the imprint button 108 is depressed. The imprint button 108 may be replaced by a limit switch or optical sensor located in slot 105, which would automatically provide a print signal when an envelope enters slot 105.

FIG. 1*c* is an enlarged view of panel 102 of FIG. 1*b*, which contains the keyboard 34 and display 35 of the postage meter system. The keyboard 34 comprises push buttons 107, as aforementioned, to enter the numerical amount of postage into the system. Push buttons 109, 110, 111, 112, 113 and 114 refer to the electronic registers for batch count, batch amount, piece count, control sum, ascending register, and descending register, respectively. When any one of these buttons are depressed, the numerical section 115 of the display 35 is cleared; the appropriate register is loaded into the display, and the appropriate indicator lamp section 116 of the display is lighted.

The keyboard and display of this invention provides two new registers (more can be added without too much difficulty). Batch count and batch amount registers supply a running account of the total number of pieces of mail processed during any one run of time period, and the total postage expended for this mail. They can be reset to zero by the user. The control sum register is extremely useful in that it provides a check upon the descending and ascending registers. The control sum is a running account of the total funds being added into the meter. The control sum must always correspond with the summed readings of the ascending and descending registers. The control sum is the total amount of postage ever put into the machine, and is alterable only when adding funds to the meter. Generally mechanical meters are not resettable by the user, but only by Postal authorities. However, with electronic postage systems, a remote resetting capability may be programmed into the meter. One such remote resetting scheme which can be programmed into this system is shown in U.S. Pat. No. 3,792,446 filed Feb. 12, 1974.

The piece count register differs from the batch count in that it is not resettable by the user, and is used to indicate the total number of postage printings (pieces of mail) the machine has experienced. This information is useful to ascertain the life of the machine, and to gage when the system may require servicing and maintenance. The ascending and descending registers operate in normal fashion as might be expected from a standard postage meter. The ascending register giving a running total of the printed postage, and the descending register informing the operator of the amount of postage funds still remaining in the postage system.

The ± key (push button 117) provides the function of addition for adding in special charges to the postage such as special delivery, certification, etc.

The clear key 118 clears the numeric display 115, and also sets the batch registers to zero if displayed at the time the clear key is actuated.

The set button 119 is depressed after the postage required to mail a letter is keyed in by buttons 107. The set button 119 causes the print wheels in the printing drum 42 of FIG. 3 to set to the desired postage.

The $ unlock key 120 is a precautionary button which must be depressed by the operator in order to set postage equal to, or in excess of, a dollar. This extra physical step acts to prevent costly postage printing mistakes.

At the rear of the postage meter housing 120 (FIG. 16) is a hinged security door or plate 125 having a latch 124. This latch secures the door 125 to the housing 120 by means of a wired lead seal 121. Postal authorities are the only ones empowered to open the seal 121, and access the contents behind door 125. The door 125 protects two switches 122 and 123, respectively (shown in phantom). Switch 122 empowers the microprocessor to call into operation the ADP routine of FIG. 31. The ADP subroutine is that part of the computer program which provides for the entering of postage funds into the system. Postage funds are entered into the system by first keying-in the amount of postage using the keyboard buttons 107. This amount of postage is displayed, and then added to the descending and control sum registers of the postage meter system by opening the security door 125 and pressing button 122. This button initiates a jump in the postage meter program to the ADP subroutine as aforementioned. After the ADP routine is executed, the door 125 is again secured by seal 121.

Switch 123 is provided for removing funds from the descending and control sum registers in the event a mistake in adding funds has occurred. Switch 123 initiates a jump to the subroutine SUBP of FIG. 32.

The need to add funds to the meter system is signalled by indicator lamp 126.

A check date reminder is provided by indicator 127, each time the postage meter system is turned on.

A meter enabled indicator 128 lights when (a) the printing drum 42 (FIG. 3) is properly set with postage; (b) the postage to be imprinted is displayed; and (c) sufficient funds are available to imprint the postage desired.

Indicator lamp 129 signals the operator to call the Pitney Bowes Service Department. This indicator lights when there is something wrong in the system, e.g., the sum of the ascending and descending registers do not check with the control sum.

Indicator lamp 130 signals the operator that the postage to be set is over or equal to $1.00, and in order for the postage to be set, the $ unlock button 120 must be pressed prior to the set button 119.

The indicator light 131 shows that the ascending register contents are being displayed in display section 115.

The indicator lamp 132 lights when the contents of the descending register are being displayed in display section 115.

The piece count indicator lamp 133 lights when the piece count is being displayed in display section 115.

The batch amount 134 and the batch count 135 indicators light when the batch registers are being displayed. The batch registers are newly added registers to the normal postage meter. The data shown in the display 115 for the batch count is a whole number (no decimal point) since the information is not dollars and cents data. The piece count information is similarly displayed without the decimal point. The control sum indicator 136 lights when the control sum register is being displayed in display section 115.

The low postage <$100.00 indicator 137 lights to tell the operator that the remaining funds in the descending register are currently below a hundred dollars. This alerts the operator that some time soon, he will be required to recharge the "meter".

In several places throughout this description, components have been written with a dual numbered designation, such as RAM(2)18. The number in parenthesis designates the order in the component series, i.e., using the above example, RAM18 is the second RAM in the series of RAMS.

Now referring to FIGS. 1*d* and 2, a block diagram of the LSI integrated form of the micro computerized postage meter of this invention is shown. The system comprises a MCS-4 micro computer set, which is a product of Intel Corporation, Santa Clara, California. The micro computerized set comprises a central processor unit (CPU), 10 which is connected to a number of read only memory ROM) components 11, 12, 13, 14 and 15, respectively, and a number of random access memory (RAM) components 16, 17, 18 and 19, respectively. A plurality of shift registers (S/R's) 20, 21, 22, 23 and 24 are respectively connected into the system through output ports 25 and 27 located on the RAM chips 16 and 18, respectively. The output ports on the RAMs have four output lines [8 4 2 1] as shown. The ROMs 11, 12, 13, 14 and 15 have input-output ports (I/O's) 29, 30, 31, 32 and 33 respectively, of four-bit capacity [8 4 2 1] as shown. It should be noted that although the input-/output ports are physically located on these chips, they electrically communicate separately with the CPU 10.

The shift registers 20, 21, 22, 23 and 24 respectively, provide port expansion for the postage meter system. In addition, shift registers 20 provides a multiplexing capability for operating a keyboard 34, and a numeric display 115. Shift register 23 multiplex the inputs of the meter setting feed-back photocells 36 to input port 32. A shift register 37 (4×128 COS/MOS S/R) with a hold-up battery provides permanent register information to the working memory which is allocated to RAM 16. The input port 31 receives the register information from the non-volatile memory 37 and channels this information to RAM 16 via the CPU 10. Each 4-bit memory word is clocked in sequence from the non-volatile shift register 37 to the working memory in RAM 16 via the CPU, until the shift register memory 37 has been completely shifted.

The numeric display 115 (FIG. 2) is controlled by the decoder/driver 46, which is connected into the system via output port 26. Output line 8 (output port 25) on RAM chip 16 provides a blank-unblank control over the decoder/driver 46 to eliminate leading zeros in the display 35, and to provide a blanking control signal for the particular display of this system (Burroughs Panaplex).

The inputs from the keyboard 34 are fed to the system via port 29. As aforementioned, the inputs from photocells 36 are directed to port 32. The photocells 36 provide feed-back information from the postage meter setting mechanism shown in FIG. 3.

The micro computer system 40 of this invention is powered from two (+5 and −10 volt) power supplies 38 as shown in FIG. 2. A power sensing circuit 39 is interconnected into the micro computer system in such fashion, so as to allow the microprocessor system to detect a power failure. In such a case, the microprocessor calls a routine which transfers working memory to non-volatile memory, and protects it by disabling the memory via bit 8, port 27. A clock 41 serves to correctly phase the operations of the micro computer system 40. Two non-overlapping clock phases $\phi_1$ and $\phi_2$ are supplied to the central processor unit and random access and read only memory chips.

The central processor generates a SYNC signal every eight clock periods as shown in the Intel Users Manual for the MCS-4[R] micro computer set, copyright 1972, FIG. 2 on page 6 thereof. The SYNC signal marks the beginning of each instruction cycle. The RAM's and the ROM's will generate internal timing using SYNC, and $\phi_1$ and $\phi_2$. The shift registers (S/R's) are static shift registers and do not use these clock pulses for their operation.

The heart of any postage meter system is of course the printing means. With the use of electronics, accounting and mechanical registers and setting actuators become superfluous, since all the register information is electronically stored, and the setting of the meter banks is electromechanically controlled.

One of the ways the present micro computer system can print postage is by using a modified Model 5300 postage meter, manufactured by the assignee of this invention, Pitney-Bowes, Incorporated, Stamford, Connecticut. The modified meter only contains the previous printing drum 42 and the print wheel driving racks 43 as shown in FIG. 3; the mechanical registers and actuator assemblies having been removed. The print wheels within drum 42 (not shown) of the modified meter are set by a mechanism driven by a stepper motor 50 and a pair of solenoids 60 and 70 (FIGS. 2 and 3). The motor and solenoids are powered by a −24 volt power supply 44 shown in block diagram in FIG. 2. The indicator lamps 116 light up various display messages shown in FIG. 1*b*. These indicator lamps are likewise powered by the power supply 44.

Output port 28 channels control signals to the drivers 47 of stepper motor 50. The output lines 0, 1 of the shift register 24 channel control signals to the setting mechanism solenoids 60 and 70, respectively via drivers 48. The twenty output lines of shift registers 21 and 22 operate indicator lamps 116 via lamp drivers 49.

The meter setting and printing mechanism of this postage system will be described with reference to FIGS. 3, 4*a*, 4*b* and 5. A stepper motor 50 drives an upper and lower set of postage wheel driving racks 43 (four in all) via a pair of upper and lower nested shafts (four shafts in all) **52*a*, 52*b*, 52*c* and 52*d*** respectively (FIG. 4*a*). Upper shafts **52*a*, 52*b* and lower shafts 52*c*, 52*d* are driven by a master drive gear 51, which is operatively rotatable in a clockwise and counterclockwise direction (arrows 55) by means of a stepper motor 50**.

The printing drum 42 has four print wheels (not shown) to provide a postage impression to the maximum sum of $99.99. Each print wheel provides a separate digit of this sum, and is settable from "0" through "9". The print wheels are sequentially set by means of one of the four driving racks **43*a*, 43*b*, 43*c* and 43*d*, respectively. The driving racks are slidably movable (arrows 56 of FIG. 3) within the drum shaft 57**.

The upper racks **43*a* and 43*b* are controlled by pinion gears 58*a* and 58*b***, respectively (FIG. 4*a*). The pinion gear **58*a* is affixed to shaft 52*a*; the pinion gear 58*b* is affixed to shaft 52*b*; the pinion gear 58*c* is affixed to shaft 52*c*; and pinion gear 58*d* is affixed to shaft 52*d*. Nested shafts 52*a*, 52*b* and 52*c*, 52*d*, are respectively rotated (arrows 59) by means of respective spur gears 53*a*, 53*b*** (FIGS. 3, 4*a*, 4*b* and 5) and respective spur gears **53*c*, 53*d*** (FIG. 4*a*) affixed to the shafts at the stepper motor end thereof.

The master driving gear 51 engages each of the gears **53*a*, 53*b*, 53*c*, and 53*d* in the sequential order: 53*b*, 53*a*, 53*d*, 53*c*; with "53*b*" corresponding to the "tens of dollars" print wheel, and "53*c*" corresponding to the "unit cents" print wheel. The master gear 51 is sequentially slidably positioned (arrows 65) in rotational contact opposite each of the spur gears 53*a*–53*d* by sliding the yoke 63 over shaft 62. The master gear 51 is rotatably mounted within slot 64 in yoke 63, and is rotatably driven (arrows 55) by the stepper motor 50 via the motor shaft 50*a* and splined shaft 62. The yoke 63 is not rotatably engaged by the splined shaft 62 due to the sleeve bushing 66 which separates the yoke 63 from the shaft 62. The yoke 63 and master gear 51 are guided and supported by an additional smooth shaft 61, which nests within slot 67 of yoke 63**.

In order that the teeth of the master gear 51 properly align with the teeth of the several spur gears **53*a*, 53*b*, 53*c* and 53*d*, a toothed section 69 of each spur gear is locked into place by a pair of upper and lower tooth profiles 68 and 68′, respectively located on upper and lower surfaces of the yoke 63** as shown in FIG. 4*b* and 5.

As the yoke 63 and the gear 51 slide (arrow 65) over the splined shaft 62, the upper and lower laterally extending tooth projections 68 and 68′ hold the spur gears **53*a*, 53*b*, 53*c* and 53*d* in place against rotational misalignment. Each of the gears 53*a*, 53*b*, 53*c* and 53*d*, respectively are only free to turn, when the master gear 51** is directly intermeshed therewith.

The sliding movement (arrows 65) of the gear 51 and yoke 63 is controlled by toggle pin 71, which nests within groove 72 of the yoke. The toggle pin 71 pushes against the yoke 63, when the pivotable link 73 to which it is attached, is made to pivot (arrows 74) about a center shaft 75. The link 73 is controlled by two solenoids 60 and 70, respectively, acting through pivot arms 76, 86 and 77, 87 respectively. The solenoids 60 and 70 pull upon their respective pivot arms 76 and 77 via pull rods 78 and 79, which are movably pinned to these arms by pins 81 and 82, respectively. When the pull rod 79 pulls upon arm 77, it is caused to pivot (arrows 80) about shaft 83, which is rotatably affixed to arm 77. When this occurs, arm 87 is caused to be pivoted (arrow 84) against the biasing action of spring 88. This in turn, results in pulling pivot arm 73 forward (arrow 89) via shaft 90. This causes the pivot arm 73 to pivot about center shaft 75, resulting in moving toggle pin rearwardly (arrow 91).

Likewise, when solenoid 60 pulls upon arm 76 via rod 78, arm 76 causes shaft 92 to turn (arrow 93) against the biasing of spring 94. This in turn, causes arm 86 to pivot (arrow 95) about shaft 92. In pivoting, the arm 86 causes the center shaft 95 to move rearwardly (arrow 96). This in turn, forces the toggle pin 71 to move rearwardly (arrow 91).

There are four combined solenoid pull positions corresponding to the four separate mating positions between main gear 51 and each respective spur gear **53*a*, 53*b*, 53*c* and 53*d*; (a) both solenoids are not pulled-position 53*c*; (b) both solenoids are pulled-position 53*b*; (c) solenoid 70 is pulled and solenoid 60 is not pulled-position 53*a*; and (d) solenoid 70 is not pulled and solenoid 60 is pulled-position 53*d***.

The setting mechanism operation is as follows: (1) both solenoids 60 and 70 are pulled; (2) setting spur gear **53*b* via main gear 51 and stepper motor 50; (3) de-energizing solenoid 60 allowing pivot arm 76 to spring back under the action of spring 94; (4) setting spur gear 53*a* via main gear 51; (5) energizing solenoid 60 and de-energizing solenoid 70, allowing pivot arm 87 to spring back under the action of spring 88, and pivot arm 86 to pivot against spring 94; (6) setting spur gear 53*d* via main gear 51; (7) de-energizing solenoid 60 allowing pivot arm 76 to spring back under the biasing of spring 94, and (8) setting spur gear 53*c* via main gear 51**.

After the spur gears are set to individual postage value positions, causing the racks 43 and the print wheels (not shown) to assume postage value positions, the drum 42 is rotated via shaft 57 (arrow 97) to imprint the set postage.

The home position of the drum 42 is monitored by a slotted disc 98 affixed to shaft 57. When slot 100 of disc 98 moves through the optical read-out well 99, the print cycle is detected.

All optical read-out wells of the setting mechanism as will be hereinafter described, comprise a light emitting diode (LED) and a phototransistor for receiving the light emitted by the LED.

The slide positions of gear 51 and yoke 63 (arrows 65) are monitored by determining the pivot position of pivot arms 86 and 77, respectively. Pivot arm 86 has a finger 101 which will pivot in and out of well 102, when solenoid 60 is actuated and de-actuated. Pivot arm 77 has a finger 103 which pivots in and out of well 104 when solenoid 70 is actuated and de-actuated.

The home positions of shafts **52*a* and 52*b* are monitored by slotted discs 105*a* and 105*b*, respectively (FIGS. 3 and 4*a*). When slot 106*a* of disc 105*a* is in well 107*a*, shaft 52*a* is at zero. Similarly, when slot 106*b* of disc 105*b* is in well 107*b*, shaft 52*b* is at zero. Shafts 52*c* and 52*d* are respectively "zero" monitored via respective discs 105*c* and 105*d*, slots 106*c* and 106*d*, and wells 107*c* and 107*d* (FIG. 4*a***).

Rotation of the stepper motor shaft **50*a*, splined shaft 62 and gear 51 is monitored via gears 108 and 108*a*, slotted monitoring wheel 109 and monitoring well 110. When stepper motor shaft 50*a* turns splined shaft 62 and main gear 51, a gear 108 attached to shaft 50*a* is also made to turn. Gear 108 intermeshes with gear 108*a* carried by the slotted monitoring wheel 109, causing wheel 109 to turn in correspondence with shaft 50*a*. Every fifth slot 111 on the monitoring wheel 109 is extra long to provide a standard for synchronization. Each slot on wheel 109 corresponds to a change of one unit of postage value. The slotted wheel 109 is optically monitored by well 110. Well 110 has two photosensors, 110*a* and 110*b*, respectively, as shown in FIG. 4*a*. Photosensor 110*a* monitors every step of the stepper wheel 109 and sensor 110*b*** monitors every fifth step.

In summary, the setting of the postage printer is done by selecting the desired bank with the solenoids and driving the stepper motor in the proper sequence under program control. The results of each step is verified by the micro computer via the monitoring photosensors.

Brief Summary of the Operation of the Postage Meter

The operation of the postage meter can be briefly summarized as follows: With no power applied to the microprocessor, a de-energized "enable" solenoid (not shown) mechanically locks up the printing mechanism of FIGS. 3–5. When power is applied to the system, (turning on the meter), voltage sensing circuits monitoring logic supply voltage (FIGS. **12*a* and 12*b*) generate a general system reset pulse, when the logic supplies reach operating levels. This pulse initializes the microprocessor system, which then starts executing the program shown on page 66 from address φφφ. The non-volatile memory 37 of FIG. 2, is loaded into working storage in RAM, the printing mechanism is set to zero, the descending register is loaded into the numeric display 115 of FIGS. 1*b* and 1*c* to inform the operator how much funds are available, and a "check date" reminder 127 is turned on. The system then loops in a SCAN routine (FIGS. 25 and 25*a*) which multiplexes the display and searches for keyboard 34** inputs. The meter remains in this routine until a keyboard input is detected at which time the program branches to execute the routine called for by the key. The program then returns to the SCAN routine.

The postage amount to be printed is set by entering the number into the display via keyboard 34 and operating the SET button 119 (amounts $1.00 or more require the pressing of the $ UNLOCK button 120 before pressing SET). If sufficient funds are available in the descending register to print the amount of postage the meter is set to, the "enable" solenoid is set (enables printing mechanism). There are two ways of tripping the print mechanism: (1) feeding a letter into the meter (2) operating the postage request lever 108. When tripped, the amount of postage shown in the display is printed. The operation of the print mechanism generates a signal to the SCAN routine which branches to a routine which updates the meter registers and checks to see if sufficient postage is available for again printing the postage amount the meter is set to. If available, the print mechanism remains enabled, if not, it is disabled.

If in the course of running postage through the meter, the sequence is interrupted, as by calling register contents into the display, the printing mechanism is disabled until a postage amount is again put back into the display. This can be done by depressing the SET button 119, which recalls the postage amount the meter is set to into the display, when operated after a non-numeric (not 0–9) key or by entering a new number and depressing the SET button which sets the meter printing mechanism to the new number.

Provision is made for entering funds into the meter (incrementing descending register and control sum) by means of two switches (+) 122 and (−) 123 located in an area protected by a sealed access door 125 (FIG. 16). The appropriate postal authorities can enter or deduct any amount of postage (limited only by the size of the registers) by entering the desired amount into the numeric display 115 via keyboard 34, and then operating the (+) or (−) switches. After recharging the meter, the authorities would then reseal the access door.

Within the SCAN routine, periodic checks of the logic power supplies are made to determine when to shut down the meter. When the voltage sensors (see FIGS. **12*a* and 12*b***) detect the voltage falling below a preset level, there is a certain minimal amount of time available (even with complete external power removed) in which to complete any routine in progress, sense the low voltage condition, disable the printing mechanism, and transfer register contents from working memory to the nonvolatile memory. This sequence is entered in shut-down and low line voltage situations where there isn't sufficient voltage to guarantee proper operation. The main program can only be re-entered through a complete power-up cycle described previously.

Each RAM chip of this particular system (MCS-4) also provides an output port (for example, port 25 of FIG. 6) for providing the system with communication capability with peripheral devices. As aforementioned, these ports have four [8 4 2 1] output lines.

The RAM chip 16 shown in FIG. 6 allocates the first 6 locations (0 through 5) in the first bank (200) for the descending register 815. The six locations will provide for a maximum dollar allocation of $9,999.99 (six digits). In other words, the postage meter system can be funded to a maximum of $9,999.99.

The allocation for the piece counter 817 (201) provides 7 locations, which on a piece count basis will provide a total of 9,999,999 pieces. The capacity of the piece counter must necessarily be large, since it is the total running account of each and every piece of mail that is processed over the life of the machine.

Similarly, the control sum register 818 (202, locations 0 through 9) and the ascending register 816 (200, locations 6 through F) provide a very large capacity (a dollar total of $99,999,999.99) because these sums are continuously increasing for the life of the system.

Batch Sum 819 (201, location A through F) and Batch Counter 820 (202, location A through F) have capacities equal to the capacity funding of the descending register, since in any batch run one can never spend more in a pre-funded system than the available funds stored.

The locations 0 through 3 and C through F of bank 203 are reserved for registers which are used to control the setting of the printer mechanism from a previous meter setting ("number meter set to" (SETNG) register 211) to a new meter setting ("meter setting" register (MSR) 307).

These registers only require four word lines, since the printing mechanism of this invention as shown in FIGS. 3 through 5, has a maximum setting of $99.99. Naturally, if the printer had only a three bank setting ($9.99), only three word spaces would be needed in these particular registers.

Status flag 821 is used in the programming to monitor stepper motor 50 (FIG. 3). Status flags 822, 823, and 824, respectively are used in the programming to monitor the setting of the printer banks (FIG. 3).

FIG. 7 shows the memory allocation provided by RAM chip 17. Bank (204) contains storage for an addition register 210 in locations 7 through F. The addition register is for the purpose of temporary storage and for adding to the regular postage to be printed, an increment of additional or special charges, i.e., insurance, certification, special delivery, etc. For example, suppose it was desired to add 50 cents additional postage to the regular postage amount of 10 cents. First, the numbers one and zero (ten cents) would be entered into the numeric display 115 by means of keys 107 of the keyboard. Next, the ± button 117 is depressed, which transfers the 10 cents from the display to the additions register 210. A five and a zero (50 cents) are then keyed in, and appear in the display. The button 117 is again depressed to add the 50 cents to the additions register 210, and the display providing a total of 60 cents stored in the additions register. The set button 119 is then depressed to set the meter to sixty cents.

FIG. 8 depicts the memory allocation in RAM chip 18. Bank 205 (location B through F) contains the lamp output area 206 shown in more detail in FIG. 8*a*. Bank (207) has locations 7 through F allocated for the images of the display contents 208. The numeric words from this storage space appear in display section 115 (FIG. 5*a*). Lamp output register 206 (spaces B through F) in bank (205) applies to the display section 116.

Storage space 212 (space 6 of bank 207) is allocated for placement of a new digit word prior to its being entered into display contents 208. The purpose of this storage space is that it serves to provide a means to clear display contents 208, if the previous operation was not one which allowed for entering a number into display contents 208. In other words, the new digit space is an intermediary storage facility for storing a new display digit, until it is determined where in the sequence of events is the information being entered to the display.

The word spaces in banks (205) and (207) of FIG. 8, corresponding to "batch tag" 305 (bank 205, status location 0); "status flag" 311 (bank 207, status location 0); and "$ unlock flag" 309 (bank 207, status location 2) are used in the programming to indicate a particular operation condition. These indicators will be further discussed hereinafter.

RAM chip 19 is illustrated in FIG. 9. The status words 215 and 216, respectively, of bank 214 are used in the operational control of the setting and printing mechanism of FIG. 3.

FIG. 10 shows the various input ports of the ROM's.

FIG. 11 is an electrical schematic diagram of the non-volatile memory circuitry 37 shown in block diagram in FIG. 2. The non-volatile memory consists of two dual 128 bit static shift register 140 and 141, respectively, as shown. These shift registers are of the complementary MOS (CMOS) type. CMOS was chosen because of its very low power consumption in the quiescent state. This allows for powering the memory by means of a battery 143, which will maintain the integrity of the memory for extended periods of time, i.e., the memory will not be erased. The particular shift register components (SCL 5172) were manufactured by Solid State Scientific, Inc. of Montgomeryville, Pa. 18936. These components have been presently discontinued, but there are many other similar components currently on the market, e.g., RCA's CD 4031 AE and Motorola's MC 14157CL.

In their power off state, the shift registers 140 and 141, as well as the transmission gates 142 and 143, respectively, the NOR gates 144 and 145, respectively, and the flip flop 146 all operate from the power supplied by battery 143. Flip flop 146 is in the low logic state (Q=0; Q=1) at this time, which disables gates 142, 143, 144 and 145. Transmission gates 142 and 143 effectively disconnect the battery operated circuitry outputs from the microprocessor system. This prevents excessive battery current required to supply the low impedance inputs of the ROM(2)13 and load resistors 13*a* during the power off condition. Thus, battery life is extended considerably. The inputs to the shift registers 140 and 141 are of characteristically high impedance (CMOS) and therefore, do not require this form of isolation. Gates 144 and 145 are disabled by flip flop 146 in the "power-down" and transition states. This inhibits spurious signals on lines 147 (clock signal line) and the memory disable line 148. This is necessary, because during "power-up" and "power-down" sequences, there may be spurious signals on the output port 27 (FIG. 1*d*) supplying the control signals. This is so, because at this time the power signals are non-zero, but have not as yet reached their specified operating values. During "power-up" and "power-down" the microprocessor is not functioning predictably and memory must therefore be protected, which is accomplished by gates 144 and 145.

During "power-up", transistor 149, which is initially off, remains off until line 150 is connected to ground. This occurs when optical switches 152 and 153 (FIGS. 12*a* and 12*b*, respectively) turn on. Optical switches 152 and 153 are part of the −10-volt and +5-volt power supply monitoring circuits, and turn on when the −10 volt and +5 volt supplies respectively reach their operating values. Both of these power supplies are necessary for the proper operation of the microprocessor system.

As power begins to come on, diode 155 through which battery current flows, turns off and diode 156 turns on. This switches the memory over to the main power supply. The reverse procedure is experienced during shut-down. When line 150 becomes low, transistor 149 turns on, causing connection point 154 to go high. This in turn causes the Q output of the flip flop 146 to go high via line 157. This enables gates 142, 143, 144 and 145 resulting in making the memory fully operative with the microprocessor system.

During start-up, a reset signal to the microprocessor is generated by the circuit of FIG. 13. The reset signal initializes the central processor unit (CPU 10 of FIG. 1*d*), and starts the program of the system executing from location/ϕϕϕ in ROM. The beginning portion of the program contains initialization procedures which are only executed once during the start-up sequence. Included in this start-up sequence, is a subroutine INRAM described with reference to FIG. 22. This subroutine transfers the contents in the shift registers 140 and 141 to the working area (RAM) of the microprocessor system. Data from these non-volatile shift registers 140 and 141, comprising "postage meter register" data, is read into the microprocessor system through ROM input port (2) 31 as shown in FIGS. 1*d* and 10. Each sequential word of data in the shift register memory is accessed by writing out a clock pulse to shift registers 140 and 141 via bit 8 of output port 27 as shown in FIGS. 1*d* and 8. After all of the 128 words of the shift register memory are loaded into RAM, the non-volatile memory remains idle until a shutdown sequence (subroutine DOWN of FIG. 23) is initiated. The shutdown sequence will result if either or both of the power supplies (+5 volt and −10 volt) begin to turn off. The optical switches 152 and 153 (FIGS. 12*a* and 12*b*) then turn off, thereby turning off transistor 149. This in turn causes connection point 154 to go low. In addition, the voltage on line 158 goes low. The line 158 is connected to the test input on the CPU 10. This test input is read periodically during program execution, and when it is read as a logical low, the program branches to the DOWN subroutine (FIG. 23). The "postage meter register" data in RAM is now read, and then written out to the shift register memory via output port 26 of FIG. 7. This "postage meter register" data may have changed in the hiatus between initialization and shutdown due to the entering of new postage. After the data word information is written out to CMOS shift register memory, a clock pulse is written out via bit 8 output port 27 of FIG. 7. This enters the data word into the non-volatile memory, and then the next sequential word is accessed in RAM memory. The sequence of accessing and writing of the sequential data words continues until the entire contents of RAM memory has been transferred back into the shift registers (non-volatile memory). After the transfer has been completed, a memory disable signal is written out to the flip flop 146 via bit 4 of output port 27 and line 148. This causes the "Q" of the flip flop to go to zero, which disables the memory. To reinitiate the memory system, both optical sensors 152 and 153 must turn on to start the sequence again.

It should be noted, that the above scheme of transferring the contents of memory need not be required, where the "working" memory areas are themselves indistructable. For example, the RAM memory may be furnished with a hold-up battery, thus eliminating the need for the CMOS shift register memory. "Working" storage may also comprise a core memory or other similar non-volatile storage components, such as a plated wire memory, a magnetic domain memory, a MNOS memory, etc.

FIG. 12*a* shows the electrical schematic for the −10 volt supply monitoring circuit. The −10 volt supply is monitored by a voltage regulator IC 159, connected to form a voltage sensing circuit. The input voltage applied to line 160 powers this circuit. The circuit contains an internal zener reference diode. The input voltage is compared against this reference, and when it exceeds a predetermined value set by the potentiometer 161, the output switches on. This causes the LED 162 of the optical switch 152 to energize. This turns on the phototransistor 163 of the optical switch 152, which provides the part of aforementioned input to the memory circuit of FIG. 11, and also provides an input to the reset circuitry of FIG. 13. The optical switch 152 is made by the Monsanto Company, and has a part No. MCT-2. The IC regulator 159 is a standard part No. 723, manufactured by Teledyne, Signetics, Motorola, etc.

FIG. 12*b* depicts the electrical schematic for the +5 volt supply monitoring circuit. This circuit performs a similar function as that shown in FIG. 12*a*. The external zener diode 164 is used as a reference. A differential amplifier 165 (RCA, CA3046) compares the input voltage supplied on line 166, against the reference. When the input exceeds a predetermined value set by the potentiometer 167, the LED 168 of the optical switch 153 turns on. This causes the phototransistor 169 of the optical switch to supply an output to the memory circuit of FIG. 11, and also to the reset circuitry of FIG. 13. In the circuit of FIG. 12*b*, a 723 IC is not used because the voltages being monitored are not sufficiently large to properly bias the circuit.

The monitoring circuits shown, are respectively connected across the filter capacitors 170 and 171 of the power supplies. The monitoring circuits are set to switch at a threshold several volts greater than the output voltage on lines 174 and 175, respectively. If power is lost from the AC line supplying power to the rectifiers, and the load connected to the output voltage lines 174 and 175 remains constant, the filter capacitors 170 and 171, will respectively discharge in a nearly linear fashion until the respective regulators 172 and 173 start failing to regulate due to the insufficient supply voltage.

When the rectified voltage drops below the sensing voltage threshold set by the potentiometers 161 and 167, respectively, of FIGS. 12*a* and 12*b*, the optical switches 152 and 153 (FIGS. 12*a* and 12*b*) turn off. This in turn generates a signal sensed on the CPU test line, which initiates the aforementioned shutdown routine.

As long as the maximum time to detect the shutdown signal and the time to transfer the register contents from working RAM memory to the non-volatile memory, does not exceed 20 milliseconds, there will be sufficient time to preserve the memory, and operate the microprocessor in a defined mode. The time parameter is a function of the filter capacitors, load, sensing voltage, and output voltage. The 20 millisecond value has been obtained by choosing the worse load condition for the system.

The reset circuitry of FIG. 13, comprises a one shot 178 set to provide a guaranteed minimum width pulse. The input to the one-shot 178 is from the outputs of the power supply monitoring circuits of FIGS. 12*a* and 12*b*, respectively.

FIG. 14*c* illustrates the power supply circuitry (−24 volts) used to operate the stepping motor 50, the solenoids 60 and 70 of FIG. 3, and the message display lamps of section 116 of FIG. 5a. The zener diode 179 regulates the voltage outputted on the line 180.

FIG. 15 shows the circuitry associated with the multiplexing shift register (φ)20 of FIG. 1d. This shift register is a 10 bit serial-in/parallel-out S/R, which is used in this postage system to multiplex both the display and the keyboard (see FIGS. 1d, 1b and 16). The multiplexing is accomplished by entering a logic "1" into the shift register, and shifting it through, thus enabling the outputs one at a time. Nine of the outputs as shown in FIG. 15, are connected to anode drivers 181, which operate the Panaplex display in a multiplexed mode. The Panaplex[R] display of FIG. 16 is manufactured by the Burroughs Corp. The anode drivers 181 are of a common, well known type, similar to those described in the technical brochure (advance copy) put out by the Sperry Information Displays Division, Scottsdale, Ariz., entitled: "Multiplexing Sperry SP-700 Series Information Displays", Page 28.

FIG. 16 illustrates the electrical schematic for the keyboard and the display (sections 115 and 116) of FIG. 1c. Section 115 of the display is shown at the top of FIG. 16, and represents the aforementioned gas discharge Panaplex[R] display. Below the gas discharge display, are shown the indicator lamps, (section 116) which are powered by the voltage supply of FIG. 14c, and are controlled by the shift register and switching circuitry shown in FIG. 17. The 300 ohm resistors in the lamp circuit are used to limit the current to the lamps (the lamps are 12 volt lamps). The electrical schematic for the keyboard 34 is shown below the lamp circuitry. The four horizontal (row word) lines, and ten vertical (column word) lines intersect to provide a select position. The "row word" lines are connected to the ROM input port 29 (FIG. 1d), and seven (all ten vertical lines are not used) "column word" lines are connected to the shift register 20 of FIGS. 1d, and 15. A discussion on multiplexing a keyboard using an Intel shift register (4003) and microprocessor (4001) can be found on pages 51-52 of the Intel Users Manual for the MSC-4[R] Micro-Computer Set, the February 1973 edition (Revision 4).

FIG. 17 depicts the electrical schematic for the shift register circuitry controlling the indicator lamps of FIG. 16. Shift register 21 and 22 (see FIG. 1d) are 10 bit serial-in/parallel-out S/R's which are utilized as port expanders. A bit pattern corresponding to the particular indicator lamps to be turned on, is transferred to the shift registers 21 and 22 in a serial manner from register 206, RAM(2)18, (please refer to subroutine LDLMP of FIG. 39). The shift registers 21 and 22 provide logic "1" outputs to respective transistors 182 (typical) which act as switches, which in turn light their associated lamp (FIG. 16).

FIG. 18 illustrates the decimal point circuitry which turns on the decimal point separating the "dollars" and "cents" in the numeric display 115. The decimal point is inhibited from appearing in the display, (lines 184 and 185, respectively) when the "piece count" or the "batch count" is being displayed. The digit to be displayed is written out in BCD form on RAM output port 26 (FIG. 1d) to the decoder driver 183 as shown. The output of the decoder driver 183 is decoded for the seven segment display shown in FIG. 16 (top). The decoder driver 183 (DD 700) is manufactured by Sperry Rand (SP-700 Technical Bulletin, October 1971).

The blanking feature incorporated into the decoder drive 183 is driven by RAM output port 25 (FIG. 1d) bit 8. Besides suppressing leading zeros, this blanking is also used in the multiplexing process. A discussion of blanking requirements for multiplexed gas discharged displays can be found on page 5 of the aforementioned brochure: "Multiplexing Sperry SP-700 Series Information Displays".

The resistor 186 is a current limiting resistor used in the power supply for the stepping motor. Resistors 187 and 188 are current limiting resistors used in the power supply to the LED's of the optical switches 190, 191, 192, 193 and 194, 195, 196, 197, respectively (FIG. 19).

FIG. 19 shows the electrical schematics for the meter monitoring photocells, the stepper motor coil drivers, and the print sensing photocell. The print sense photocell 189 of well 99 in FIG. 3 is shown in electrical schematic at the bottom of FIG. 19. This photocell detects the completed rotation of the printing drum 42 (FIG. 3). When this photocell senses that postage has been printed, the program branches to a routine that updates all the "postage meter" registers by the amount of postage to which the meter was set. This photocell is multiplexed into the "meter" along with keys of the keyboard 34 (FIGS. 1b and 1c).

The optical switches 190 through 197, which monitor the mechanical functions of the "meter" are multiplexed into the input port 32 by shift register (3)23 (FIG. 1d).

RAM output port 28 (FIG. 1d) is used to drive the stepping motor 50 (FIG. 3). This output port is connected to an RCA CD4050 buffer, which in turn drives darlington transistor switches 250, 251, 252 and 253, respectively via lines 254, 255, 256 and 257, respectively. The motor 50 is powered by the −24 volt supply of FIG. 14c. The stepping motor 50 (FIG. 3) is a RAPID-SYN, Model 23D-6102A, manufactured by Computer Devices Corporation, Santa Fe Springs, Calif. The characteristics of the motor (specifications, switching, sequence, schematic, etc.) are given in bulletin C and D, Pages 6-73.

The respective darlington transistor switches 258 and 259 are used to energize the bank select solenoids 60 and 70 of FIG. 3. These switches receive their inputs from shift register (4)24 of FIG. 1d, via lines 262 and 263, respectively.

The darlington transistor switch 260 is used to energize the "meter enable" solenoid (not shown), which is used to free shaft 57 (FIG. 3) for rotation. The switch is inputted on line 264 (FIGS. 17, 19), by the signal used to power the "meter enabled" lamp of the display (FIG. 16).

All the connections not specifically mentioned, and which are relevant to the circuitry depicted in FIGS. 11 through 19, are shown by pin connection numbers as illustrated.

Operation of the System

The operation of this computerized postage meter system will be explained with reference to the flow charts shown in FIGS. 20 to 51, and the associated program appended to this specification.

While the above program has been of necessity written about the particular meter setting mechanism shown in FIGS. 3, 4a, 4b and 5, it should be understood that the essence, spirit, scope, and limits of this invention are considered to be of a broader character. In other words, the present computerized postage meter system could have been easily programmed about a jet printing postage apparatus of the type shown and described in co-pending application, Ser. No. 433,805, filed Jan. 16, 1974. Also, it is to be understood that many other high speed printing apparatuses can be made compatible with the present computerized system. Other such apparatuses include matrix and line printers.

With all such printing devices, the basic safeguards regarding postal security must of necessity be maintained, such as securing the printer against physical and electronic tampering.

Referring to FIG. 20, a generalized overall representation of the operation of this postage meter system is shown in flow chart form. The system is first given power as shown per block 300. When the system is powered, a general system reset pulse initializes the microprocessor system. This causes the CPU registers, RAM memory, and I/O ports to be cleared, and starts the postage meter program executing from address ϕϕϕ.

The postage meter system operation is set in motion by recalling postage meter register data from the non-volatile memory and placing this data in the working area of RAM. Also, when the postage meter system starts its operation, the printer banks of the printing and setting mechanism of FIGS. 3, 4*a*, 4*b* and 5 are all set to zero. These are some of the major procedures represented by "initialization" block 301. In addition to these procedures, other functions are also performed, as will be explained hereinafter with reference to FIGS. 21 and 21*a*.

After "initialization", the system enters a SCAN routine shown in the general sense by blocks 302, 303 and 308 and in more detail hereinafter, by the flow chart of FIG. 25. The SCAN routine consumes the greatest portion of postage meter operation time. The principle function of the SCAN routine is to search for a depressed key on the keyboard 34 and multiplex the numeric display 115 of FIGS. 1*b* and 1*c* (block 302). Once having found a validly depressed key (block 308), the SCAN routine will branch to the appropriate subroutine corresponding to the function called for by that particular key. The SCAN routine will generate an address to a "look-up" table where the particular address of the subroutine corresponding to the key is stored. This stored address is transferred to register pair 6 in the CPU. The subroutine FCTN (which is a jump to the address in register pair 6) is then executed.

After a particular key is serviced (block 310), the SCAN routine is re-entered to re-inspect the keyboard for new and subsequent inputs.

During the course of the SCAN routine, a periodic check is made as to the power condition of the system (block 303). In case of a power failure, the postage meter system must be able to complete any on-going operations, and to retransfer the contents of working memory (RAM contents) back into non-volatile storage (block 304). The "powering down" and "save memory" sequences will be more fully explained hereinafter, with reference to the DOWN subroutine of FIG. 23. When there is a "power-down", a trap (block 306) is entered, and the program cannot re-enter the SCAN routine except by the initation of a complete "power-up" sequence.

The meter initialization sequence block 301 is shown in more detail with reference to FIG. 21. The information in the non-volatile memory is transferred into working memory (RAM) via subroutine INRAM (block 312) which will be described in more detail with reference to FIG. 22. All four imprint wheels are then set to zero as per block 313 using the subroutine HOME of FIG. 24. Descending register contents are then loaded into the numeric display (block 314) and the check data reminder indicator lamp is lighted (block 316). The descending register contents are displayed at start-up to inform the operator how much funds are available for printing postage. The check date reminder, reminds the operator to set the date on the postage printing mechanism. The system then goes into the SCAN routine as previously mentioned.

An important part of the initialization procedure is the subroutine CHCK (block 315) shown in more detail in FIG. 21*a* (see Program address/4A3). Subroutine CHCK is used to detect errors that cause noncorrespondence in the meter funding registers. If the sum of the descending and ascending registers minus the control sum register does not equal zero (block 801), the CHCK routine turns the "call PB service" indicator lamp on (block 804), and disables the meter from printing postage. If the registers properly correspond (block 802) the subroutine will branch back via line 803. This subroutine is very novel with regards to postage meter operation, since this is the first time a postage meter has had the capability of monitoring its own funding registers.

FIG. 22 depicts the flow chart for subroutine INRAM, which can be found in the appended program at the instruction address/142.

The subroutine INRAM transfers data from the non-volatile shift register memory into working area in RAM.

CPU index registers are initialized (block 317) to specify input and output ports operatively connected to the shift register memory, and to specify RAM memory locations where this data is to be stored. The output of the shift register memory is read through an input port (block 318), written into RAM (block 319) and written out on an output port to the shift register memory (block 320). The shift register is then clocked (block 321) to access the next memory word. The index register specifying RAM address is incremented (block 322) in preparation for storing the next word. A counter is checked to see if transfer of data is complete (block 373). If not, a branch is made back into the program (line 325) to pick up the next sequential word. When transfer of data is complete, the INRAM subroutine branches back via block 324.

FIG. 23 illustrates the flow chart for the subroutine DOWN, which can be found in the appended program at the instruction address/15A. As aforementioned, the DOWN subroutine is a procedure for saving the contents of the memory (transfer RAM contents to the non-volatile memory) in the event of a power failure and normal turn off.

This routine is entered from the SCAN routine only when an impending power failure has been detected.

CPU index registers are initialized (block 327) to specify location of working area in RAM, and to specify input and output ports connected with the shift register memory. A data word from RAM is read (block 328), then written out to the shift register memory (block 329). A clock pulse to the shift register (block 330) enters the data into memory. The RAM address is incremented (block 331) and a test made on a counter to determine if everything has been transferred (block 332). If not, the program loops back (line 333) to transfer another data word to the shift register. When the transfer of data has been completed, the loop is terminated via (line 334) and a "turn off" signal is written to the shift register memory (block 335). The program then loops in a trap (336). A complete "power-up" sequence is needed to get back into the program.

The subroutine HOME is flow charted as shown in FIG. 24, and has a program address/174.

The HOME routine is part of the aforementioned initialization procedure for the meter. It sets the print wheels to zero to establish a reference for subsequent setting operations. The only position of the print wheels that can be directly read by the system is the φ (zero) position. This position is determined by monitoring the wells 107*a, b, c, d,* respectively, by detecting the slot (zero position) in slotted wheels 105*a, b, c, d,* respectively (FIG. 4*a*).

An index register is initialized (block 337) to specify the location of the Meter Setting Register 307, FIG. 6. Subroutine CLR of FIG. 47 selects the first set of photocells (block 338). The Meter Setting Register 307 is cleared (block 339) and the every step photocell 110*a* of FIG. 4*a* is read (block 340). If on a print step, (block 341) the program proceeds (via line 342) to select the printer bank (block 343). Monitoring wells (102 and 103, respectively monitoring the solenoids 60 and 70, of FIG. 3) are read and checked against the selected bank (block 344). If no contradiction exists, the following operation (via line 345) is selecting the next photocell bank and reading the monitoring well (107*a, b, c, d,* respectively of FIG. 4) corresponding to that bank to determine if the respective slotted disc (105*a, b, c, d,* respectively of FIG. 4*a*) indicates the selected print wheel is at the zero position (block 346). The CLR routine (block 347) is again used to select the first photocell bank. If the print wheel corresponding to the selected printer bank is not at zero (block 348), the print wheel is given one full printer step (block 354) corresponding to changing the setting of the print wheel by one unit towards zero. If no error is flagged in the step routine, the loop is re-entered via line 355 to again check for the zero position of the print wheel. This procedure is used to determine if the wheel needs another print step to reach zero. The loop is terminated via line 349, when the selected print wheel is at zero. If all four printer banks have not yet been set to zero, block 351 is exited via line 352 to block 343 where the next printer bank is selected. Setting the next print wheel to zero is done in the aforementioned manner. When all printer banks have been set to zero, the fifth position photocell (110*b* of FIG. 4*a*) is read (block 354). It should indicate a fifth position slot. If this is so, the HOME subroutine is terminated via line 356 through a branch back (block 360). Should any error be flagged, such as a photocell not indicating a mechanical response to a given signal, the error routine (block 359) is called via lines 364, 368, and 358, respectively.

If reading the every step photocell (block 341) at the beginning of the routine, does not show the printer to be at a full printer step, half a print step is generated (block 362) to align the main gear 51 with the tooth profiles 68, 68' on the yoke 63 of FIG. 4*b*. This procedure frees the yoke, so that it can move to select the printer banks.

FIG. 25 illustrates the SCAN routine having a program address of/01D. The primary purpose of the SCAN routine is to process keyboard inputs to the meter. The routine rejects multiple key depressions and debounces the key input. When a single key depression is read for four successive scans, the routine generates an address in a look-up table where the address of the routine corresponding to that particular key is stored. The routine contains operations preparatory to, and following, the servicing of the key via FCTN (FIG. 26). A secondary function of the SCAN routine is multiplexing the numeric display 115 of FIGS. 1*b* and 1*c*.

Index registers are initialized (block 369) to specify display address, length of various counting loops and I/O ports. Display blanking is determined (block 370) by examining the most significant digits of the display for leading zeros and storing an indicator. A bit is loaded in to the multiplexer shift register 20 of FIG. 15 to start the multiplexer (block 371). A display character is read from the display register in RAM and written out to the decoder driver 183 (FIG. 18). The display is unblanked, if the character is not a leading zero. The keyboard input is then read and processed as per block 373 (see FIG. 38 for a detailed description). A delay routine (block 382) is entered to allow sufficient time for display. A check (block 384) is made to determine if the "power-down" sequence should be initiated. If not, the display is blanked and the multiplexer clocked to select the next display digit and set of keyboard inputs (block 388). A check (block 389) is made to see if the loop has been completed. If not, the loop is re-entered via line 390, the next display digit is written out, and the next set of keyboard inputs is read in. Upon completion of the loop, a check is made (line 391) to see if a valid key depression had been sensed (block 392). If so, a batch indicator 305 (FIG. 8) is stored (block 396) (this indicator shows if the last operation had been calling a batch register into the display—this indicator is used in the CLEAR routine of FIG. 34). An address of a location in a look-up table is generated from the "ROW" and "COLUMN" words.* The LDLMP register 206 of FIG. 8 is cleared (block 397), because a routine called by the selected key may require that different indicator lamps be selected. A branch to the keyboard function is made in block 398. Upon return to the SCAN routine, the accumulator contents are stored in the status flag 311 of FIG. 8 (block 399), which is used to identify the last performed operation. This is necessary, because some keyboard functions are dependent on the previous function performed. The descending register is compared to the meter setting register 307 of FIG. 6 (block 400) to generate the "low postage" and "no postage" indications on the indicator panel 116 of FIG. 1*c*.

*The "Row word" is the information read into the input port 29 from the keyboard 34. The "Column word" identifies active multiplex output, i.e. the bank of keys selected by the multiplexer. (Also refer to discussion with respect to FIG. 16.)

The meter checks its funding registers (block 401) as per the CHCK routine of FIG. 21*a*. The selected lamps are then turned on (402) and the beginning of the SCAN routine re-entered via line 403. If a valid key had not been read after reading the last bank of keys, re-entry would have been made from decision block 392 via line 393. If a "power down" condition would have been sensed in block 384, a branch via line 385 would have been made to the DOWN routine of block 386.

FIG. 26 is a chart of the subroutines called for through FTCN (program address/2C1). FCTN is a generalized entry point into the subroutines called by the keys. When a valid key is detected, an address in a look-up table in ROM is generated from the "ROW" and "COLUMN" words. This location contains the address of the subroutine corresponding to the key. FCTN jumps to this address and executes the specific subroutine. The chart in FIG. 26 specifies all the keys and the labels of the subroutines called.

FIG. 27 illustrates a subroutine for entering numbers into the display register from the keyboard. Each of the multiple entry points correspond to a particular digit.

Upon entry to this routine, a number is generated corresponding to the entry point, and thus to the particular key calling the routine (block 427). This number is temporarily stored (block 428) while the status flag 311 (FIG. 8) is checked to determine if the previous keyboard operation was entering a digit (block 429). If not, the display is cleared (block 431) before continuing. The contents of the display are shifted left (block 432) and the new number on the right. The UNLOCK flag 309 (FIG. 8) is set to zero (block 434), and a branch back with ACC=1 is initiated (block 435). The 1 is used to flag this operation in the status flag 311.

FIG. 28 shows the subroutine SET having a program address/2C5. The SET routine has basically two modes of operation: (1) it sets the meter print wheels to the value entered into the display via the keyboard, and (2) if the display contents are not from the keyboard, the last setting value is recalled. This value is displayed and the meter enabled, if sufficient postage is available for printing the amount of the setting.

Index registers are initialized (block 513) to set up the CHECK routine (block 514). The CHECK routine examines the contents of the display for $1.00 or more. The status flag 311 (FIG. 8) is next examined to determine if numerical entry from the keyboard is in the display (block 515). If so, the CHECK routine then looks for a value of $100.00 in the display (block 518). If the value is both less than $100.00 (block 519) and less than $1.00 (block 525) the routine proceeds to set the meter (block 533), enable the meter (block 534), clear the ADD register 210 of FIG. 7 (block 539) and branch back (block 540). If $1.00 or more is in the display, the UNLOCK flag 309 of FIG. 8 is checked. If flagged, setting the meter would continue as before via line 532. If the $ UNLOCK has not been flagged, an indicator light showing "$ UNLCK" would go on (block 529) and a branch back would be (block 530) made without ever setting the meter. If the amount in the display is greater than $99.99 an error would be indicated (block 522), because the meter, being a four bank meter, cannot set to a value that is higher than $99.99.

The second mode of operation occurs where the contents of the display have not been entered by the keyboard (block 516). In that case, the display is cleared (block 536), the meter setting put into the display (block 537), and the meter is enabled if sufficient postage is available in the machine (block 534). The ADD register 210 is then cleared (block 539) as before, and the routine branches back (block 540).

FIG. 29 depicts the subroutine UNLCK having a program address/266. The UNLCK routine sets the $ UNLCK flag 309 of FIG. 8, (block 492), if the previous function executed was that of entering a number into the display (block 490). The $ UNLOCK flag is used to enable the printer, if the setting is $1.00 or more of postage. In such a case, there is a branch back with ACC=1 (block 493).

FIG. 30 illustrates the flow chart 30 for the subroutine POST having a program address/297. The POST routine updates the meter registers each time postage is printed. This occurs when the photocell 99 (FIG. 3) detects the slot 100 in the disc 98 mounted on the drum shaft 57. This signifies a drum rotation, and hence, the printing of postage.

The ascending register 816 200 of FIG. 6, and the batch amount register 819, are incremented by the amount in the meter setting register 307 (MSR) (see blocks 470 and 471). The piece count 817 and batch count 820 also of FIG. 6 are incremented by 1 (blocks 472 and 473), and the descending register 815 is decremented by the amount in the meter setting register (block 474). The ENBLE routine (block 475) determines if the printer may be enabled for a subsequent print of the same amount. The routine is then terminated (block 476).

FIG. 31 shows the flow chart for the subroutine ADP having a program address/400. The aroutien ADP is a means for entering funds into the meter. The amount to be metered is first inputted via the keyboard. The "+" switch 122 (FIG. 1*b*) is then depressed to call the ADP function.

Index registers are initialized (block 436) to specify pertinent meter registers. If the display contents had been entered via the keyboard (block 437), and were not larger than the total capacity of the descending register 815 (blocks 441 and 442), the display contents are added to the descending register and the results placed in the descending register (block 445). If no overflow occurs (block 446), then the display contents and control sum 818 are added together and placed in the control sum (block 451). A branch back is executed (block 450). If, however, an overflow had been generated (block 446), there would be a branching to block 448 via line 447. The display register would be subtracted from the descending register to restore the original amount, and an error would be flagged (block 439) before branching back. If an error had been detected earlier, (display not from keyboard block 437); or display contents too large (block 442) the error routine (block 439) would have been called via lines 438 and 443, respectively. The routine would then be terminated as before (block 450).

FIG. 32 depicts the flow chart for the subroutine SUBP having a program address/450. The routine SUBP is a means for taking funds out of the meter. The amount to be taken out is entered via the keyboard. Next, switch 123 (FIG. 1*b*) is depressed to call the SUBP routine. Its operation is analagous to that of the aforementioned ADP routine of FIG. 31.

Index registers are initialized (block 453) to specify the pertinent meter registers. If the display contents are from the keyboard, (block 454) and not too large (blocks 459 and 460) the display contents are subtracted from the descending register and the result is placed in the descending register (block 463). If a borrow is not generated, then the control sum is decremented by the amount in the display (block 468) and a branch back is executed (block 469). Had a borrow been generated, the descending register would have been incremented by the display contents (block 466 via line 465) and, an error message would have been flagged (block 456). The error message is also flagged, if the display contents had not been from the keyboard, or if these contents were too large (see lines 455 and 461).

FIG. 33 illustrates the flow chart for the PLUS subroutine having a program address/27B. The PLUS routine adds the contents of the display to the ADD register 210 (FIG. 7), and puts back the result in both the display and the register. This allows chain addition of a series of numbers entered via the keyboard. This routine is summoned when the "±" button 117 is depressed on the keyboard (FIGS. 5 and 5*a*). This routine provides the capability of adding ancillary charges so the main postage, such as insurance, special delivery postage, etc.

Index registers are initialized to specify the registers concerned (block 496). The status flag 311 of FIG. 8 (block 497) is fetched to determine if the contents of the display are from the numerical entry of the keyboard (block 498). If so, block 500 is entered. The ADD register 210 (FIG. 7) and display (DISP) register 208 (FIG. 8) are added together and the result placed back in both registers. If no overflow occurs (block 505), a branch back is made (block 510). If an overflow has been detected, an error message via line 506 is flagged (block 507) before branching back (block 508). If the PLUS routine had been called without the previous operation having been from the numerical entry of the keyboard, a branch back (block 508) would have been made via line 511 without performing any operation.

FIG. 34 shows the flow chart for the subroutine CLEAR having a program address/23D. The CLEAR routine performs the following functions: (1) clears the display; (2) recalls contents of the "ADD" register 210 (FIG. 7) into the display; (3) clears the "ADD" register 210 on the second successive clear; and (4) clears batch registers 819 and 820 (FIG. 6) if either register is displayed at the time the CLEAR routine is called.

The display register 208 (FIG. 8) and the $ UNLOCK flag 309 (FIG. 8) are cleared (block 477 and 478). The status word 311 (FIG. 8) is checked (block 479) to see if the previous operation had been the CLEAR routine. If not, block 482 is entered. Contents of the "ADD" register 210 are transferred to the display (DISP) register 208 (contents of the "ADD" register are nonzero only when in the process of adding up a series of numbers) using the ± key 117 of FIG. **1*b*. The effect of the clear key 118 in this case, is to clear a keyboard entry and recall into the numeric display 115, the subtotal up to that point. The addition process may be continued upon entry of the next number. The "LDLMP" area 206 (FIGS. 8 and 8*a*) is cleared (block 484). The batch flag 305 is checked (block 485) to see if the previous keyboard operation was calling either of the two batch registers into the display (batch sum or batch count). If not, a branch to the main program is made (block 488). If so, line 486 is taken to block 487. The batch registers are cleared before returning to the main program (block 488**).

If the previous keyboard operation had been CLEAR as per decision block 479, the "ADD" register 210 would have been cleared via line 480 to block 481, before entering block 482.

FIG. 35 shows a subroutine for calling register contents into the numeric display 115 of FIGS. **1*b* and 1*c***. This routine has six entry points corresponding to six meter registers which can be called into the display. Its purpose is to load the display with the contents of the specified meter register, and to turn on the indicator lamp corresponding to the selected register.

The meter register being called is specified by the entry point into the routine (block 420). Both the display (DISP) and addition (ADD) registers 208 and 210, respectively (FIGS. 8 and 7) are cleared (blocks 421 and 422). Then the FETCH routine of FIG. 41 is called.. This initializes index registers to specify the meter register being called. The indicator lamp corresponding to the specified meter register is selected by writing a bit in the appropriate word in the LDLMP area 206 of RAM(2) 18 (block 424). The contents of the specified register are then written into the display register 208 (block 425), and a branch back initiated via block 426.

FIG. 36 illustrates the flow chart for the subroutine ENBLE having a program address/100. The subroutine ENBLE generates the signal for the printer enabling solenoid. The ENBLE routine first calls CMPAR (block 736) which compares the meter setting register 307 of FIG. 6 against the descending register 815 (block 737). If the descending register is greater than or equal to the meter setting, an enabling bit is put into the LDLMP area 206 (block 739) (see FIG. **8*a*, word 8D, bit 4) before branching back (block 740). Otherwise, a branch back is made directly from block 737 via line 741**.

FIG. 37 relates to a flow chart for the ERROR subroutine having a program address/133. The ERROR routine is used to flag certain errors. The error message is contained in the accumulator at the time the ERROR routine is called. The most significant (leftmost) place in the display register 208 (block 716) is selected and the contents of the accumulator (block 717) is written into the display register before branching back (block 718) to the main program.

FIG. 38 shows a flow chart for the portion of the SCAN routine of FIG. 25 which is referred to as SCANX (see block 373 of FIG. 25). The SCANX procedure is used to debounce the keys and check for a valid key depression. The four input lines from the keyboard matrix (FIG. 16) generate what will be hereinafter referred to as the "ROW" word. A number corresponding to the active output of the multiplexer (FIGS. 15, 16) will be hereinafter referred to as the "COLUMN" word. A nonzero "ROW" word and "COLUMN" word identify a particular activated key in the keyboard matrix. The term "count" word as used herein is defined as the number of times the same key depression has been successively read.

The detailed operation of reading the keyboard follows: If the multiplexer (MPX) has selected an output connected to the keyboard (block 374), the "ROW" word is read (block 376). If not zero (block 377), the keyboard process instruction is used to detect multiple keyboard depressions in the group of four input lines being read. If the "COLUMN" word is the same as that of a previous scan (blocks 406 and 407), and only one key is pressed, (blocks 409 and 410), the last "ROW" word is compared with the present one (block 395). If both are the same, the "COUNT" word is incremented (block 416). Block 392 in the SCAN routine of FIG. 25 uses this number to decide when to branch to a selected routine. If the "COLUMN" (block 407) and "ROW" (block 409) words are not the same as in the previous scan, or more than one key is pressed (block 410), the "COUNT" word is reset to zero (block 381) starting a new count sequence, before a new key will be recognized. If the multiplexer (MPX) is not selecting a group of keys, or if the "ROW" word is zero but the "COLUMN" word is different from that stored from the previous pass, the keyboard processing is bypassed via line 387.

FIG. 39 depicts the flow chart for the LDLMP subroutine having a program address/10A. The LDLMP routine transfers data in the LDLMP register 206 of FIGS. 8 and **8*a* to the shift register 21 and 22 of FIG. 1*d*. These shift registers drive the lamp display (section 116 of FIG. 1*c***).

Index registers are initialized (block 663) to specify the LDLMP register 206. The first word of the register is read (block 664) and temporarily stored (block 665). The OUTPT routine (block 666) enters the 4 bit word into the shift register in a serial manner. If the last word had not been serviced by the OUTPT routine, the routine jumps back via line 668 and gets the next sequential word in the LDLMP register 206. The routine branches back (block 670) after the last word has been outputted.

FIG. 40 illustrates the flow chart for the subroutine OUTPT having a program address/114. The OUTPT routine is called by the LDLMP routine. Its purpose is to output a 4 bit word in serial manner into a shift register.

First, index registers (for counting and for specifying ports) are initialized (block 671). The output word is loaded into the accumulator (block 672), and then rotated right to store a bit in the carry (block 673). The remaining bits are stored (block 674). A clock pulse bit is loaded into the accumulator (block 675) and rotated left to bring in the bit stored in the carry and to bring the clock pulse bit into position (block 676). The data is then written out to the shift register (block 677). If not at the end of the sequence (block 678) a jump back to block 672 is made via line 679 so as to output the next bit. If the sequence is finished, a branch back is made per block 681.

FIG. 41 shows a flow chart for the subroutine FETCH having a program address/OBE. The FETCH routine is used to initialize CPU index registers with data from a look-up table specifying a particular meter register (block 730). The FETCH routine affords some economy in instruction count.

The accumulator is loaded with a number corresponding to the desired meter register before the call to "FETCH" is made. The FETCH routine first generates from the contents of the accumulator, an address specifying the location of the desired data. Then, the starting address of the selected meter register is loaded into an index register pair (block 731). The lamp display word address is loaded into another index register pair (block 732), and the lamp display word itself is loaded into an index register (block 733). The starting address of SETNG ("number meter set to" register 211 of FIG. 6) is put into yet another index register pair (block 734) before branching back as per block 735.

FIG. 42 depicts a flow chart for the subroutine CMPAR having a program address/09B. Subroutine CMPAR compares the meter setting register 307 (FIG. 6) with the descending register 815 of FIG. 6. There are three conditions which are considered:

(1) descending register≧$100.00 (block 747—unconditionally larger than meter setting)

(2) $100.00>descending register meter setting (blocks 747 and 749)

(3) meter setting >descending register (block 749)

These conditions are respectively flagged by the contents of the accumulator upon branch back to the main program, i.e. branch back is made with ACC=0, 2, 3, depending upon which one of the aforementioned conditions is observed (see blocks 754, 755 and 751, respectively). The overall objective of this routine is to check the funding available (descending register) as against the called for postage (meter setting register) to be printed. If not enough funds are available to print postage, the printer will not be enabled.

FIG. 43 illustrates the flow chart for the subroutine CHECK having a program address/138. The CHECK routine is used to determine if the contents of a meter register exceeds a specified amount by testing high order digits to see if they are nonzero.

An index register is initialized with an address in the meter register corresponding to the higher order digits being checked, before the CHECK routine is called. The carry is cleared (block 719) and the location specified by the address is read (block 720). If zero (block 721), the address is incremented (block 723), and the next higher order digit is read (block 720 via line 727). Any non-zero digit causes the carry to be set (block 725). Branch back occurs (block 729) at the end of the sequence (block 726). A carry equal to zero indicates that all specified higher order digits were zero. A carry equal to 1 indicates at least one of these digits was nonzero.

FIG. 44 shows a flow chart for the subroutine ADDD having a program address/129. The ADDD routine adds the SETNG register 211 of FIG. 6 to a specified meter register, and writes the result back in the specified meter register. The meter register is specified by the contents of an index register initialized prior to calling the ADDD routine.

The carry (CPU) is cleared (block 705) before calling subroutine ADD1 which adds a SETNG register digit to a meter register digit (block 706). Then, the SETNG address is incremented (block 707), and a test made for the end of the loop (block 708). If the loop has not been completed, the next digits in each register are added together via line 709. At the end of the sequence, ADD2 is entered (block 711). ADD2 propagates the carry through the longer meter register. After completing this (block 712) a branch back to the main routine is made via block 715.

FIG. 45 depicts a flow chart for the subroutine ADD1; ADD2 having program address/120;/123. The ADD1 routine adds a digit from the SETNG register 211 of FIG. 6 to a digit from a meter register, decimal adjusts the result (binary to BCD conversion), and writes it back into the meter register.

A second entry point (ADD2) allows propagation of a carry through a meter register by adding a zero to the digit, decimal adjusting, and writing back in.

This routine adds one pair of digits at a time and is called repeatedly to add two registers together (see subroutine ADDD).

FIG. 46 relates to subroutine CLDSP; CLEER having a program address/25E;/260. CLDSP writes zeros into the display area. CLEER writes zeros into an area specified by a preset index register.

An index register is initialized to specify the display register (block 698). A zero is written into this location (block 693), the address incremented (block 696) and the next sequential location is cleared (block 694) until the clear operation is complete (loop 695). A branch back (block 699) to the calling routine is made upon completion thereof.

FIG. 47 shows a flow chart for the subroutine CLR having a program address/1B9. Subroutine CLR clears the photocell multiplexer 23 of FIG. 1*d* (block 742) and then selects the first set of photocells (every step, fifth step, solenoid monitoring photocells) as per block 743. Branch back is per block 744.

FIG. 48 shows a flow chart for the subroutine STPB having a program address/300. The STPB routine is called by the SET routine of FIG. 28 to operate setting mechanism solenoids 60 and 70 of FIG. 3. This routine controls the solenoids so as to select a particular printer bank by bringing the master gear drive 51 (FIG. 3) into engagement with one of the respective spur gears 53a, 53b, 53c, 53d, (FIG. 3).

An index register used in the SET routine conveys information as to which printing bank is to be selected (block 627). A series of tests (blocks 628, 629, 630, respectively) determine which one of the four printer banks a, b, c, d, is selected. If, for example, bank b were selected, block 631 would be entered which requires both solenoids to be actuated. This is done by loading the appropriate bits (two 1's in this case) into the shift register (element 24 of FIG. 1*d*). After the solenoids are selected, a delay routine (block 635) provides time for the mechanism of the printer to respond to the electrical signals. Photocells (102 and 103 of FIG. 3) monitoring the position of the solenoids are then read (block 636) and compared with what they are expected to read (block 637). If the reading is in correspondence, a branch back with a zero in the accumulator (block 640) is made. Otherwise, an error is flagged (line 641) by branching back as per block 642 with the accumulator =/B.

A bank "c" selection (decision block 628) will require that both solenoids be deactuated (block 644). Banks d or a will require one or the other of the solenoids to be actuated (blocks 646 or 648).

FIG. 49 illustrates a flow chart for the subroutine ZEROB having a program address/353. Subroutine ZEROB rcads photocells 107*a*, *b*, *c*, *d*, of FIG. 4*a*, which detects the zero positions of the print wheels of the printer. The reading from a selected bank is placed into the carry bit of the accumulator.

The second photocell set is selected by clocking the photocell multiplexer (block 649). A slight delay (block 650) allows time for the photocells to respond. A series chain of decision blocks (651, 652 and 653) is entered to determine from preset status characters, which of the photocell readings (banks, a, b, c or d) is to be selected. If for example, bank a were selected, the photocells would be read (block 654a) and the data shifted in the CPU accumulator until the photocell bit corresponding to bank a is in the carry bit (block 655*a*). A branch back (block 656) then follows.

FIG. 50 relates to the flow chart for subroutine SETX having a program address/37E. The SETX routine is that portion of the SET subroutine of FIG. 28, that performs the detailed setting of the print wheels to the value shown in the display.

Index registers are initialized (block 546) to specify the display register 208 (FIG. 8) address and the meter setting register (MSR) 307 (FIG. 6) address. The contents of the display are transferred to the meter setting register (block 541). The number to be set (MSR) is compared with the previous number i.e., with "number meter set to" register 211 of FIG. 6 (SETNG). This is accomplished digit by digit (block 547). If not the same, the motor direction flag 215 (FIG. 9) is initialized as per block 556 (direction determined by which number is greater [MSR digit or SETNG digit]) and the difference between the numbers is stored. The new number (MSR) is then written into the previous number area (SETNG) as per block 553. The printer is set to the appropriate bank for the digit being considered (block 558). If the bank selection mechanism does not respond, photocells detect an error. If no error, line 562 is taken to block 563. One step in the appropriate direction is taken, and a check is made to ascertain if there is a stepping error (block 564). If no error has been flagged, the fifth position flag 216 (FIG. 9) is updated (block 567). If the flag indicates that the photocell (110*b* of FIG. 4*a*) should be seeing the fifth position slot, (block 572) the photocell is read (block 574). If it verifies that the motor is on a fifth step (block 575), a check is made to see if the proper number of steps has been counted off (line 577 to block 580). If not, a return via line 587 is taken to block 563 (STEP). The above procedure is then repeated. When the selected print wheel has been fully stepped to its new position, and if the position is zero (block 584), the ZEROB subroutine is called (block 586) to read the zero position photocells. This is to verify if in fact, the selected print wheel is at zero (decision block 587). If so, the photocell multiplexer is restored to selecting the first bank (block 589). The flags used in the STPB routine are cleared via line 590 to block 592. If not the last bank to be set (block 594), a branch back vias line 595 is made to compare the next new number digit with the previous number digit. The setting process is then repeated. If any bank does not have to be altered (decision block 549) the setting process for that particular bank is bypassed via line 604. If the last bank had been selected in block 594, the setting mechanism is returned to the (first bank) rest position (block 597). If no error is detected (block 598) in returning to the rest position, the ENBLE routine is called (block 600) which enables the meter if a sufficient amount of postage is available in the descending register. The "ADD" register 210 (FIG. 7) is cleared (block 601), before branching back (block 602). Any error in stepping the motor 50 (FIG. 3) or bank selection causes a branch to the error routine (block 561) which causes an error message to be placed in the display.

FIG. 51 relates to the flow chart for the STEP routine, having a program address/1C7. The STEP subroutine changes the setting of a selected print wheel of the printer of FIG. 3 by one unit. The flag for motor direction is set up before calling the STEP routine. Normally, the motor starts from a STEP reference position. On start-up, the motor word* (1001) is written out which turns the motor and puts the monitoring wheel 109 (FIG. 3) of the motor in either a "STEP" or "HALF-STEP" reference position. The "every step" photocell 110*a* of FIGS. 3 and 4*a* sensing the wheel 109 position is read. If it indicates that the motor wheel 109 is on a "HALF-STEP" reference position, the motor is advanced half a step. From that point on, the STEP routine pulses the motor in increments of eight motor words, i.e. from one "STEP" reference position to a succeeding "STEP" reference position.

*The bit pattern corresponding to energizing or deenergizing stepper motor coils is referred to as the "motor word". There are eight "motor words" for each step, and four "motor words" for each half-step of the motor. (See APPENDIUM B for a discussion of motor operation.).

Index registers are initialized (block 605) to specify look-up table addresses when the motor word pattern for "STEP-UP" and "STEP-DOWN" is stored. The output port to the motor drivers is selected (block 606). A status character 215 of FIG. 9 is read to determine the direction the motor is to be stepped (block 607). The appropriate motor word is loaded (blocks 611 or 612) then written out (block 613). A delay loop is entered (block 614) to give the motor time to respond. If not at the end of the loop (block 548), a return via line 550 is made to block 607 to get the next bit pattern. (There are four different bit patterns per half-step.) After the fourth word is written out, the "every step" photocell 110*a* of FIG. 4 is read (block 615). On the first pass through this routine, the monitoring wheel should have gone from "STEP" to "HALF-STEP" reference positions. The photocell (block 618) is read to verify that it is on a "HALF-STEP" (photocell should be blocked by a tooth on slotted monitoring wheel 109 [FIG. 3]). If on a half-step, re-entry to block 605 is made via line 621 to re-enter the routine to write out four more words. The monitor wheel should now be on a full "STEP" again. Photocell 110*a* is read (block 620) to verify the full step position. Then there is a branch back (block 626). If at any place the photocell doesn't agree with what it should be, there is a branch back with an error message (*c*) as per block 623.

APPENDIUM A

Comments on The Postage Meter Program Printout

The representation of some of the instructions has been slightly altered from those representation Intel uses in their Users Manual (copyright March 1972, Rev. 2). Double instructions are printed on two lines, rather than one. The second line contains data or an address associated with the double word instruction. Data, numbers, and addresses are generally given in hexadecimal notation, rather than the decimal and octal notation found in the Users Manual. The following list indicates the format of instructions which differ from the format in the Users Manual. "D" indicates data in hexadecimal notation. "R" represents an index register number in hexadecimal. Reference should be made to the Users Manual for a complete description of the instructions.

| MNEMONIC | PROGRAM REPRESENTATION | COMMENTS |
|---|---|---|
| LDM | LDM + D | |
| LD | LD + R | |
| XCH | XCH + R | |
| ADD | ADD + R | |
| SUB | SUB + R | |
| INC | INC + R | |
| BBL | BBL + D | |
| ISZ | ISZ + R | |
| JCN | JCN + TZ | where condition is TEST = 0 |
| | JCN + AZ | where condition is ACCUMULATOR = 0 |
| | JCN + AN | where condition is ACCUMULATOR ≠ 0 |
| | JCN + CZ | where condition is CARRY = 0 |
| | JCN + CN | where condition is CARRY ≠ 0 |
| JIN | JIN + R | R is even, refers to register pair R, R + 1 |
| SRC | SRC + R | R is even, refers to register pair R, R + 1 |
| FIN | FIN + R | R is even, refers to register pair R, R + 1 |
| FIM | FIM + R | R is even, refers to register pair R, R + 1 |

INTERPRETATION OF THE COMPUTER PRINTOUT

STATEMENT NUMBER — COMMENTS

```
01116   *SUBROUTINE ADP                 30 JAN 74
01117   *ROUTINE TO ADD POSTAGE TO METER (BOTH
01118   *DESCENDING REGISTER AND CONTROL SUM)
```

HEXADECIMAL REPRESENTATION OF INSTRUCTION ADDRESS — MACHINE INSTRUCTION IN HEXADECIMAL — STATEMENT NUMBER — LABEL OF INSTRUCTION — INSTRUCTION IN MNEMONIC FORM — COMMENTS

```
1400  0  8020  01119  ADP   DC  FIM + /C
1401  0  00B7  01120        DC  /B7
1402  0  802D  01121        DC  SRC + /C
1403  0  80EC  01122        DC  RDC      (B) READ STATUS CHARACTER
1404  0  80F6  01123        DC  RAR      CHECK FOR XXXI
1405  0  801A  01124        DC  JCN + CZ
1406  0  143B  01125        DC  ERRR
1407  0  802E  01126        DC  FIM + /E
1408  0  0000  01127        DC  /00
1409  0  806F  01128  RTN1  DC  INC + /F DETERMINE NUMBER OF CHARACTERS
140A  0  802D  01129        DC  SRC + /C IN DISPLAY
140B  0  80E9  01130        DC  RDM
140C  0  8014  01131        DC  JCN + AZ
140D  0  1410  01132        DC  END
```

APPENDIUM B

Description of the Stepping Motor Operation

The stepping motor 50 (FIG. 3, 4*a*) has four driving coils, two of which are energized at a time. The motor rotates one increment (motor step) when the pattern of energized coils changes. The schematic of the motor driving circuitry is shown in FIG. 19.

In the following table, "1" will represent an energized coil, "$\phi$" will represent a de-energized coil. The stepping sequences are as follows: The "STEP-UP" sequence turns the motor in such a direction as to increase the meter setting, the "STEP-DOWN" sequence decreases the meter setting. The bit pattern corresponding to energized and de-energized coils will be referred to as the "MOTOR WORD".

TABLE

| | TIME PERIODS | | MOTOR WORD (STEP-UP) | | | | MOTOR WORD (STEP-DOWN) | | | |
|---|---|---|---|---|---|---|---|---|---|---|
| | | | Coil 1 | Coil 2 | Coil 3 | Coil 4 | Coil 1 | Coil 2 | Coil 3 | Coil 4 |
| One Full Step | $T_0$ | One-Half Step | 1 | 0 | 0 | 1 | 1 | 0 | 0 | 1 |
| | $T_1$ | | 0 | 0 | 1 | 1 | 1 | 1 | 0 | 0 |
| | $T_2$ | | 0 | 1 | 1 | 0 | 0 | 1 | 1 | 0 |
| | $T_3$ | | 1 | 1 | 0 | 0 | 0 | 0 | 1 | 1 |
| | $T_4$ | | 1 | 0 | 0 | 1 | 1 | 0 | 0 | 1 |
| | $T_5$ | | 0 | 0 | 1 | 1 | 1 | 1 | 0 | 0 |
| | $T_6$ | | 0 | 1 | 1 | 0 | 0 | 1 | 1 | 0 |
| | $T_7$ | | 1 | 1 | 0 | 0 | 0 | 0 | 1 | 1 |
| | $T_{0'}$ | | 1 | 0 | 0 | 1 | 1 | 0 | 0 | 1 |

($T_0$; $T_0'$) is the "rest" state where the motor remains when it is not being stepped. When stepping, $T_n - T_{n-1} \approx$ delay in the stepping routine (STEP, FIG. 51). The gears coupling the motor to the print wheels are such that a sequence of motor steps are above (from $T_0$ to $T_0'$) will change the meter setting by a single unit in the selected bank. A slotted wheel 109 (FIG. 3) is coupled to the motor such that when the motor is at $T_0$ (or $T_0'$) the photocell 110a (FIG. 3) sees a slot, and at the $T_4$ time period the photocell sees a tooth. Thus, in changing the print mechanism by one digit the photocell should see a slot-tooth-slot sequence. This provides a means of monitoring the stepping sequence to verify motor operation.

It will be appreciated by those skilled in the postage meter art, that a new postage meter system has been disclosed herein. As a result of the many new concepts and novelties thereby introduced, it is probable that many modifications of an obvious nature will occur to the skilled practitioner in this art. All such obvious changes are intended to be within the spirit and scope of this invention as presented by the appended claims.

What is claimed is:

1. In an electronic postage meter including postage printing means and input means for receiving data relating to an amount of postage to be printed, said printing means including a source of data signals corresponding to postage being printed; the improvement comprising integrated circuit digital electronic data processing means physically positioned within said meter and including storage means for storing postage data and storage means for storing instructions for controlling processing steps for said meter, said processing means being coupled to receive said data and data signals and having an output coupled to control said printer.

2. The postage meter of claim 1, wherein said storage means for storing data comprises a plurality of electronic registers, said storage means for storing instructions comprising a read-only memory.

3. The postage meter of claim 1, wherein said electronic data processing means comprises an integrated circuit central processor unit chip.

4. In a unitary electronic postage meter including input means for receiving data relating to an amount of postage to be printed, a postage printer, and electronic accounting and control means responsive to said data receiving means for controlling said postage printer; the improvement wherein said electronic accounting and control means comprises a complete digital electronic data processing circuit positioned within the said meter and including routine instruction control means coupled to control operation of the meter and register means for storing postage accounting data, said postage printer comprising a source of data signals corresponding to setting of postage to be printed thereby, and means applying said data signals to said circuit.

5. The postage meter of claim 4, wherein said register means comprises a plurality of electronic registers, whereby the stored data may be changed in accordance with the printing of postage by said device, and said routine instruction control means comprises permanent storage means for storing control instructions.

6. The meter of claims 1 or 4, wherein said means for receiving data comprises a keyboard.

7. In an electronic postage meter system including a postage printing device, a source of postage data signals related to an amount of postage to be printed, and digital electronic processing and accounting means coupled to control said printing device in response to said postage data signals, the improvement wherein said printing device, source of signals and processing and accounting means are all incorporated in a common housing to form a complete self-contained system, and said digital electronic processing and accounting means is comprised of an integrated circuit central processing unit chip, said printing device comprising a source of data signals corresponding to setting of postage to be printed thereby, and means applying said data signals to said chip.

8. The postage meter system of claim 7, wherein said central processing unit chip comprises a microprocessor chip.

9. The postage meter system of claim 7, wherein said source of signals comprises a keyboard.

10. The postage meter system of claim 9, wherein said processing and accounting means further comprises scanning means connected to scan keyboard to detect the depression of keys thereon.

11. The postage meter system of claim 7, wherein said processing and accounting means comprises random access memory means for storing accounting data, and read-only memory means for storing instructions to control the operation of said postage meter system.

12. The postage meter system of claim 7, wherein said digital electronic processing and accounting means comprises a memory at least substantially independent of the application of operating voltage to said system, said memory being coupled to store accounting data.

13. The postage meter system of claim 12, wherein said digital electronic processing and accounting means further comprises a working random access memory for maintaining current data corresponding to postage printing transactions, means for sensing voltage applied to said system, said electronic processing and accounting means further being responsive to voltages sensed by said sensing means below a determined amplitude for transferring data from said working memory to said memory substantially independent of operating voltage.

14. The postage meter system of claim 7, wherein said digital electronic processing and accounting means comprises a plurality of registers for storing accounting data, said source of data signals comprises a keyboard, and said system further comprises a display, said digital electronic processing and accounting means comprising means responsive to depression of selected ones of the keys of said keyboard for displaying the contents of said registers in said display.

15. The postage meter system of claim 13, wherein said digital electronic processing and accounting means includes means for producing output signals corresponding to determined conditions in which said system is inoperative, and means for displaying the existence of said conditions automatically on said display.

* * * * *

UNITED STATES PATENT AND TRADEMARK OFFICE

CERTIFICATE OF CORRECTION

PATENT NO. : 4,271,481

DATED : June 2, 1981

INVENTOR(S) : Frank T. Check, Jr., Alton B. Eckert, Jr., Joseph R. Warren

It is certified that error appears in the above—identified patent and that said Letters Patent is hereby corrected as shown below:

In the drawings, sheet 5, figure 3, change "100" to --100A--; change "101" to --101A--; change "102" to --102A--; change "103" to --103A--; change "104" to --104A--; change "108" to --108A--; change "109" to --109A--; change "110" to --110A--. Sheet 6, figure 4a, change "108" to --108A--; change "109" to --109A--; change "110" to --110A--. Sheet 15, figure 16, connect the common line of the lamps of the lower left row to the -24 volt source via a 300 ohm resistor. Sheet 19, figure 20, change "305" to --305A--; change "307" to --307A--; change "309" to --309A--; change "311" to --311A--; figure 21, in block 316, change "FIG. 38" to --FIG. 39--. Sheet 23, figure 26, in the Subroutine Label column change "ADD" TO --ADP--; and change "SUBD" to --SUBP--. Sheet 25, figure 31, change the title of the figure to --ADP--. Sheet 27, figure 34, in block 478, change "0" to --Ø--. Sheet 27, figure 35, in blocks 421 and 422, change "O" to --Ø--. Sheet 28, figure 39, in block 665, change "Work" to --Word--. Sheet 31, figure 46, change the label "CLDSD" to --CLDSP-- (two occasions). Sheet 32, figure 48, in blocks 646 and 648, change "solenoids" to --solenoid--; in block 631, change "solenoid" to --solenoids--. In the specification: Column 3, line 29, change "data" to --date--. Column 7, line 30, change "PCU" to --CPU--. Column 8, line 64, change "120" to --100--; line 65, change "16)" to --1b)--; line 66, change "120" to --100--. Column 11, line 5, change "and" (first occurrence) to --in--. Column 13, line 5, change "100" to --100A--; line 15, change "101" to --101A--; change "102" to --102A--; line 17, change "103: to --103A--; change "104" to --104A--; line 28, change "108" to --108A--; line 29, change "109" to --109A--; change "110" to --110A--: line 31, change "108" to --108A--; line 32, change "108" to --108A--; lines 33, 34, 35, 37 and 38, change "109" to --109A--; line 39, change "110" to --110A--

UNITED STATES PATENT AND TRADEMARK OFFICE

CERTIFICATE OF CORRECTION

PATENT NO. : 4,271,481

DATED : June 2, 1981

INVENTOR(S) : Frank T. Check, Jr., Alton B. Eckert, Jr., Joseph R. Warren

It is certified that error appears in the above—identified patent and that said Letters Patent is hereby corrected as shown below:

(two occasions); line 60, delete "shown on page 66". Column 13, line 67, change "(FIGS. 25 and 25a)" to --(FIG. 25)--. Column 16, line 40, change "13a" to --139--. Column 17, line 64, change "indistructable" to --indestructible--. Column 18, line 60, change "worse" to --worst--. Column 22, line 67, change "via (line" to --(via line--. Column 25, line 62, omit the second "30". Column 26, line 1, change "200" to --(200)--; line 13, change "aroutien" to --routine--; line 33, change "(" to --i.e.--; line 34, before "block" insert --(-- and change ";" to --,--; line 35, before "the" insert --,--. Column 28, line 46, change "410" to --401--. Column 29, line 53, insert the symbol $\geq$ between the words "register" and "meter"; line 68, change "contents" to --content--. Column 30, line 65, change "SET routine of FIG. 28" to --SETX routine of FIG. 50--. Column 31, line 14, change "102 and 103" to --102A and 104A--. Column 32, line 6, change "587" to --581--. Column 33, line 61, change "(c)" to --(/C)--.

Signed and Sealed this

*Eleventh* Day of *October 1983*

[SEAL]

*Attest:*

GERALD J. MOSSINGHOFF

*Attesting Officer* *Commissioner of Patents and Trademarks*